United States Patent
Tandai et al.

(10) Patent No.: US 8,958,744 B2
(45) Date of Patent: Feb. 17, 2015

(54) WIRELESS COMMUNICATION APPARATUS OPERABLE IN DIFFERENT CONNECTION ATTEMPT STATES BASED ON DETECTION OF INTERFERENCE

(75) Inventors: Tomoya Tandai, Kawasaki (JP); Tomoko Adachi, Kawasaki (JP); Takeshi Tomizawa, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 720 days.

(21) Appl. No.: 13/223,779

(22) Filed: Sep. 1, 2011

(65) Prior Publication Data
US 2012/0220228 A1      Aug. 30, 2012

(30) Foreign Application Priority Data

Feb. 28, 2011  (JP) .................. 2011-042689

(51) Int. Cl.
*H04B 5/00*     (2006.01)
*H04W 76/02*    (2009.01)
(Continued)

(52) U.S. Cl.
CPC .............. *H04W 76/02* (2013.01); *H04W 72/02* (2013.01); *H04W 72/082* (2013.01)
USPC ...... 455/41.1; 455/63.1; 455/67.13; 455/63.3

(58) Field of Classification Search
CPC .......... H04B 5/02; H04B 5/0012; H04B 5/00; H04B 1/525; H04B 1/1027; H04W 24/00; H04W 24/10; H04W 28/04; H04L 1/0003; H04L 1/20
USPC ............................. 455/41.1, 63.1, 63.3, 67.13
See application file for complete search history.

(56) References Cited

U.S. PATENT DOCUMENTS 6,694,141  B1   2/2004  Pulkkinen et al.
2001/0039183 A1* 11/2001  Kobayashi et al. ............. 455/63
(Continued)

FOREIGN PATENT DOCUMENTS

JP       6-350528  A    12/1994
JP       7-107558  A     4/1995
(Continued)

OTHER PUBLICATIONS

Japanese Office Action dated Nov. 27, 2012 (and English translation thereof) in counterpart Japanese Application No. 2011-042689.

*Primary Examiner* — Temesgh Ghebretinsae
*Assistant Examiner* — Md Talukder
(74) *Attorney, Agent, or Firm* — Holtz, Holtz, Goodman & Chick PC

(57) ABSTRACT

According to one embodiment, there is provided a wireless communication apparatus for making wireless connection in the first connection attempt state wherein a connection request is attempted using a predetermined frequency channel or the second connection attempt state wherein a connection request is attempted using a plurality of frequency channels. A frame generation unit generates a connection request frame which includes the first field for requesting a search of the plurality of frequency channels in response to occurrence of interference, and the second field indicating whether a corresponding frequency channel is a channel wherein occurrence of interference has been detected. A transmission unit transmits the connection request frame using the predetermined frequency channel in the first connection attempt state, and transmits the connection request frame using the plurality of frequency channels in the second connection attempt state.

8 Claims, 56 Drawing Sheets

(51) Int. Cl.
*H04W 72/02* (2009.01)
*H04W 72/08* (2009.01)

(56) References Cited

U.S. PATENT DOCUMENTS

2011/0096679 A1* 4/2011 Hayashino et al. ........... 370/252
2012/0220228 A1* 8/2012 Tandai et al. ................ 455/41.1

FOREIGN PATENT DOCUMENTS

| JP | 8-307367 A | | 11/1996 | |
|---|---|---|---|---|
| JP | 10-304440 A | | 11/1998 | |
| JP | 10304440 A | * | 11/1998 | ............... H04Q 7/36 |
| JP | 2001-298763 A | | 10/2001 | |
| JP | 2008-109714 A | | 5/2008 | |
| JP | 2008-288932 A | | 11/2008 | |
| JP | 2008288932 | * | 11/2008 | ............... H04B 7/26 |

* cited by examiner

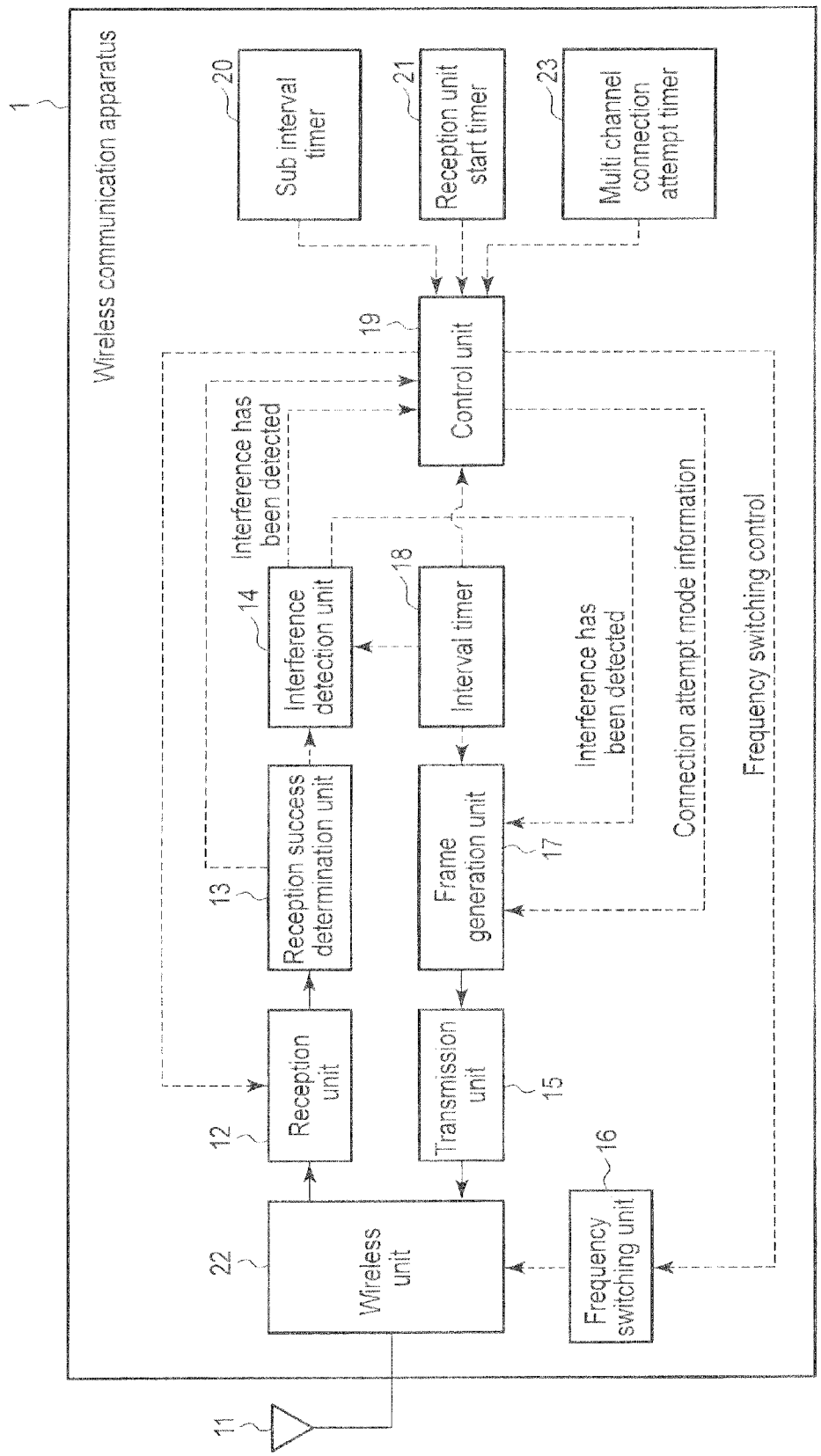
F I G. 2

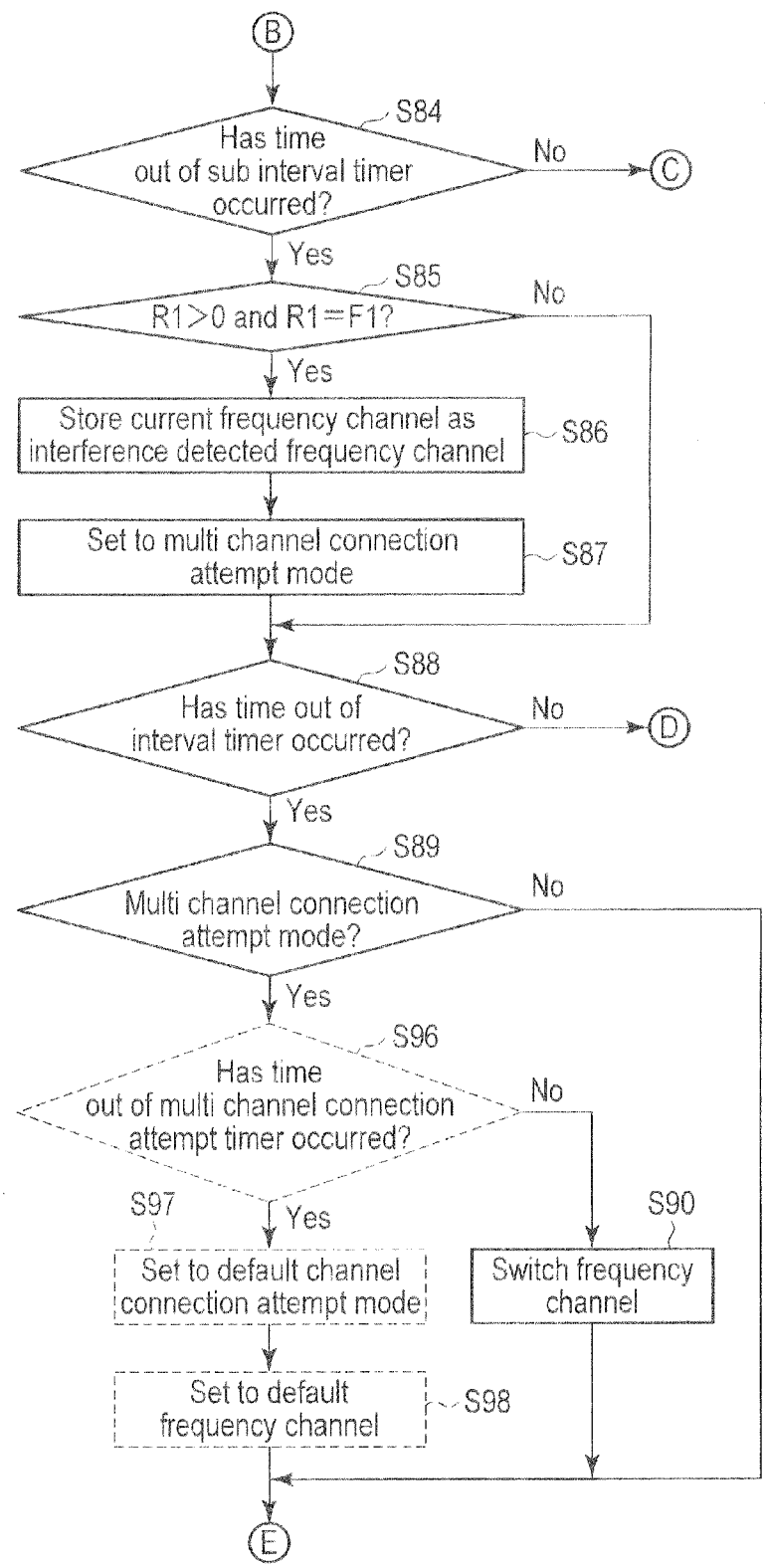
F I G. 5C

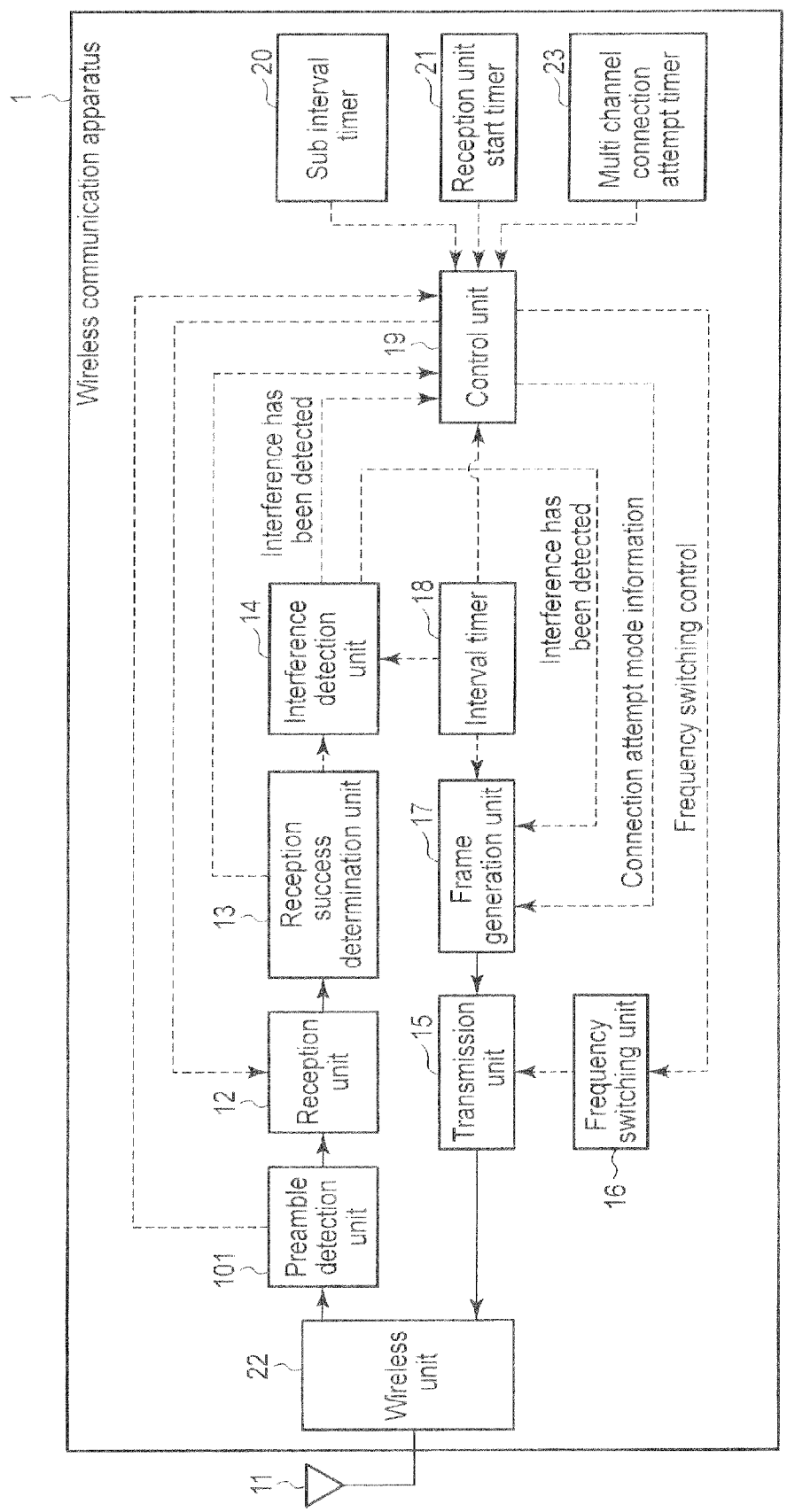
F I G. 6

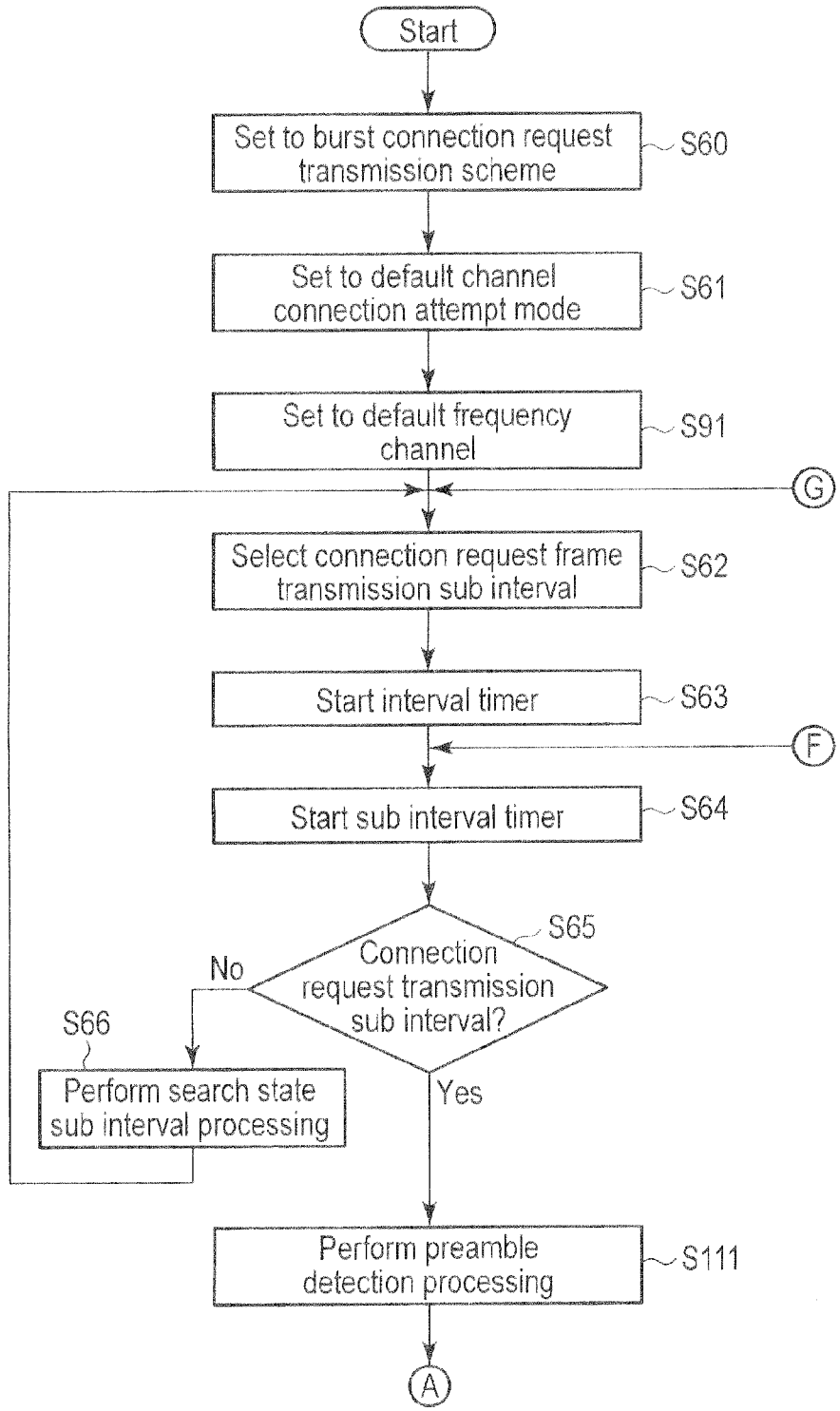
F I G. 7A

|  |  | MultiChReq | Interference | ACKPolicy (0:NoACK, 1:ImmACK) |
|---|---|---|---|---|
| Interference detected | Interference detected channel | 1 | 1 | 0 |
|  | Interference undetected channel | 1 | 0 | 1 |
| Interference undetected |  | 0 | 0 | 1 |

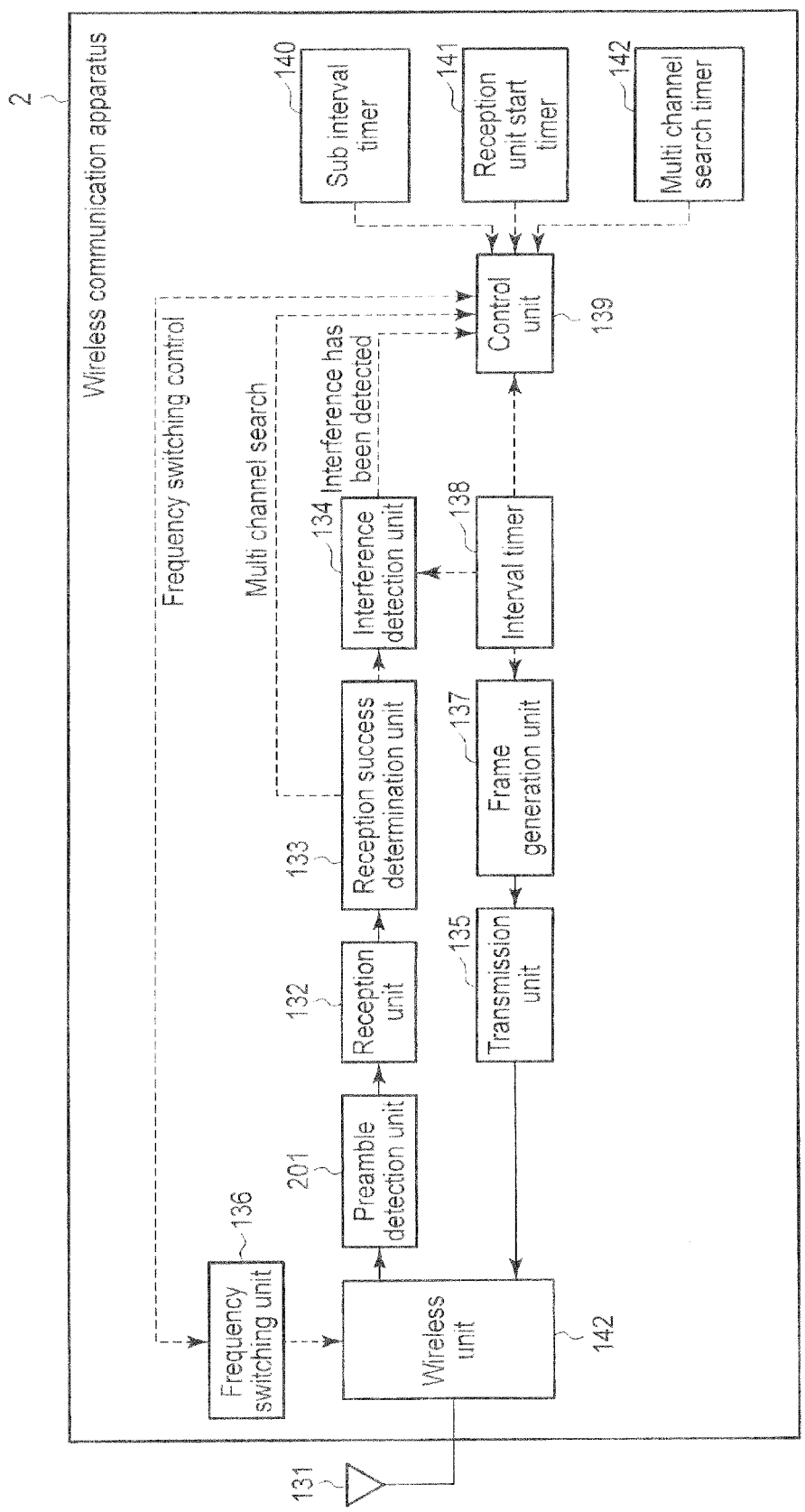
F I G. 13

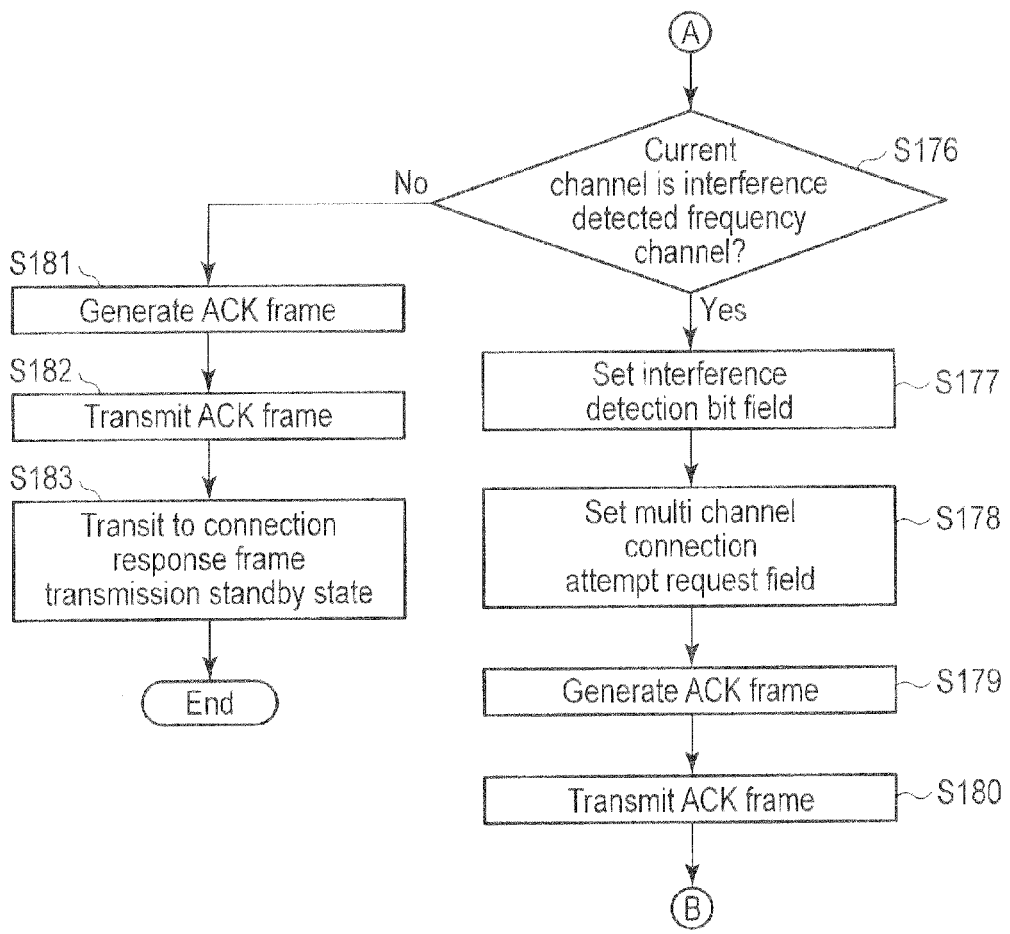
F I G. 14B

F I G. 15

| | Interference=0 | Interference=1 |
|---|---|---|
| MultiChReq=0 | <No interference has been detected in reception Ch.><br>•Transmit ACK(MultiChReqTxReq=0, Interference=0)<br>•Issue connection request reception notification to upper layer | Never happens<br>•Not send ACK response (although ACK policy of connection request frame=ImmACK, no response is sent)<br>•Not change Search mode |
| | <Interference has been detected in reception Ch.><br>•Transmit ACK(MultiChReqTxReq=1, Interference=0)<br>•Not issue connection request reception notification to upper layer | |
| MultiChReq=1 | <No interference has been detected in reception Ch.><br>•Transmit ACK(MultiChReqTxReq=0, Interference=0)<br>•Issue connection request reception notification to upper layer | •Not send ACK response (although ACK policy of connection request frame=ImmACK, no response is sent)<br>•Transit to multi channel search mode |
| | <Interference has been detected in reception Ch.><br>•Transmit ACK(MultiChReqTxReq=1, Interference=1)<br>•Not issue connection request reception notification to upper layer | |

F I G. 16

| | Interference=0 | Interference=1 |
|---|---|---|
| MultiChReq=0 | (a) Fix to frequency channel used to receive ACK<br>(b) Transit from burst connection request transmission scheme to intermittent connection request transmission scheme (connection response reception standby state) | Normally does not happen<br>(a) Not switch default/multi channel connection attempt modes<br>(b) Continue burst connection request transmission scheme |
| MultiChReq=1 | (a) Fix to frequency channel used to receive ACK<br>(b) Transit from burst connection request transmission scheme to intermittent connection request transmission scheme (connection response reception standby state) | (a) Transit to multi channel connection attempt mode<br>(b) Continue burst connection request transmission scheme |

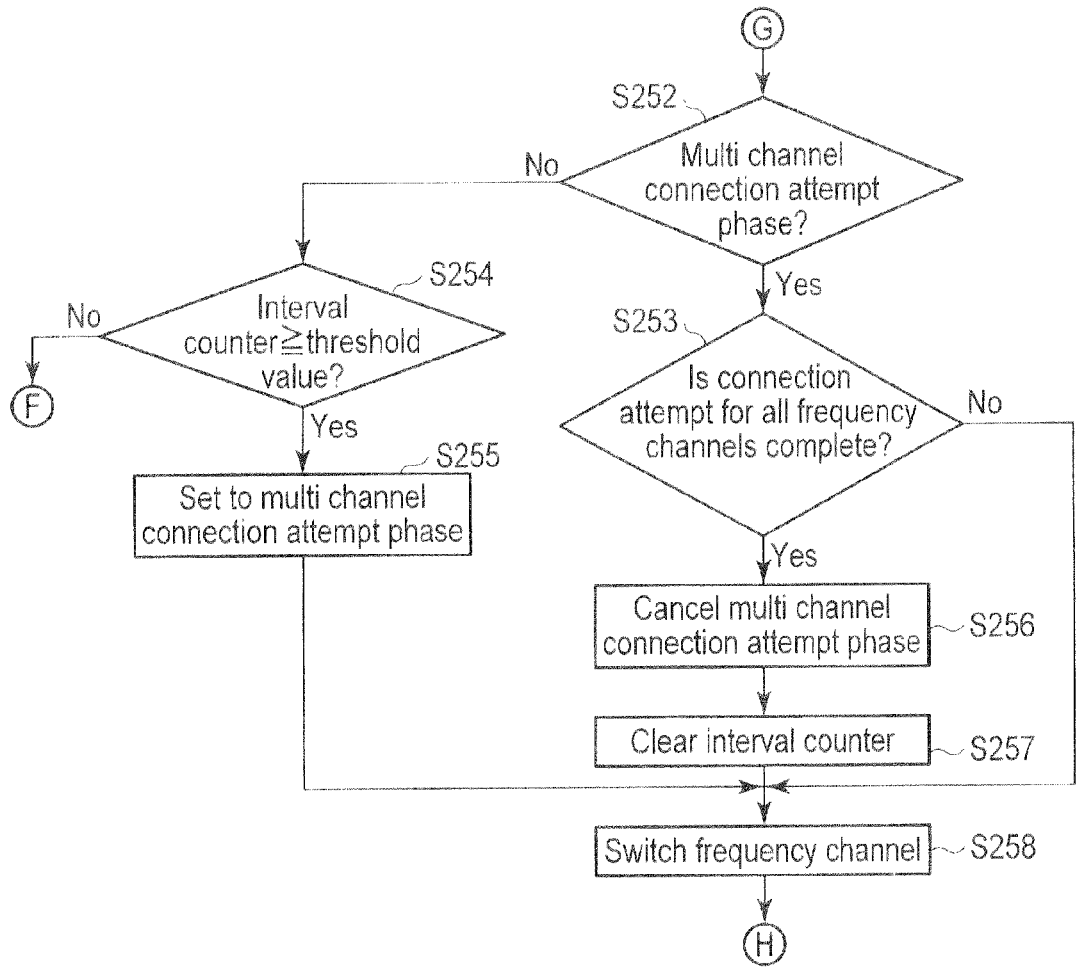
F I G. 18D

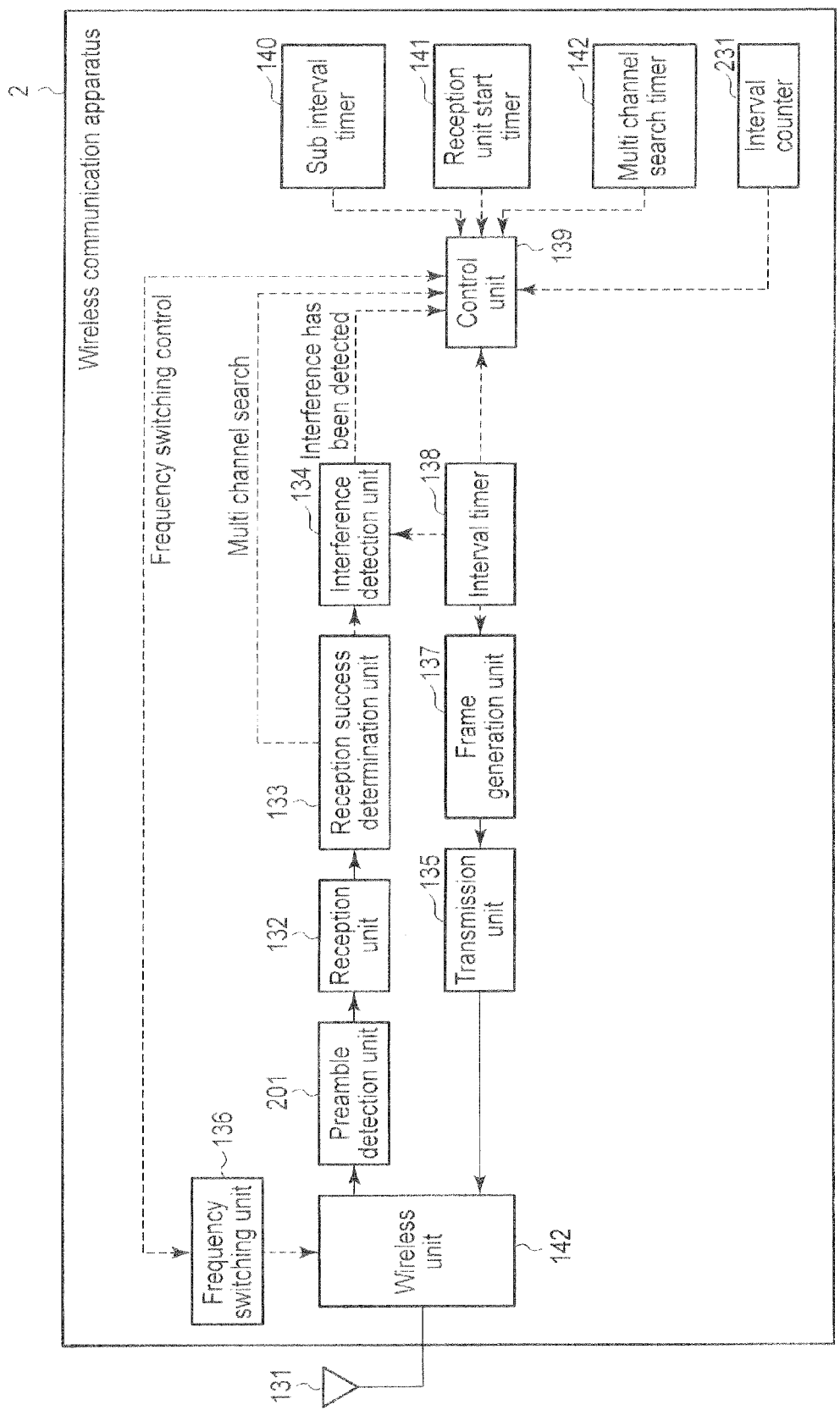
F I G. 21

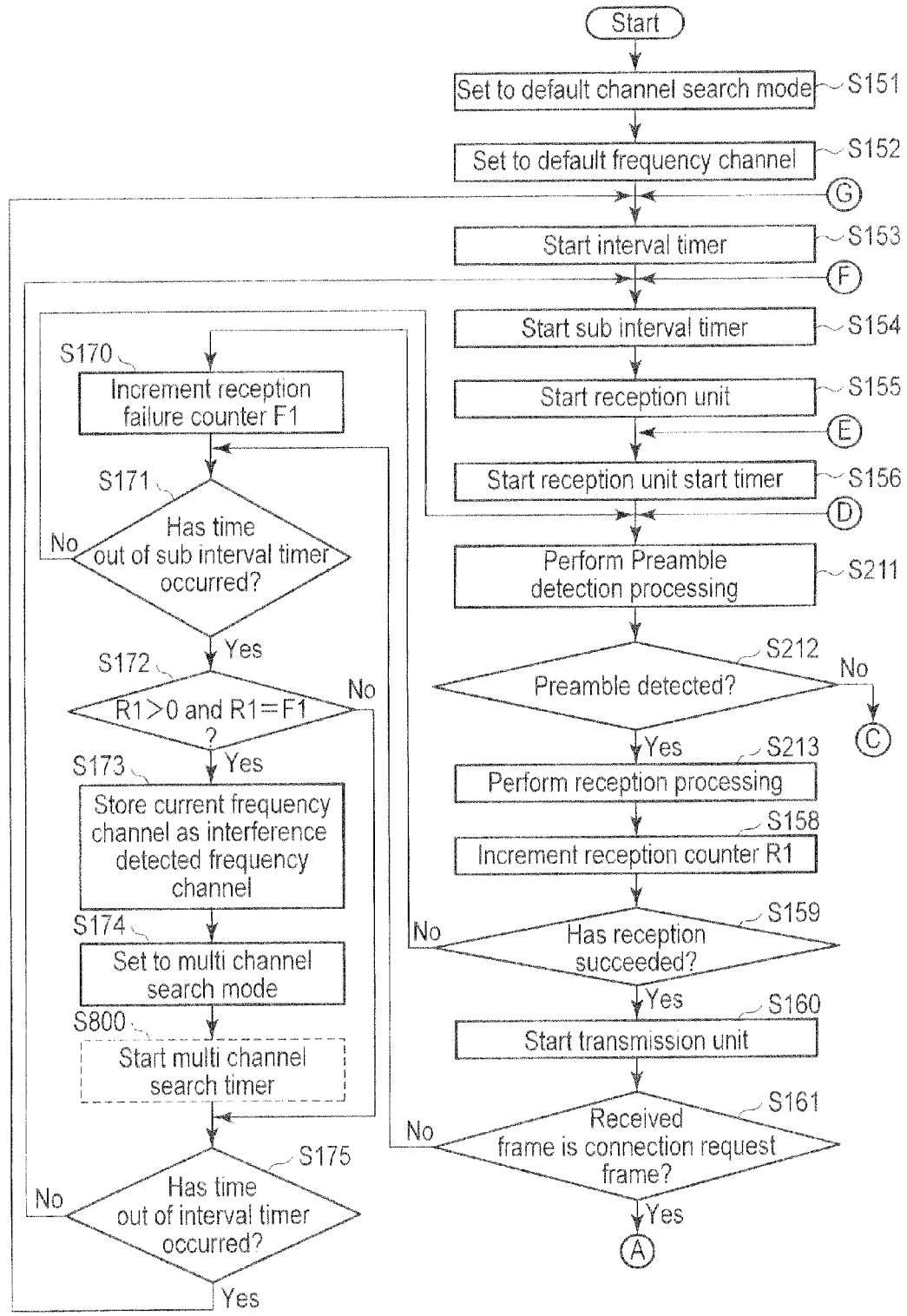
F I G. 22A

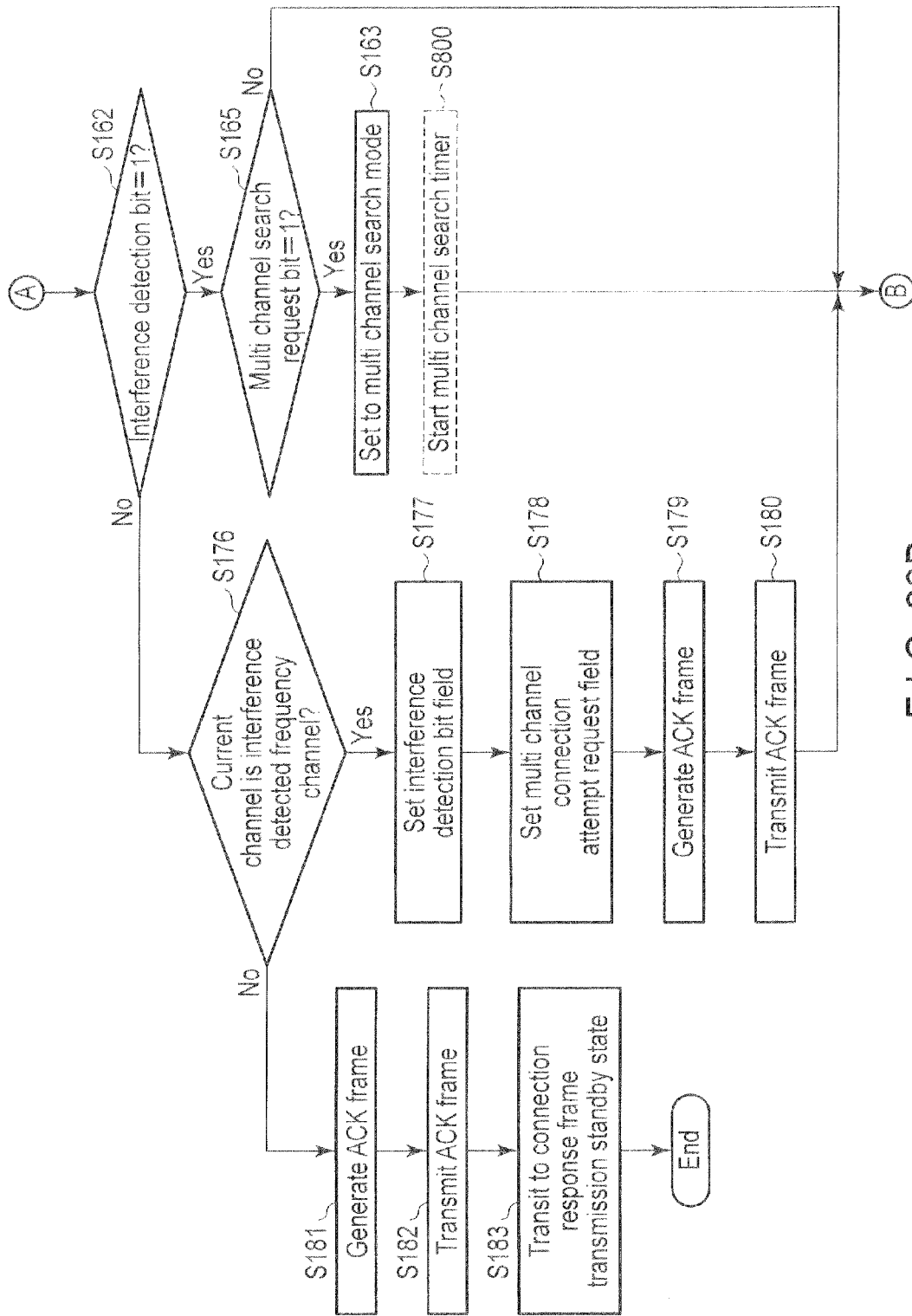
F I G. 22B

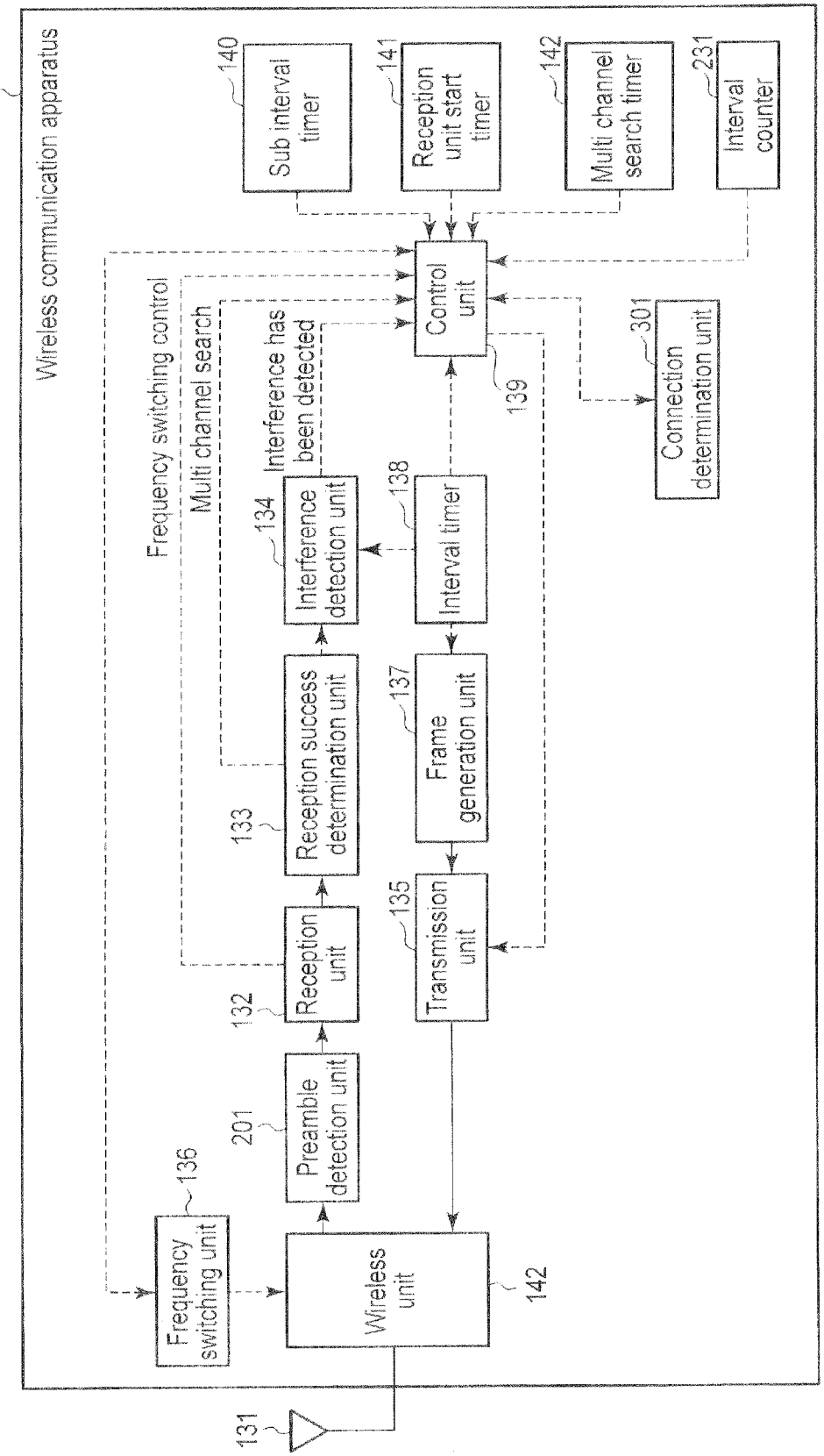
F I G. 25

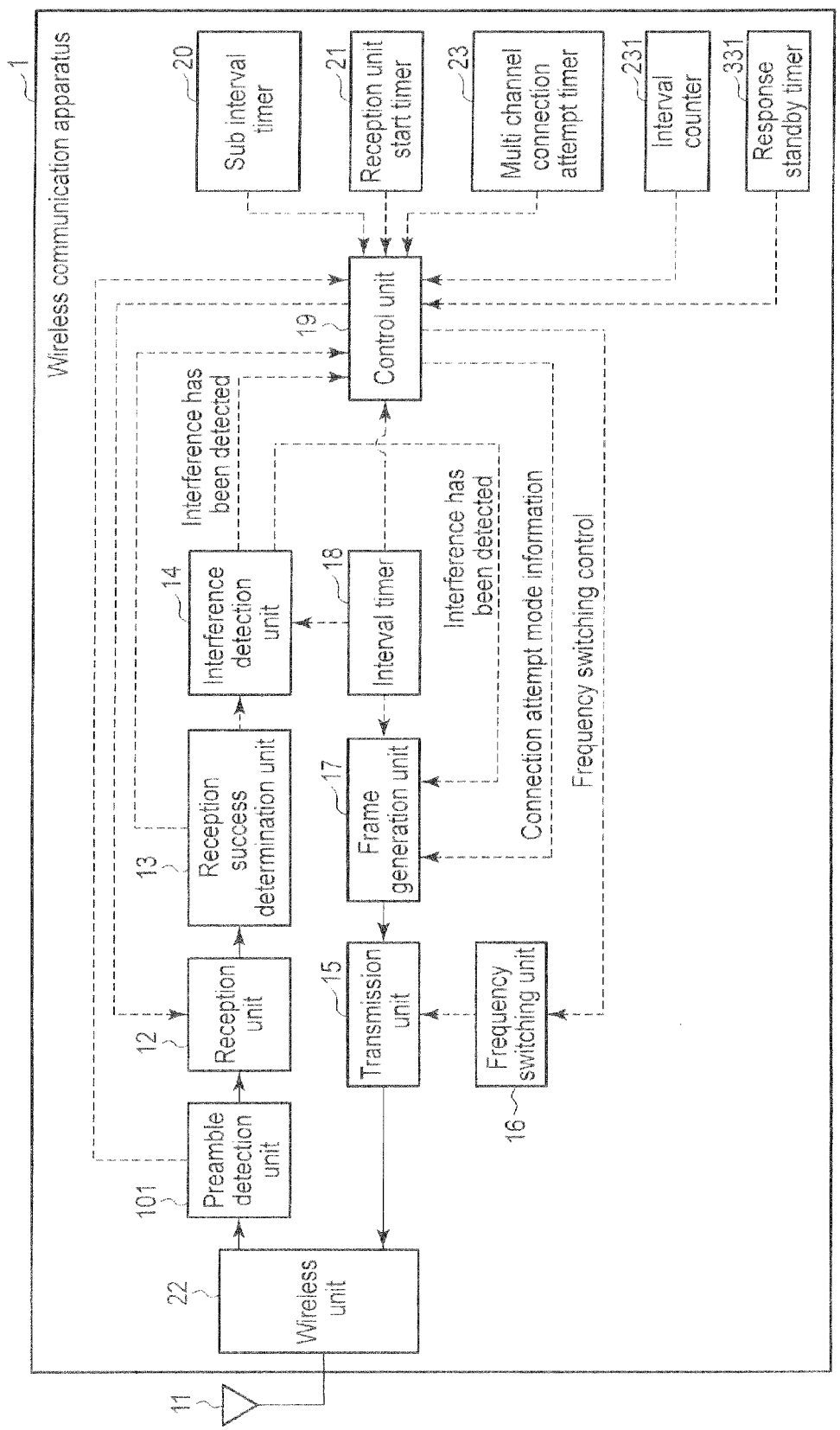
F I G. 27

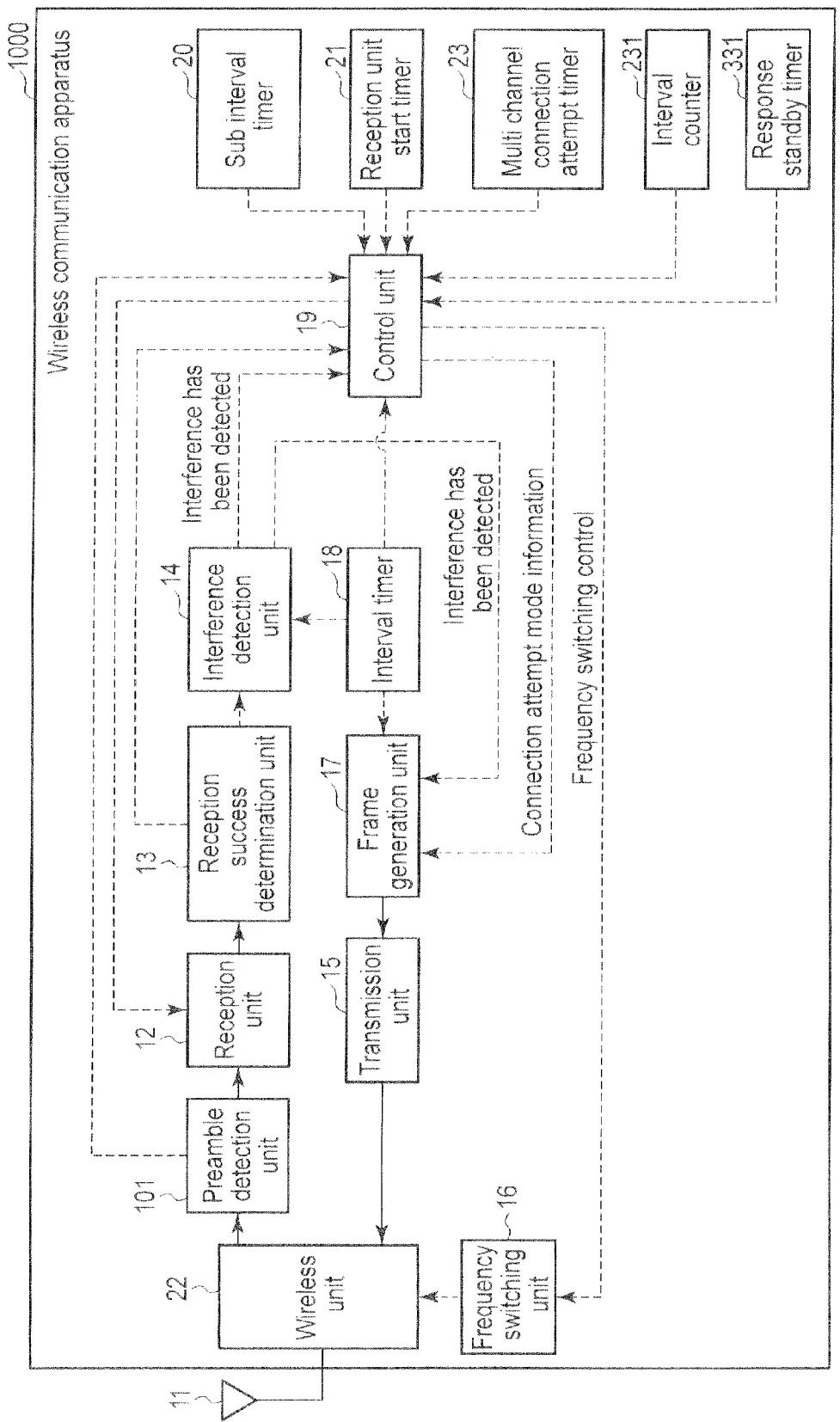
F I G. 29

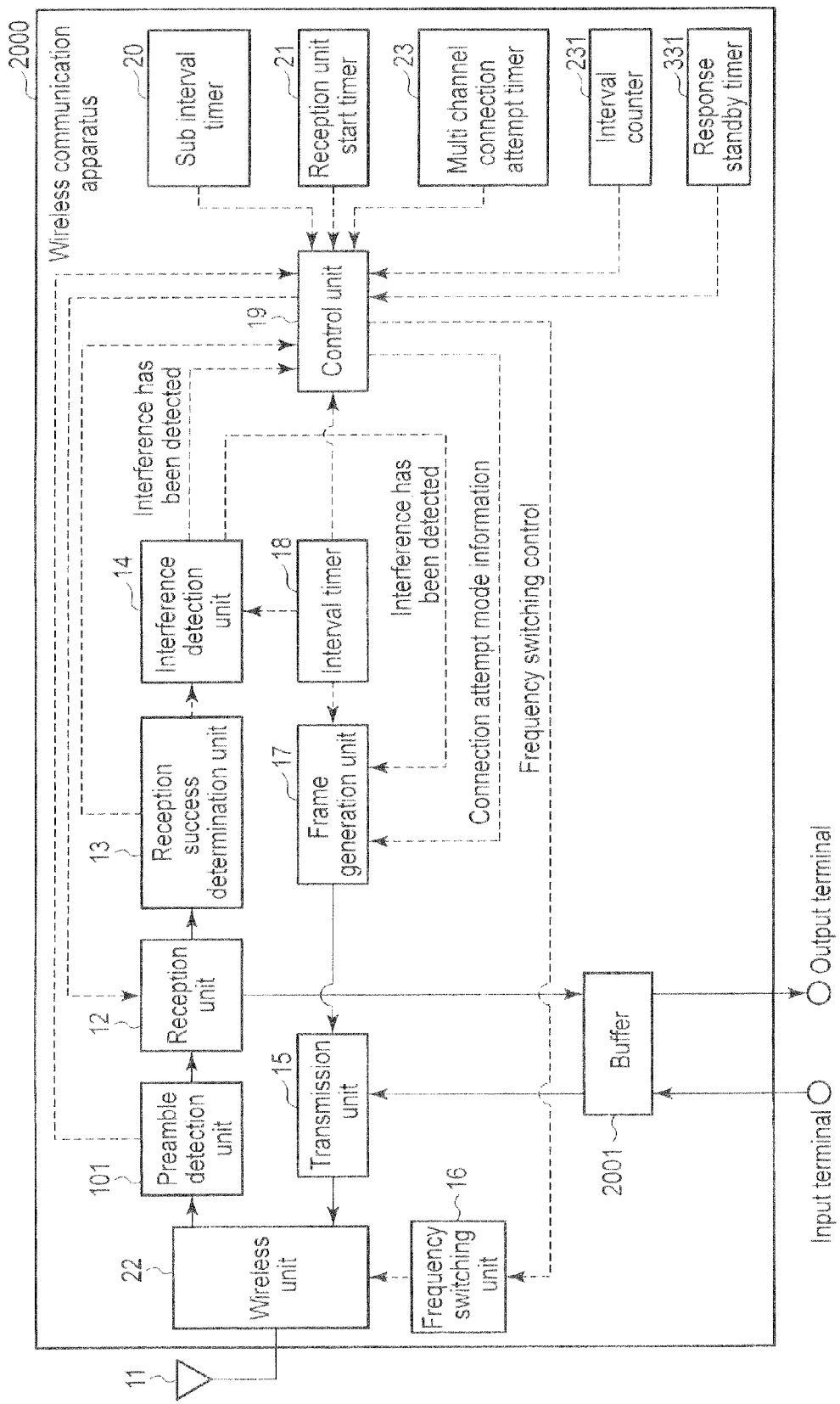
F I G. 30

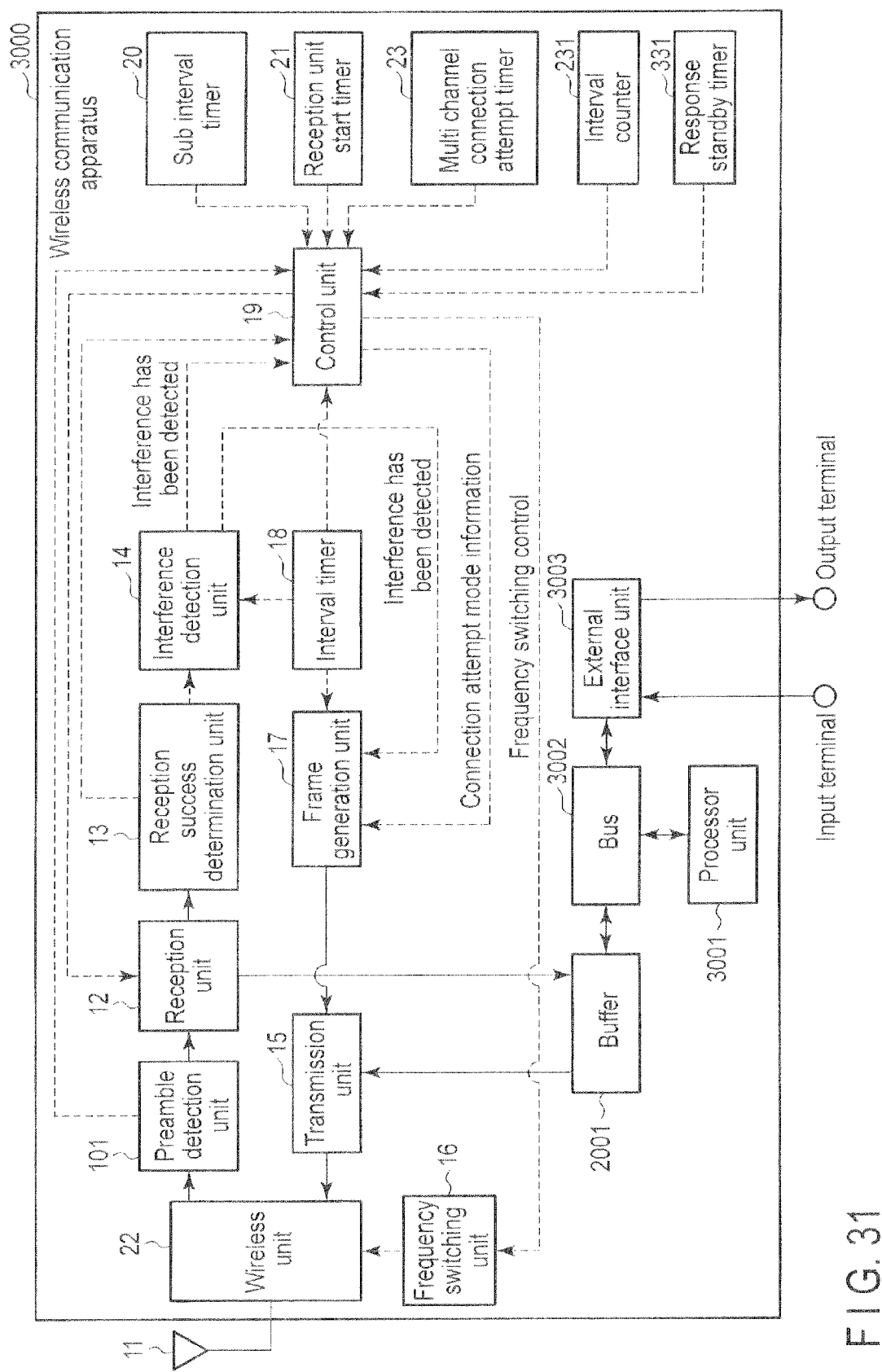
F I G. 31

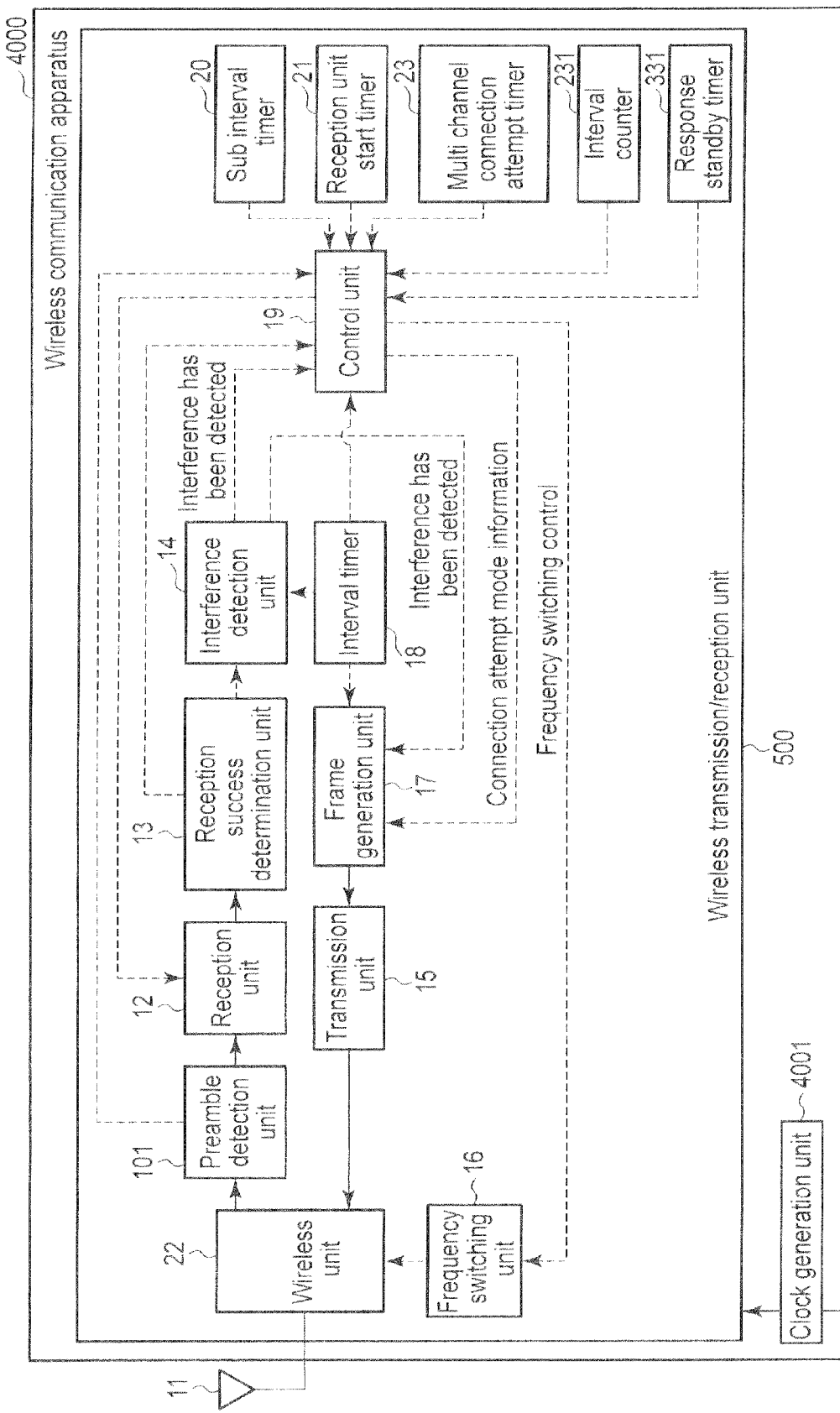
F I G. 32

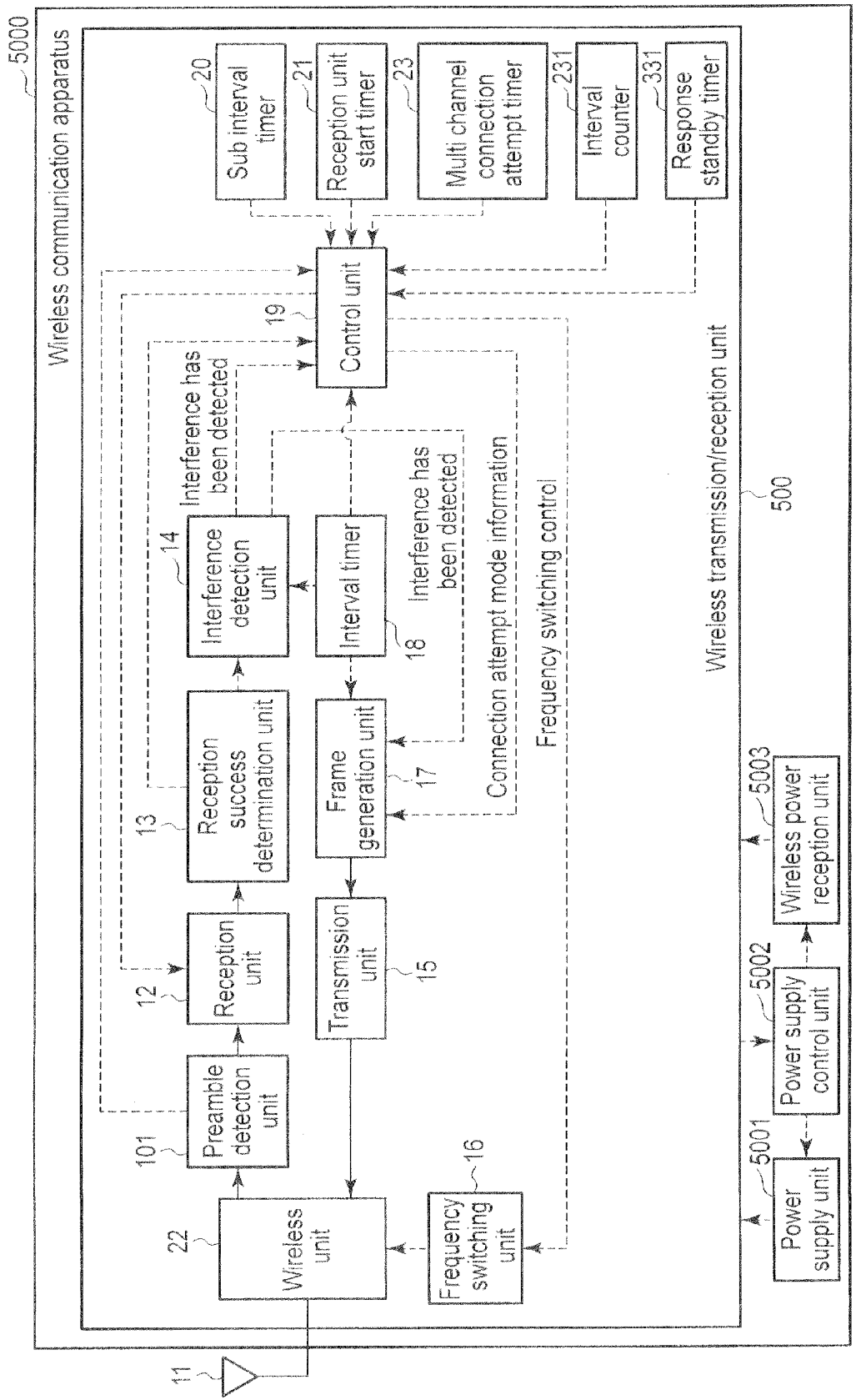
F I G. 33

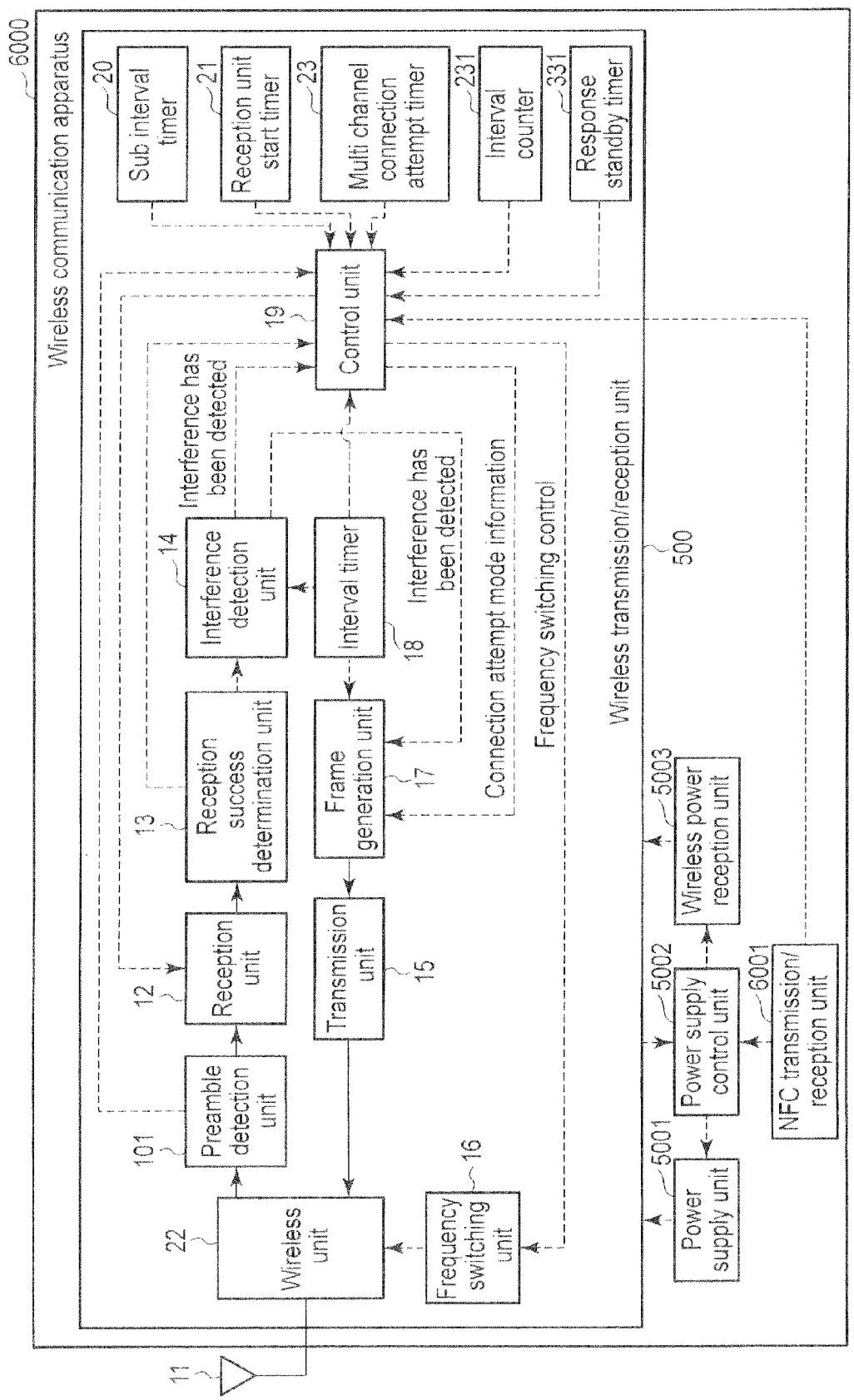
F I G. 34

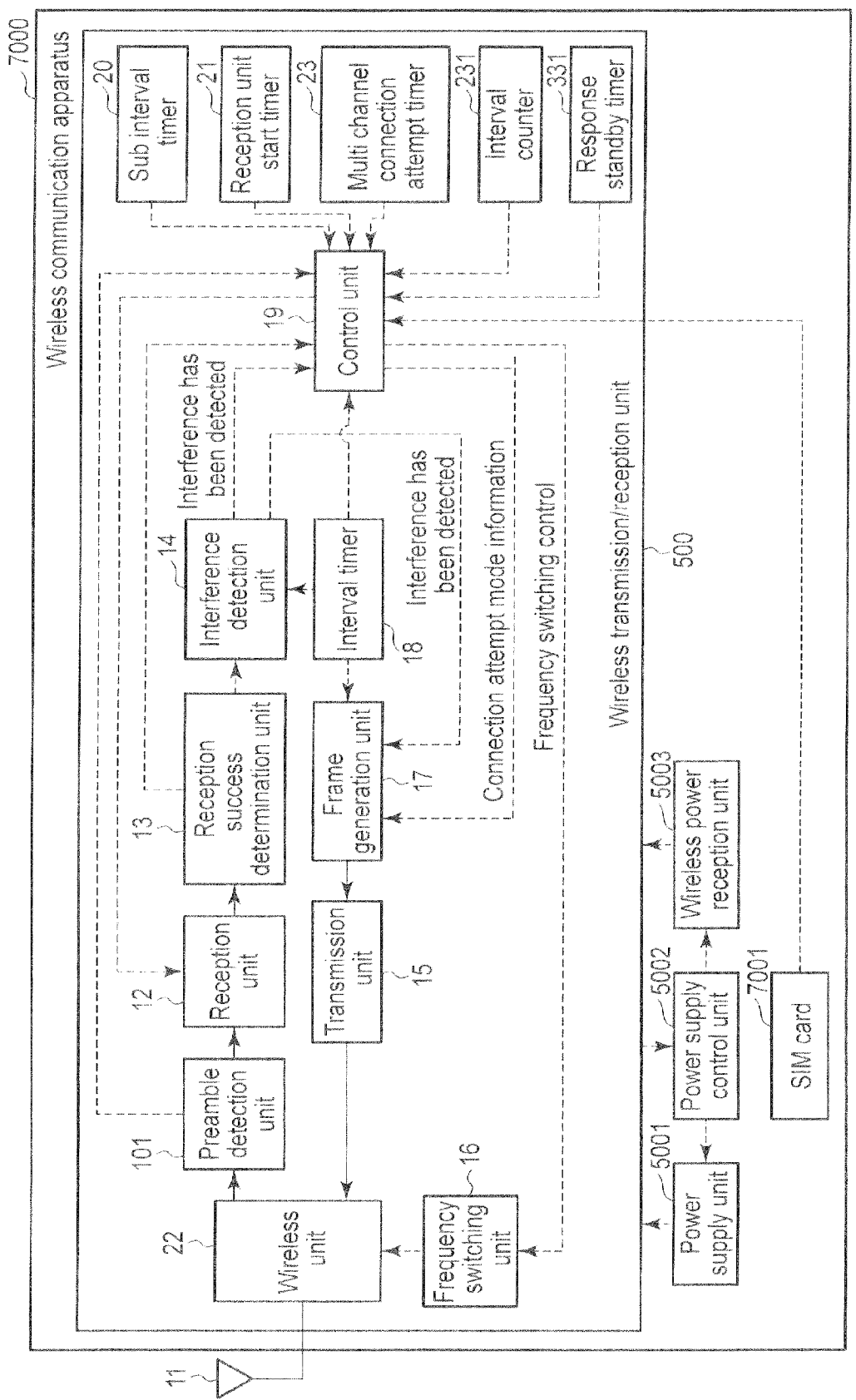
F I G. 35

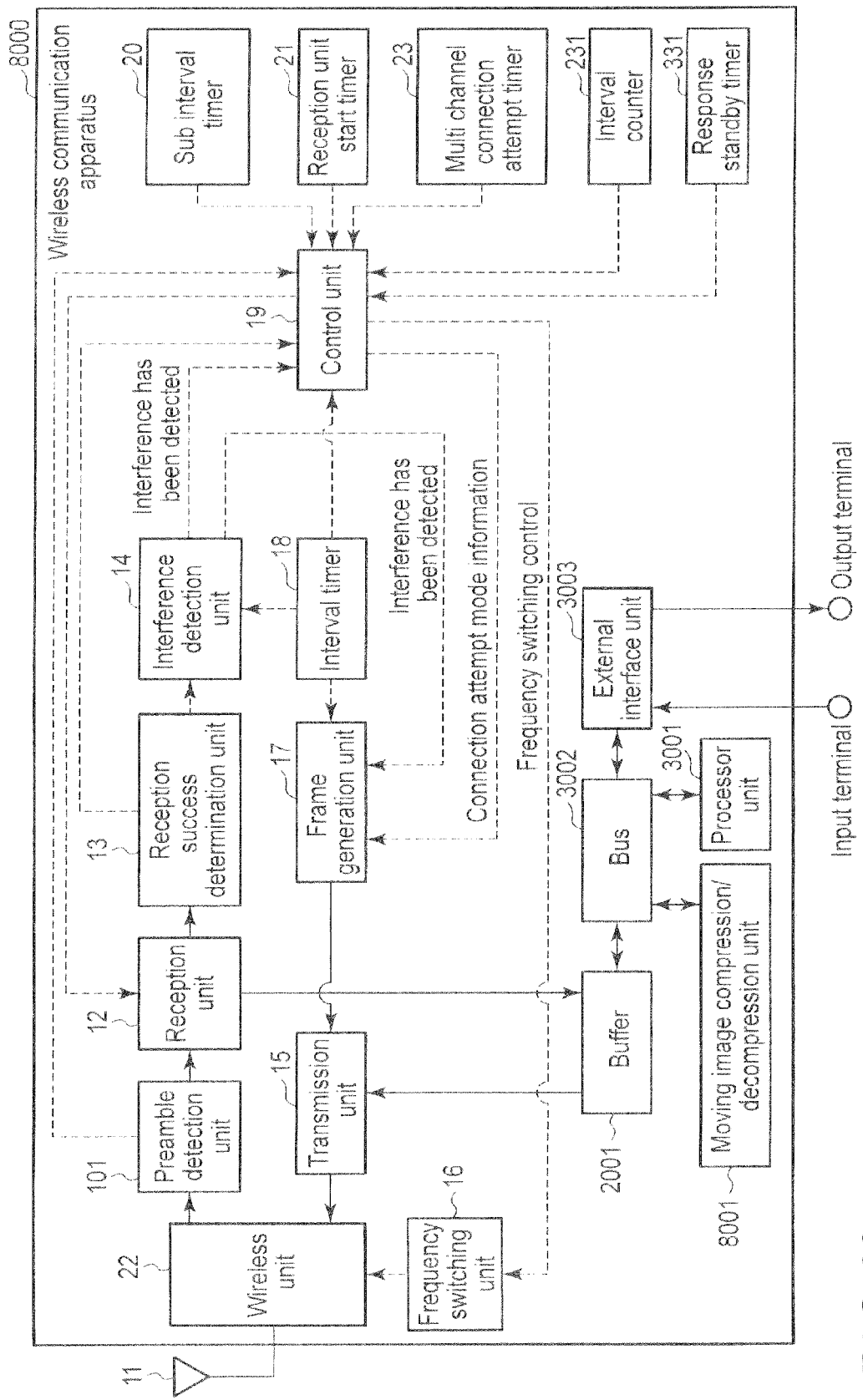
F I G. 36

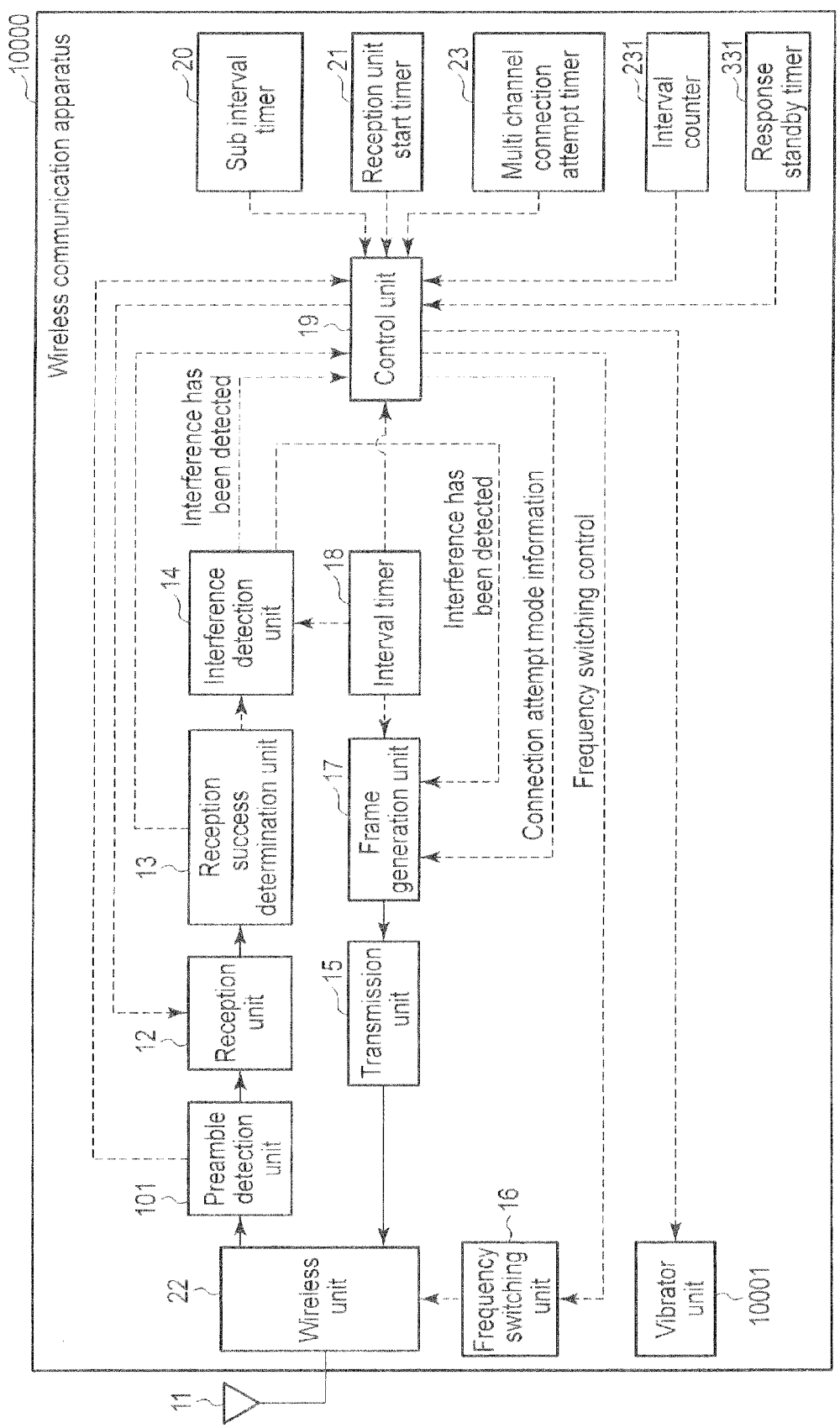
F I G. 38

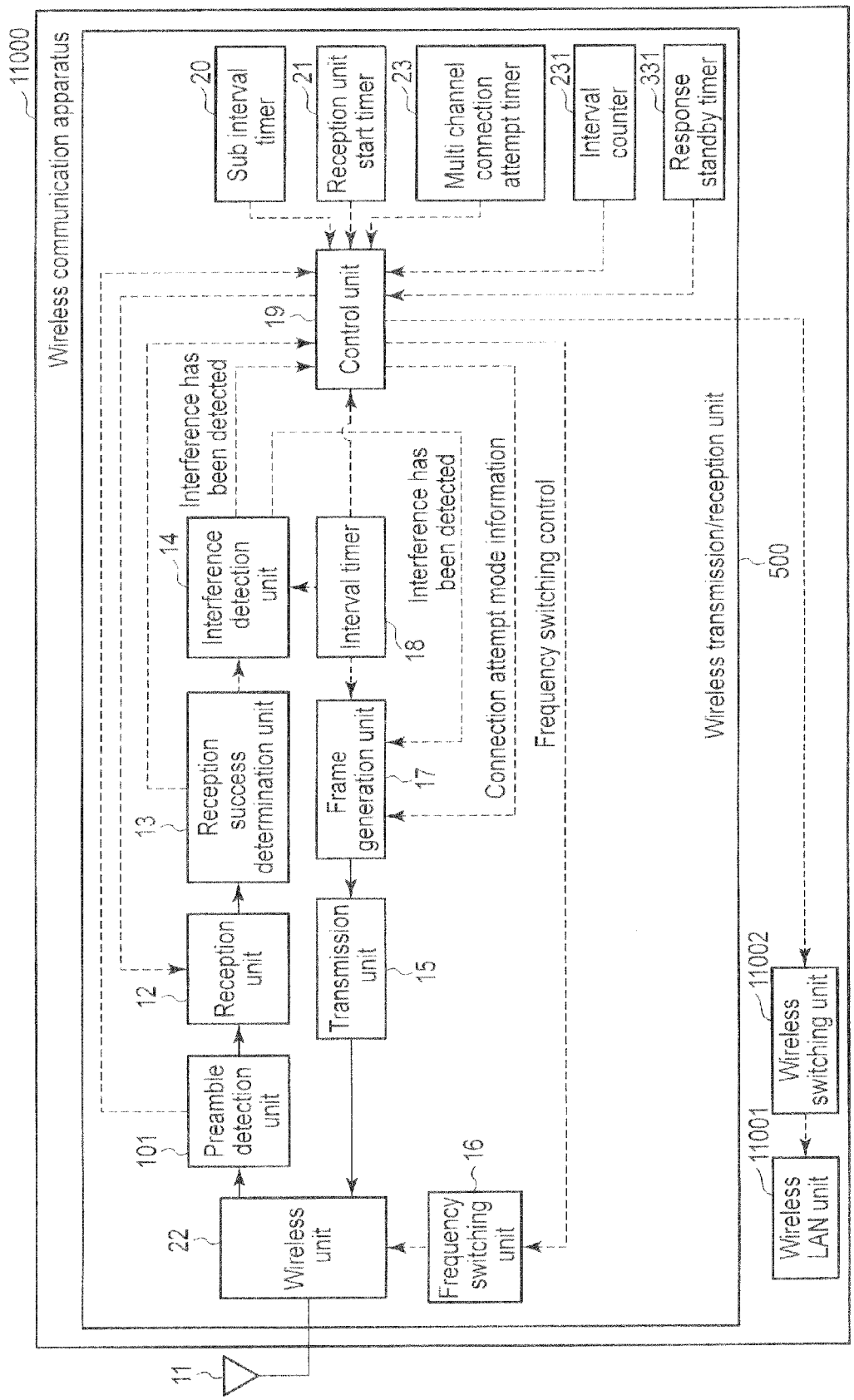
F I G. 39

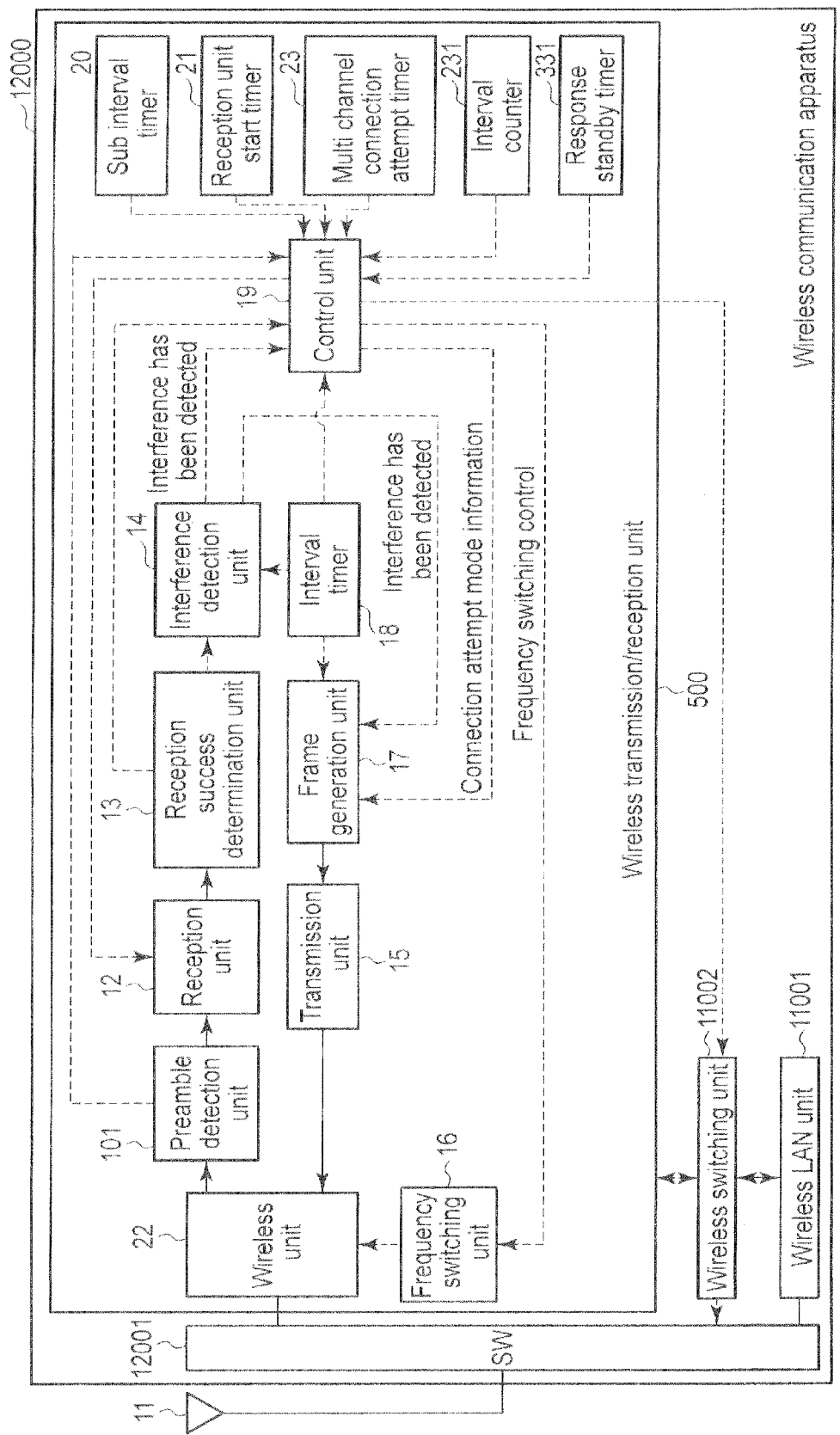
F I G. 40

WIRELESS COMMUNICATION APPARATUS OPERABLE IN DIFFERENT CONNECTION ATTEMPT STATES BASED ON DETECTION OF INTERFERENCE

CROSS-REFERENCE TO RELATED APPLICATIONS

This application is based upon and claims the benefit of priority from prior Japanese Patent Application No. 2011-042689, filed Feb. 28, 2011, the entire contents of which are incorporated herein by reference.

FIELD

Embodiments described herein relate generally to a wireless communication apparatus which performs near field wireless communication

BACKGROUND

The following wireless communication apparatuses are known. That is, one wireless communication apparatus notifies another wireless communication apparatus that it has suffered interference, thereby making wireless communication while avoiding a frequency channel in which interference has occurred. The wireless communication apparatuses share information about frequency channels other than the frequency channel in which interference has occurred, and then restart wireless communication by shifting to another frequency channel in which no interference has occurred.

BRIEF DESCRIPTION OF THE DRAWINGS

FIG. 2 is a block diagram showing a schematic configuration of the wireless communication apparatus according to the embodiment;

FIG. 5C is a flowchart illustrating the connection attempt processing before wireless connection;

FIG. 6 is a block diagram showing a configuration example obtained by adding a preamble detection unit to the wireless communication apparatus of FIG. 2;

FIG. 7A is a flowchart illustrating a modification example of the connection attempt processing before wireless connection of FIGS. 5A to 5C;

FIG. 9 is a table for summarizing setting values of a multi-channel search request field, an interference detection field, and an ACK policy field of the connection request frame;

FIG. 13 is a block diagram showing a configuration example obtained by adding a preamble detection unit to the wireless communication apparatus of FIG. 11;

FIG. 14B is a flowchart illustrating the modification example of the search processing before wireless connection of FIGS. 12A to 12C;

FIG. 15 is a table showing operations corresponding to the values of the multi-channel search request field (Multi-ChReq) and interference detection field (Interference) of a connection request frame;

FIG. 16 is a table showing operations corresponding to the values of the multi-channel connection attempt request field (MultiChReq) and interference detection field (Interference) of an ACK frame;

FIG. 18D is a flowchart illustrating the modification example of the connection attempt processing before wireless connection of FIGS. 7A to 7D;

FIG. 21 is a block diagram showing a configuration example obtained by adding an interval counter to the wireless communication apparatus of FIG. 13;

FIG. 22A is a flowchart illustrating a modification example of the search processing before wireless connection shown in FIGS. 14A to 14C;

FIG. 22B is a flowchart illustrating the modification example of the search processing before wireless connection shown in FIGS. 14A to 14C;

FIG. 25 is a block diagram showing a configuration example obtained by adding a connection determination unit to the wireless communication apparatus of FIG. 21;

FIG. 27 is a block diagram showing a configuration example obtained by adding a response standby timer to the wireless communication apparatus of FIG. 17;

FIG. 29 is a block diagram schematically showing a wireless communication apparatus according to the seventh embodiment;

FIG. 30 is a block diagram schematically showing a wireless communication apparatus according to the eighth embodiment;

FIG. 31 is a block diagram schematically showing a wireless communication apparatus according to the ninth embodiment;

FIG. 32 is a block diagram schematically showing a wireless communication apparatus according to the 10th embodiment;

FIG. 33 is a block diagram schematically showing a wireless communication apparatus according to the 11th embodiment;

FIG. 34 is a block diagram schematically showing a wireless communication apparatus according to the 12th embodiment;

FIG. 35 is a block diagram schematically showing a wireless communication apparatus according to the 13th embodiment;

FIG. 36 is a block diagram schematically showing a wireless communication apparatus according to the 14th embodiment;

FIG. 38 is a block diagram schematically showing a wireless communication apparatus according to the 16th embodiment;

FIG. 39 is a block diagram schematically showing a wireless communication apparatus according to the 17th embodiment; and FIG. 40 is a block diagram schematically showing a wireless communication apparatus according to the 18th embodiment.

DETAILED DESCRIPTION

In general, according to one embodiment, there is provided a wireless communication apparatus for making wireless connection in the first connection attempt state in which a connection request is attempted using a predetermined frequency channel or the second connection attempt state in which a connection request is attempted using a plurality of frequency channels. An interference detection unit detects occurrence of interference in one of the plurality of frequency channels. A frame generation unit generates a connection request frame which includes the first field for requesting a search of the plurality of frequency channels in response to occurrence of interference, and the second field indicating whether a corresponding frequency channel is a channel in which occurrence of interference has been detected. A transmission unit transmits the connection request frame using the predetermined frequency channel in the first connection attempt state, and transmits the connection request frame using the plurality of frequency channels in the second connection attempt state. A control unit transits to the second connection attempt state in response to occurrence of interference.

First Embodiment

Figure 1:
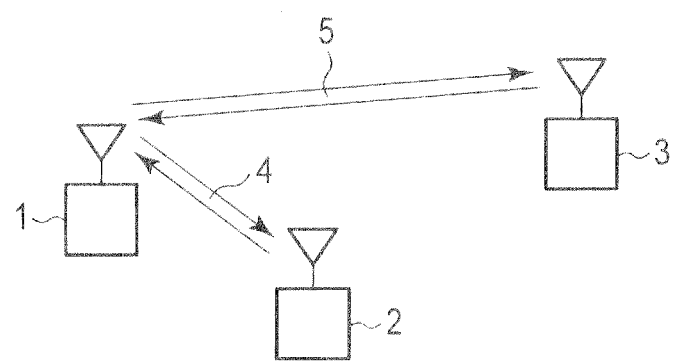
FIG. 1 is a block diagram showing a case in which wireless communication apparatuses according to an embodiment wirelessly communicate with each other.

FIG. 1 is a block diagram showing a case in which wireless communication apparatuses 1 to 3 according to the embodiment wirelessly communicate with each other. Referring to FIG. 1, the wireless communication apparatus 1 connects with the wireless communication apparatus 2 to perform a series of frame transmission/reception operations 4, and executes disconnection processing after the series of frame transmission/reception operations 4 ends. Then, the wireless communication apparatus 1 connects with the wireless communication apparatus 3 to perform a series of frame transmission/reception operations 5, and executes disconnection processing after the series of frame transmission/reception operations 5 ends. In this way, after a wireless communication apparatus ends wireless communication with another wireless communication apparatus, it makes wireless communication with still another wireless communication apparatus.

FIG. 2 is a block diagram showing a schematic configuration of the wireless communication apparatus according to the embodiment. The wireless communication apparatus 1 of FIG. 2 includes an antenna 11, a wireless unit 22, a reception unit 12, a reception success determination unit 13, an interference detection unit 14, a transmission unit 15, a frequency switching unit 16, a frame generation unit 17, an interval timer 18, a control unit 19, a sub-interval timer 20, a reception unit start timer 21, and a multi-channel connection attempt timer 23.

Figures 3, 4:
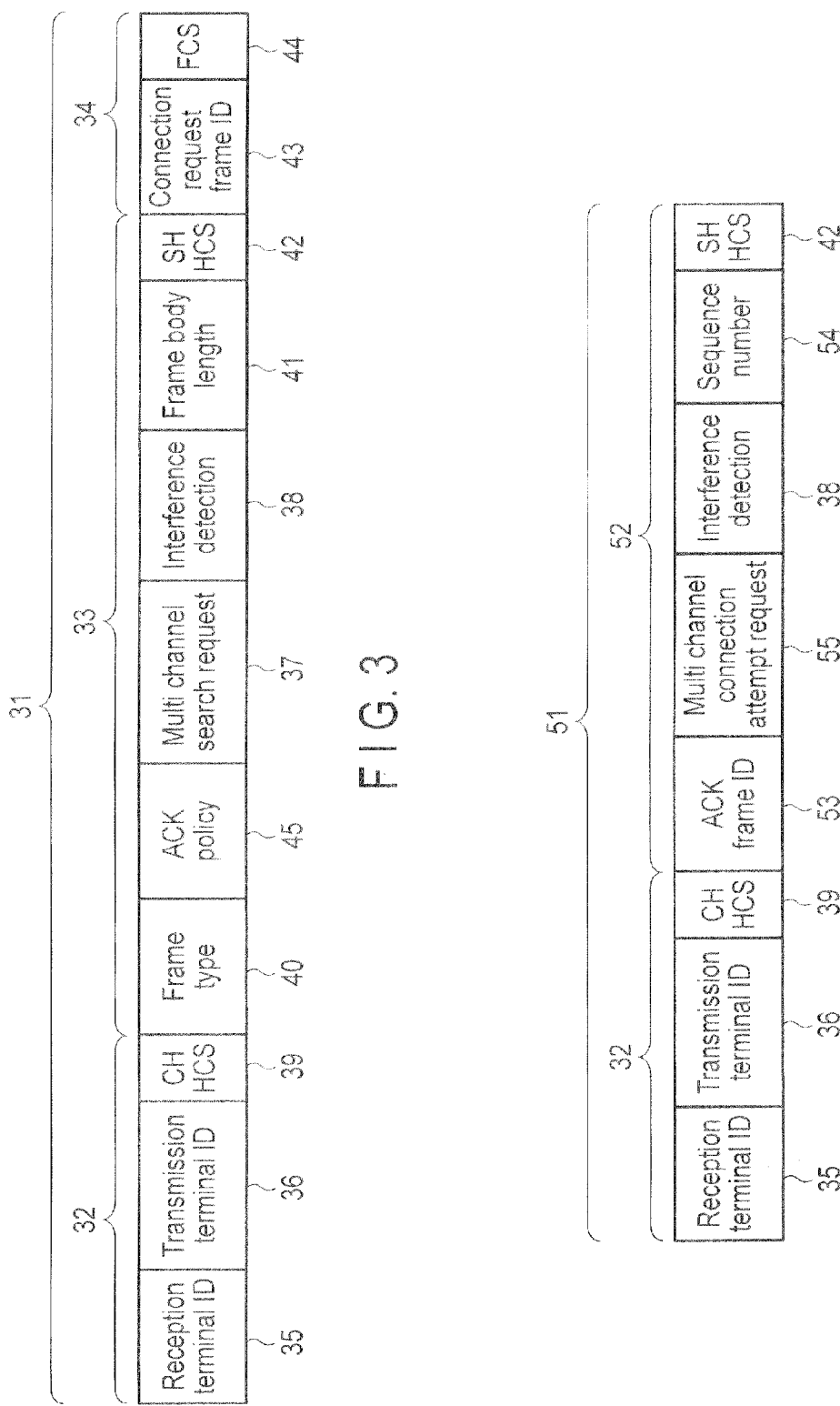
FIG. 3 is a view showing a frame format of a connection request frame transmitted by the wireless communication apparatus.
FIG. 4 is a view showing a frame format of an ACK frame transmitted by the wireless communication apparatus.

FIG. 3 is a view showing a frame format of a connection request frame transmitted by the wireless communication apparatus 1. A connection request frame 31 includes a common header 32, a sub header 33, and a frame body 34. The common header 32 includes a reception terminal ID field 35, a transmission terminal ID field 36, and a common header header check sequence (CH HCS) 39. The sub header 33 includes a frame type field 40, an ACK policy field 45, a multi-channel search request field 37, an interference detection field 38, a frame body length field 41, and a sub header header check sequence (SH HCS) 42. The frame body 34 includes a frame body field 43 containing a connection request frame ID, and a frame check sequence (FCS) 44. The ID of a reception terminal is set in the reception terminal ID field 35. Since, however, a connection partner terminal is not determined when the connection request frame is transmitted, a predetermined value such as a broadcast ID or paging ID which does not specify a terminal is set in the field 35. The ID of a terminal which transmits the connection request frame is set in the transmission terminal ID field 36. A parity bit serving as an error detection code such as a CRC (Cyclic Redundancy Check) code for the reception terminal ID field 35 and transmission terminal ID field 36 is set in the common header header check sequence (CH HCS) 39. A predetermined value indicating a management frame into which the connection request frame is classified is set in the frame type field 40. The ACK policy field 45 indicates the presence/absence of an ACK frame response to the connection request frame. If "0" is set, the ACK policy field 45 represents "NoACK" to indicate that it is unnecessary to send an ACK frame response to the connection request frame. If "1" is set, the ACK policy field 45 represents "ImmACK" to indicate that it is necessary to send an ACK frame response to the connection request frame when the SIFS (Short Inter-Frame Space) time elapses. If a multi-channel search is requested, "1" is set in the multi-channel search request field 37; otherwise, "0" is set in the field 37. If the connection request frame is transmitted using a frequency channel in which interference has been detected, "1" is set in the interference detection field 38. Alternatively, if the connection request frame is transmitted using a frequency channel in which no interference has been detected, "0" is set in the field 38. The frame body length field 41 indicates the byte length of the frame body field 43. A parity bit serving as an error detection code such as a CRC code for the frame type field 40, ACK policy field 45, multi-channel search request field 37, interference detection field 38, and frame body length field 41 is set in the sub header header check sequence (SH HCS) 42. A predetermined connection request frame ID is set in the frame body 34. A parity bit serving as an error detection code such as a CRC code for the frame body field is set in the frame check sequence (FCS) 44.

In the frame format of the connection request frame shown in FIG. 3, the multi-channel search request field 37 and interference detection field 38 are included in the sub header. These fields, however, may be included in the common header 32 or frame body 34.

FIG. 4 is a view showing a frame format of an ACK frame transmitted by the wireless communication apparatus 1. An ACK frame 51 includes a common header 32 and a sub header 52. The common header 32 includes a reception terminal ID field 35, transmission terminal ID field 36, and common header header check sequence (CH HCS) 39. The sub header 52 includes an ACK frame ID field 53, multi-channel connection attempt request field 55, interference detection field 38, sequence number field 54, and sub header header check sequence (SH HCS) 42.

The ID of a reception terminal which receives the ACK frame is set in the reception terminal ID field 35. The ID of a terminal which transmits the ACK frame is set in the transmission terminal ID field 36. A parity bit serving as an error detection code such as a CRC code for the reception terminal ID field 35 and transmission terminal ID field 36 is set in the common header header check sequence (CH HCS) 39. The ACK frame ID field 53 serves as a frame type field in which a predetermined value indicating an ACK frame is set. If a multi-channel connection attempt is requested, "1" is set in the multi-channel connection attempt request field 55; otherwise, "0" is set in the field 55. If the ACK frame is transmitted using a frequency channel in which interference has been detected, "1" is set in the interference detection field 38. Alternatively, if the ACK frame is transmitted using a frequency channel in which no interference has been detected, "0" is set in the field 38. A parity bit serving as an error detection code such as a CRC code for the ACK frame ID field 53, multi-channel connection attempt request field 55, and interference detection field 38 is set in the sub header header check sequence (SH HCS) 42.

In the frame format of the ACK frame shown in FIG. 4, the multi-channel connection attempt request field 55 and interference detection field 38 are included in the sub header. These fields, however, may be included in the common header 32.

Figure 5A:
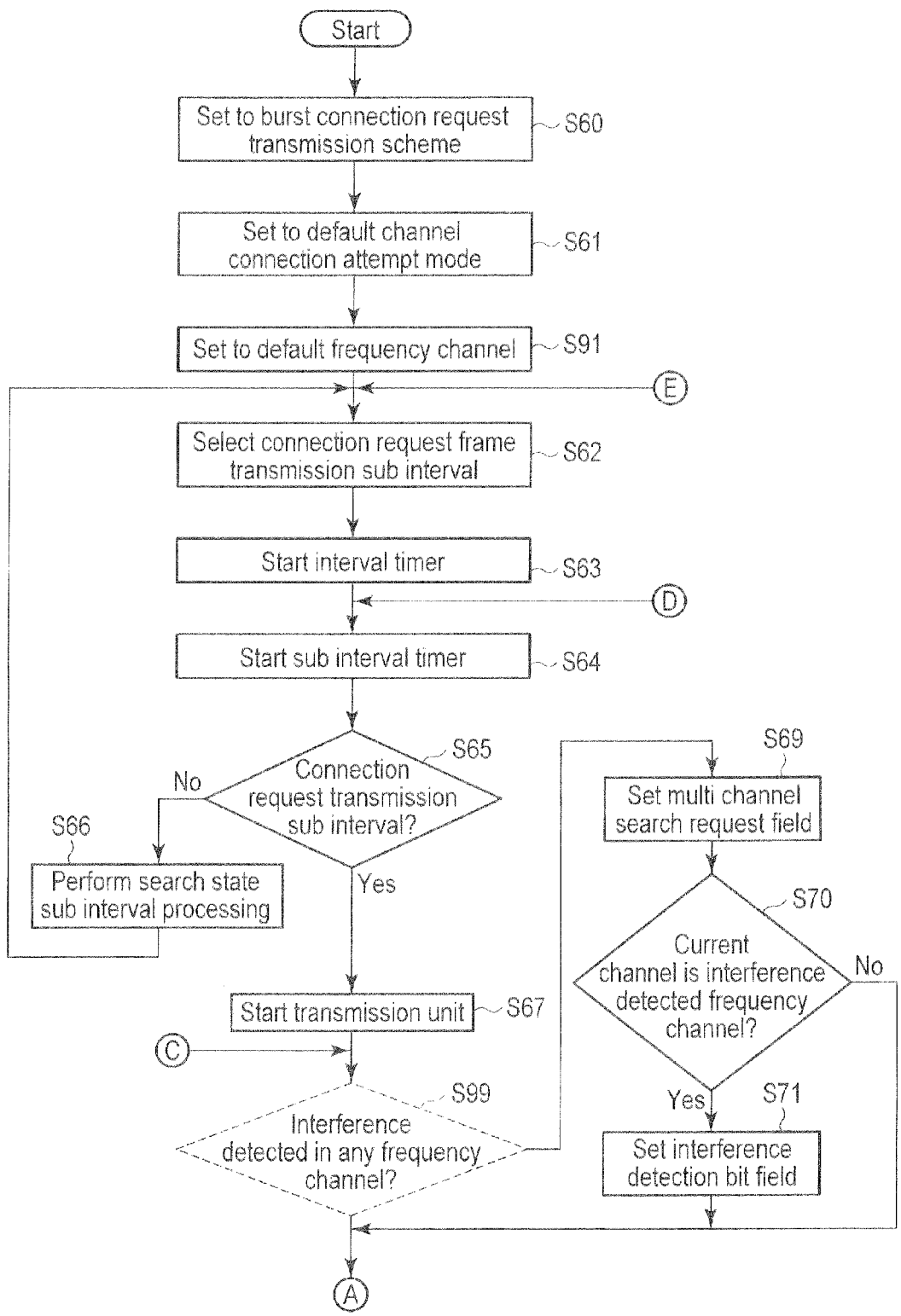
FIG. 5A is a flowchart illustrating connection attempt processing before wireless connection.
Figure 5B:
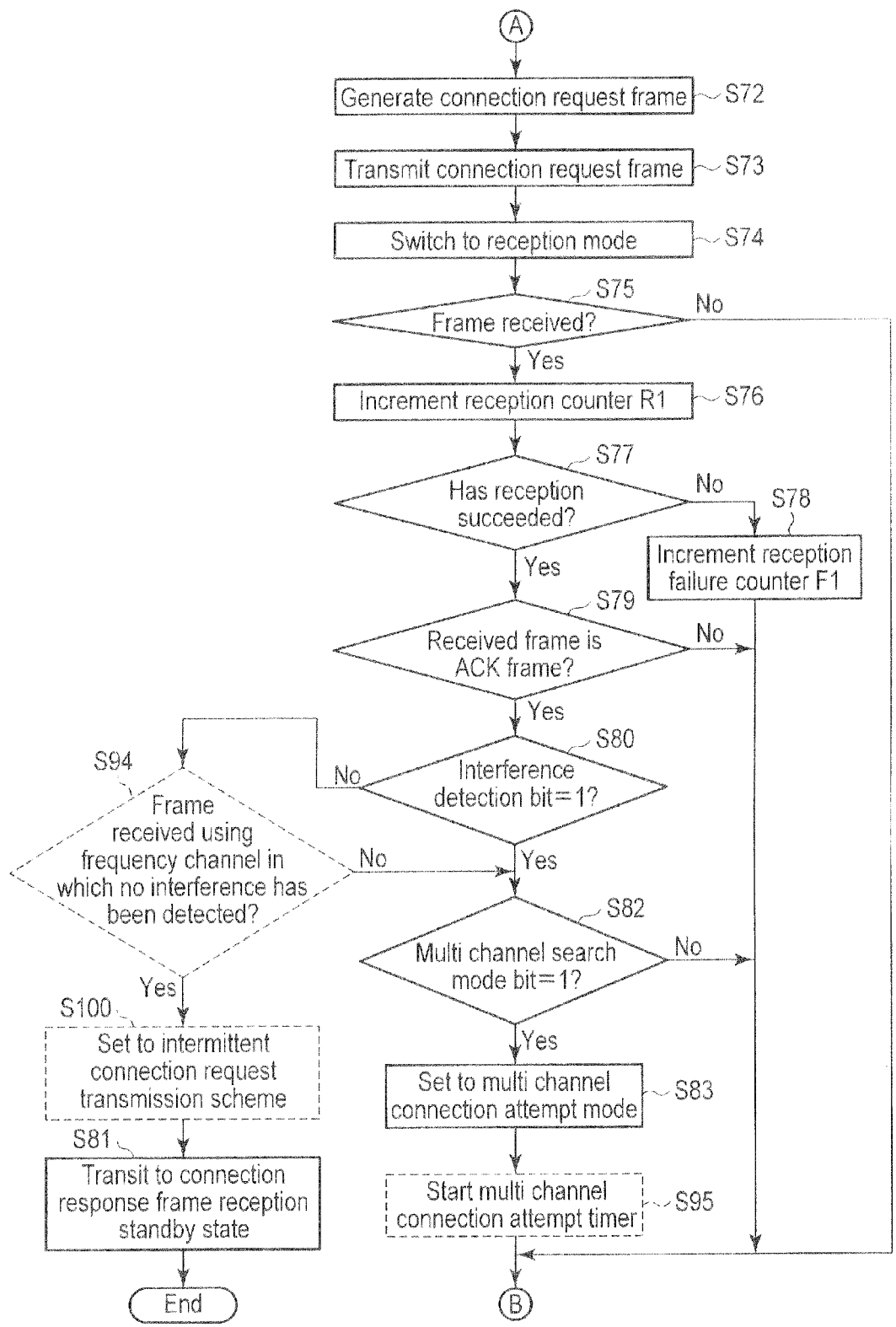
FIG. 5B is a flowchart illustrating the connection attempt processing before wireless connection.
Figure 7B:
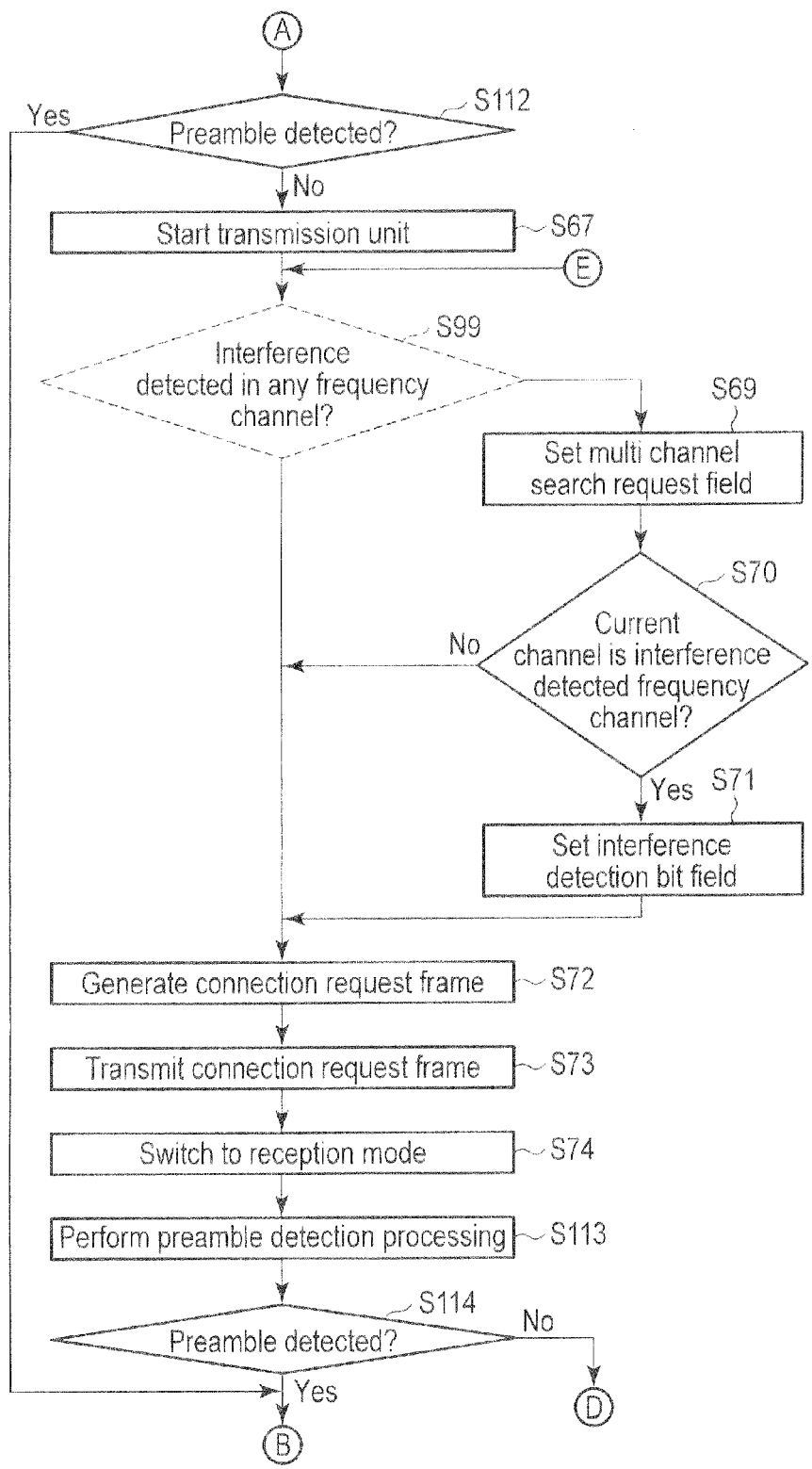
FIG. 7B is a flowchart illustrating the modification example of the connection attempt processing before wireless connection of FIGS. 5A to 5C.
Figure 7C:
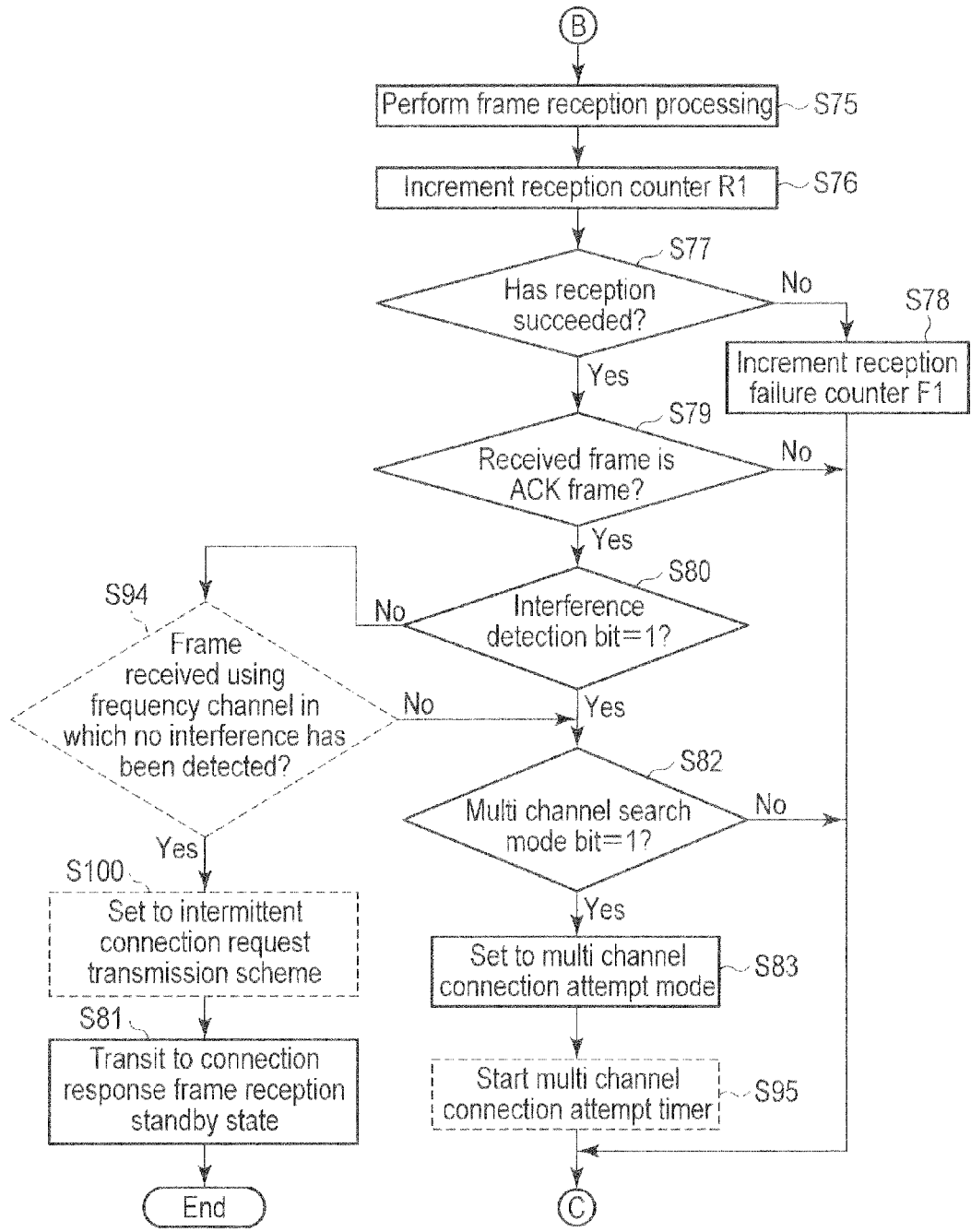
FIG. 7C is a flowchart illustrating the modification example of the connection attempt processing before wireless connection of FIGS. 5A to 5C.
Figure 7D:
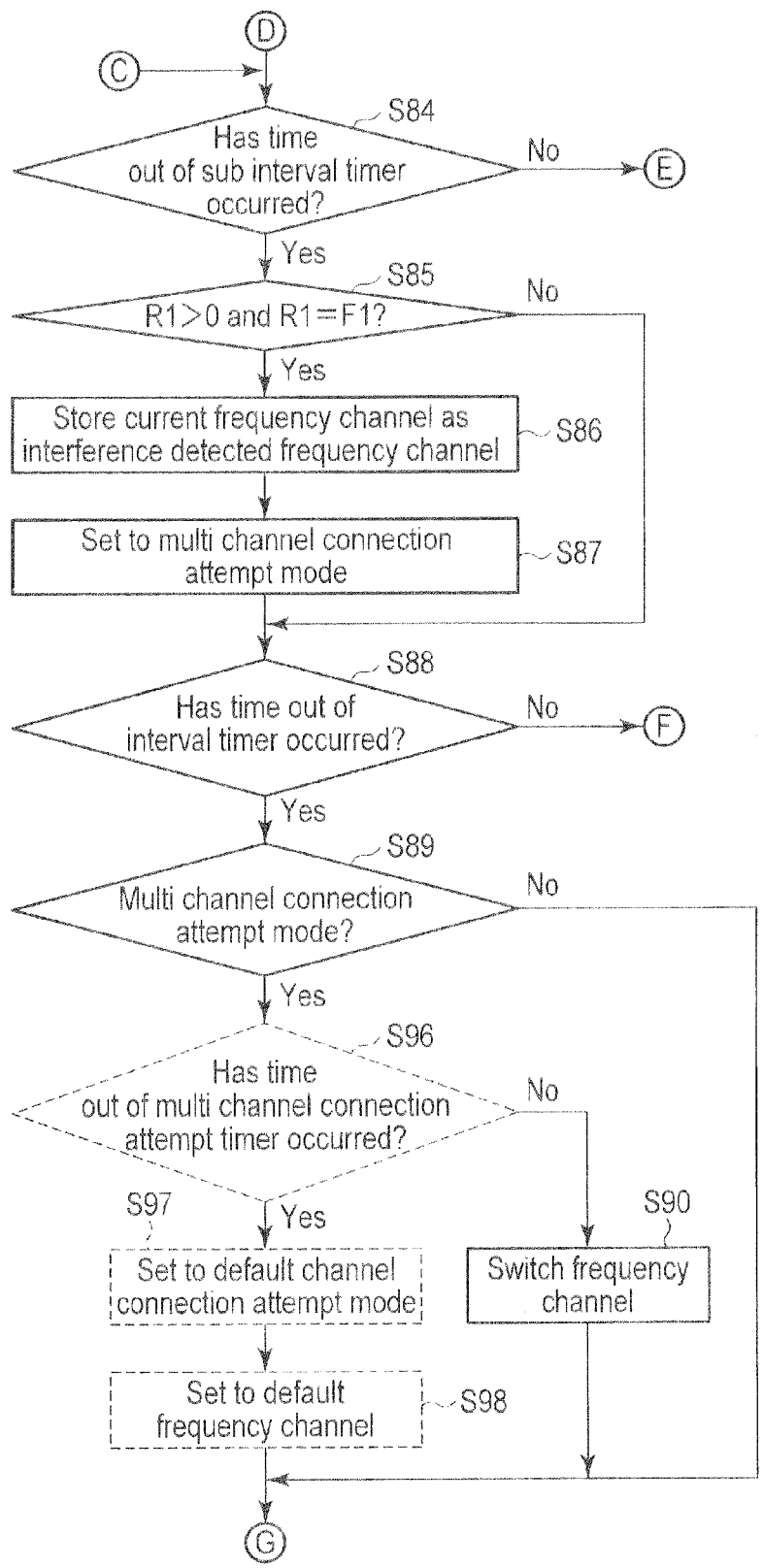
FIG. 7D is a flowchart illustrating the modification example of the connection attempt processing before wireless connection of FIGS. 5A to 5C.

FIGS. 5A to 5C are flowcharts illustrating connection attempt processing before wireless connection, executed by the wireless communication apparatus 1. Assume that the wireless communication apparatus 1 executes the processing in a default channel connection attempt mode in which a connection operation is attempted only using a predetermined frequency channel or a multi-channel connection attempt mode in which a connection operation is attempted using a plurality of predetermined frequency channels. The wireless communication apparatus 1 operates in a burst connection request transmission scheme of continuously and repeatedly transmitting the connection request frame until it receives an ACK to the connection request frame. After the wireless communication apparatus 1 receives an ACK to the connection request frame, it operates in an intermittent connection request transmission scheme of transmitting the connection request frame at random backoff intervals to stand by for reception of a connection response frame transmitted by random backoff. The control unit 19 sets a connection request frame transmission phase to the burst connection request transmission phase (step S60), sets a connection attempt mode to the default channel connection attempt mode (step S61), and controls the frequency switching unit 16 to switch to a predetermined default frequency channel (step S91). The unit 19 randomly selects, from a plurality of sub-intervals constituting one interval, a connection attempt state sub-interval during which the connection request frame is to be transmitted (step S62), and starts the interval timer 18 and sub-interval timer 20 (steps S63 and S64). The unit 19 determines whether the current sub-interval is the connection attempt state sub-interval selected in step S62 (step S65). If the current sub-interval is not the connection attempt state sub-interval, the unit 19 performs search state sub-interval processing (step S66). The search state sub-interval processing (step S66) will be described in detail later. If the unit 19 determines in step S65 that the current sub-interval is the connection attempt state sub-interval, it starts the transmission unit 15 (step S67), and determines whether interference has been detected in any frequency channel (step S99). If interference has been detected in any frequency channel, "1" is set in the multi-channel search request field 37 of the connection request frame (step S69), and the unit 19 determines whether the current frequency channel is the frequency channel in which the interference has been detected (step S70). If the interference has been detected in the current frequency channel, "1" is set in the interference detection field 38 of the connection request frame (step S71); otherwise, "1" is not set ("0" is set) in the interference detection field 38 of the connection request frame. If the unit 19 determines in step S99 that no interference has been detected in any frequency channel, "1" is not set ("0" is set) in the multi-channel search request field 37 and interference detection field 38 of the connection request frame. The unit 19 generates, in step S72, a connection request frame by setting values in fields shown in FIG. 3 other than the multi-channel search request field 37 and interference detection field 38, and transmits the connection request frame (step S73). After transmitting the connection request frame in step S73, the unit 19 switches to a reception mode (step S74), and determines whether a frame has been received (step S75). If the unit 19 determines in step S75 that a frame has been received, the unit 19 increments a reception counter R1 (step S76), and the reception success determination unit 13 determines whether the frame reception has succeeded (step S77). This reception success determination operation is performed using, for example, a CRC code. If the unit 19 determines in step S77 that frame reception has failed, it increments a reception failure counter F1 (step S78), and determines whether a time-out of the sub-interval timer 20 has occurred (step S84). If a time-out of the sub-interval timer 20 has not occurred, the unit 19 repeats the processing from step S99; otherwise, the unit 19 determines whether R1>0 and R1=F1, that is, whether all reception operations have failed although a reception operation is attempted at least once (step S85). If R1>0 and R1=F1, the unit 19 stores the current frequency channel as an interference-detected frequency channel (step S86). At the same time, the unit 19 sets the connection attempt mode of the wireless communication apparatus 1 to the multi-channel connection attempt mode (step S87). It is then determined whether a time-out of the interval timer 18 has occurred (step S88). If a time-out has not occurred, the unit 19 repeats the processing from step S64; otherwise, the unit 19 determines whether the connection attempt mode is the multi-channel connection attempt mode (step S89). If the connection attempt mode is the multi-channel connection attempt mode, the unit 19 determines whether a time-out of the multi-channel connection attempt timer 23 has occurred (step S96). If a time-out of the multi-channel connection attempt timer 23 has not occurred, the unit 19 switches the frequency channel (step S90), and repeats the processing from step S62. If there are four available frequency channels f1 to f4, the frequency channel switching processing (step S90) sequentially switches the frequencies like f1→f2→f3→f4→f1→f2→ . . . . If the unit 19 determines in step S96 that a time-out of the multi-channel connection attempt timer 23 has occurred, it sets the connection attempt mode to the default channel connection attempt mode (step S97), sets an operating frequency channel to a default frequency channel (step S98), and repeats the processing from step S62. If the unit 19 determines in step S77 that reception has succeeded, it determines whether the received frame is an ACK frame (step S79). If the received frame is not an ACK frame, the unit 19 repeats the processing from step S84; otherwise, the unit 19 determines whether the interference detection bit of the ACK frame is "1" (step S80). If the interference detection bit of the ACK frame is not "1", the unit 19 determines whether the ACK frame has been received using a frequency channel in which no interference has been detected (step S94). If the ACK frame has been received using a frequency channel in which interference has been detected, the process advances to step S82. Alternatively, if the ACK frame has been received using a frequency channel in which no interference has been detected, the unit 19 sets the connection request transmission scheme to the intermittent connection request transmission scheme (step S100), transits to a connection response frame reception standby state (step S81), and ends the process. If the unit 19 determines in step S80 that the interference detection bit of the ACK frame is "1", it determines whether the multi-channel connection attempt request bit of the ACK frame is "1" (step S82). If the multi-channel connection attempt request bit of the ACK frame is not "1", the process advances to step S84; otherwise, the unit 19 sets the connection attempt mode of the wireless communication apparatus 1 to the multi-channel connection attempt mode (step S83), starts the multi-channel connection attempt timer 23 (step S95), and advances the process to step S84.

FIG. 6 is a block diagram showing a schematic configuration of the wireless communication apparatus 1 according to the embodiment. This configuration is obtained by adding a preamble detection unit 101 to the block diagram shown in FIG. 2.

FIGS. 7A to 7D are flowcharts illustrating a modification example of the connection attempt processing before wireless connection shown in FIGS. 5A to 5C. Processing in steps S60 to S65 of FIGS. 7A to 7D is the same as that in the flowcharts of FIGS. 5A to 5C, and a description thereof will be omitted. If it is determined in step S65 that the current sub-interval is the connection attempt state sub-interval, the preamble detection unit 101 executes preamble detection processing (step S111), and determines whether a preamble has been detected (step S112). Note that in the preamble detection processing, matched filter processing between a received signal and a predetermined preamble waveform is executed for a predetermined period of time. If a filter output is equal to or larger than a predetermined threshold value, it is determined that a preamble has been detected; otherwise, it is determined that no preamble has been detected. If it is determined in step S112 that a preamble has been detected, the process advances to step S76; otherwise, the process advances to step S67. Processing from step S76 which is performed when it is determined in step S112 that a preamble has been detected is the same as that in the flowcharts shown in FIGS. 5A to 5C, and a description thereof will be omitted. Processing in steps S67 to S74 which is performed when it is determined in step S112 that no preamble has been detected is the same as that in the flowcharts shown in FIGS. 5A to 5C, and a description thereof will be omitted. After switching to a reception mode in step S74, the preamble detection unit 101 executes the preamble detection processing (step S113), and determines whether a preamble has been detected (step S114). If it is determined in step S114 that a preamble has been detected, the process advances to step S76; otherwise, the process advances to step S84. Processing from step S76 which is performed when it is determined in step S114 that a preamble has been detected is the same as that in the flowcharts shown in FIGS. 5A to 5C, and a description thereof will be omitted. Processing from step S84 which is performed when it is determined in step S114 that no preamble has been detected in step S112 is the same as that in the flowcharts shown in FIGS. 5A to 5C, and a description thereof will be omitted.

Figure 8:
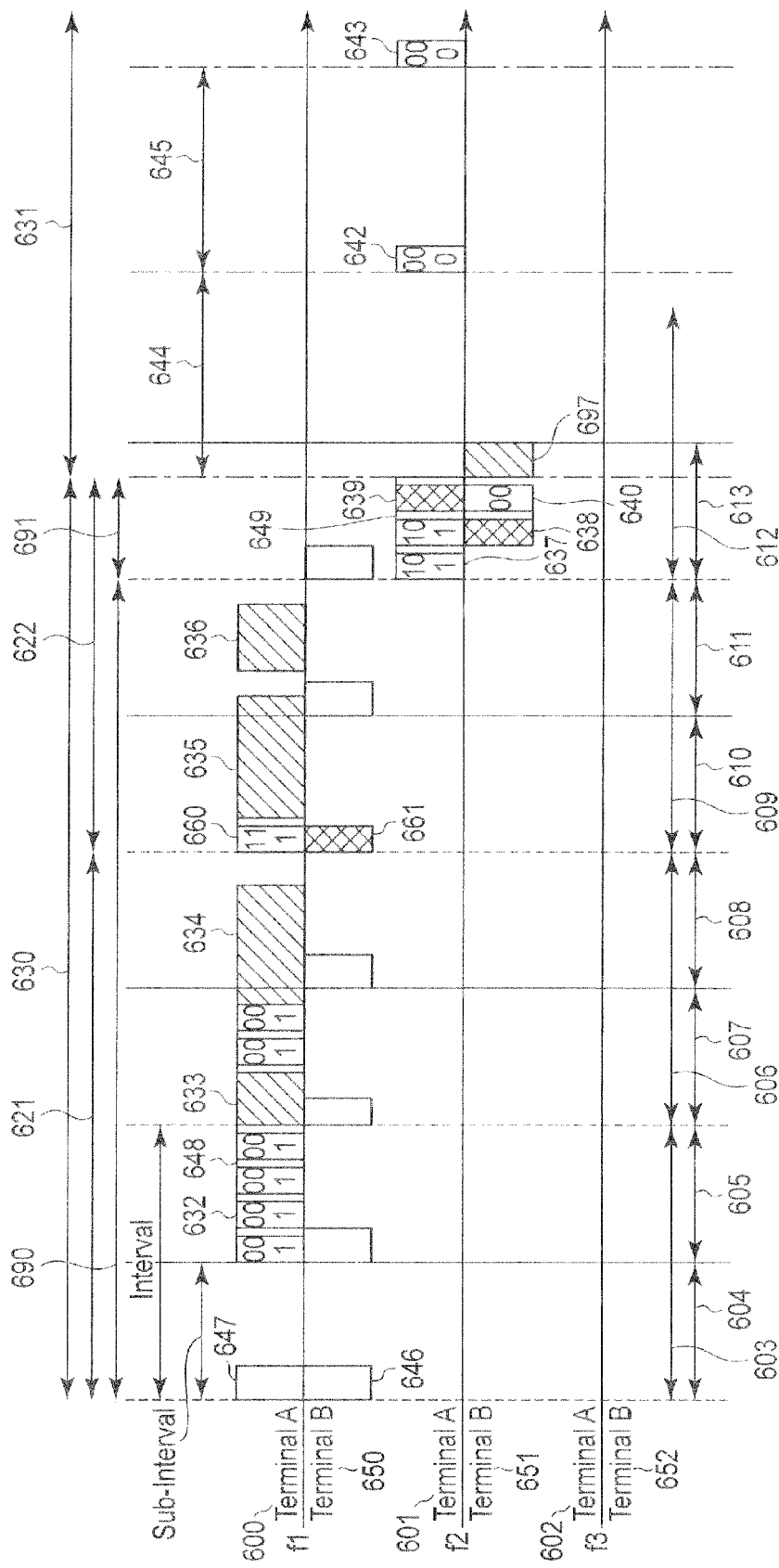
FIG. 8 is a timing chart showing a frame exchange sequence in three frequency channels.

FIG. 8 is a timing chart showing a frame exchange sequence in the three frequency channels f1, f2, and f3 between a terminal A which transmits a connection request frame and a terminal B which stands by for a connection request frame. FIG. 8 is a timing chart when interference has occurred in the terminal A. Reference numerals 600 and 650 denote operations of the terminals A and B in the frequency channel f1, respectively. Reference numerals 601 and 651 denote operations of the terminals A and B in the frequency channel f2, respectively. Reference numerals 602 and 652 denote operations of the terminals A and B in the frequency channel f3, respectively. The terminals A and B operate based on an interval period including at least two sub-intervals. In an example shown in FIG. 8, one interval includes two sub-intervals.

The terminals A and B operate based on sub-intervals 604 and 605 constituting an interval 603, sub-intervals 607 and 608 constituting an interval 606, and sub-intervals 610 and 611 constituting an interval 609. In the example shown in FIG. 8, the intervals of the terminals A and B synchronize with each other. In fact, the intervals of the terminals A and B do not synchronize with each other in most cases. For descriptive convenience, a case in which the intervals of both the terminals synchronize with each other is shown. The intervals of the terminals A and B need not always synchronize with each other, and the terminals A and B may asynchronously operate. Referring to FIG. 8, reference numerals 632, 660, 637, 640, 642, and 643 denote transmission frames; 646 and 647, standby states (reception circuit start states); 633, 634, 635, and 636, interferences from other systems and the like; 661, 638, and 639, frame reception operations; 648, a time interval during which the terminal A stands by for an ACK frame by switching the wireless unit 22 from a transmission mode to a reception mode after transmitting a frame; and 649, a time interval during which the wireless unit 22 is switched from a transmission mode to a reception mode after transmitting a frame. In the connection request frame 632, 660, 637, or the like, the upper left number indicates the value of the multi-channel search request field 37, the upper right number represents the value of the interference detection field 38, and the lower number indicates the value of the ACK policy field 45. On the upper side of FIG. 8, a time interval 621 indicates the default channel connection attempt mode, and a time interval 622 indicates the multi-channel connection attempt mode. Furthermore, a time interval 630 represents the burst connection request transmission scheme of continuously and repeatedly transmitting the connection request frame, and a time interval 631 represents the intermittent connection request transmission scheme of transmitting the connection request frame at random backoff intervals to stand by for reception of a connection response frame transmitted by random backoff. The operation of the terminal A will be mainly described below, and the operation of the terminal B will be explained in subsequent embodiments.

Since the terminal A has detected no interference in the default channel f1 during the interval 603, it transmits, during the time interval obtained by adding a time 648 required to switch the wireless unit 22 to a reception mode to an ACK reception standby time, the connection request frame 632 in which the multi-channel search request field 37 and interference detection field 38 have been set with "0" and the ACK policy field has been set with "1" representing "ImmACK" that indicates a real time response when the SIFS (Short Inter-Frame Space) time elapses. During the next interval 606, the signal 633 is detected in a carrier sense (preamble sense) before transmitting the connection request frame, and demodulation processing is executed but a CRC error occurs. The signal 634 is detected during an ACK frame standby time after transmitting the connection request frame, and demodulation processing is performed but a CRC error occurs. That is, although signals were detected in one frame to perform reception processing, all the reception processes failed. It is thus determined that interference has occurred in the default frequency channel f1. Therefore, the terminal A switches to the multi-channel connection attempt mode 622 in the interval 609. For the connection request frame 660 which is transmitted using the frequency channel f1 during the interval 609, "1" is set in a multi-channel search request field 37 and an interference detection field 38, thereby transmitting the frame 660. For the connection request frame 637 which is transmitted using the frequency channel f2 during a next interval 612, "1" is set in a multi-channel search request field 37, and "0" is set in an interference detection field 38 since no interference has been detected in the frequency channel f2, thereby transmitting the frame 637. The terminal B receives the connection request frame transmitted by the terminal A (638). The terminal B transmits the ACK frame 640. The terminal A receives the ACK frame 640 from the terminal B (639). Since the value of the interference detection field 38 of the frame 639 is "0" and the terminal A receives the ACK frame using the frequency channel f2 in which no interference has been detected, the terminal A sets the connection request transmission scheme to the intermittent connection request transmission scheme 631 to stand by for reception of a connection response frame.

In the above example, "1" representing "ImmACK" which indicates a real time response when the SIFS time elapses is set in the ACK policy field of the connection request frame 660 transmitted by the terminal A using the frequency channel f1 in which interference has been detected. When the terminal A transmits the connection request frame 660 using the frequency channel in which interference has been detected, however, "0" representing "NoACK" which indicates that an ACK response is unnecessary may be set in the ACK policy field, thereby transmitting the frame 660.

FIG. 9 shows a table for summarizing setting values of the multi-channel search request field, interference detection field, and ACK policy field of the connection request frame transmitted by the terminal A according to an interference detection state of the terminal A. As shown in FIG. 9, if interference has been detected in any one of a plurality of frequency channels (980, 981), "1" is set in the multi-channel search request field (MultiChReq). If no interference has been detected in any frequency channel (982), "0" is set in the multi-channel search request field (MultiChReq). If interference has been detected in any one of the plurality of frequency channels and a connection request frame is transmitted using the frequency channel in which the interference has been detected (983), "1" is set in the interference detection field (interference). If interference has been detected in any frequency channel but a connection request frame is transmitted using a frequency channel in which no interference has been detected (984), or if no interference has been detected in any frequency channel (985), "0" is set in the interference detection field. If interference has been detected in any one of the plurality of frequency channels and a connection request frame is transmitted using the frequency channel in which the interference has been detected (986), "0:NoACK" is set in the ACK policy field. If interference has been detected in any frequency channel but a connection request frame is transmitted using a frequency channel in which no interference has been detected (987), or if no interference has been detected in any frequency channel (988), "1:ImmACK" is set in the ACK policy field. Setting "0:NoACK" when interference has been detected in any frequency channel and a connection request frame is transmitted using the frequency channel in which the interference has been detected (968) means that the connection request frame is transmitted as a notification frame for requesting multi-channel search since it is impossible to make connection using that frequency channel even if an ACK frame is received using the frequency channel, and that there is a high possibility that reception of an ACK frame fails due to interference since the terminal A has suffered interference in that frequency channel.

Figure 10:
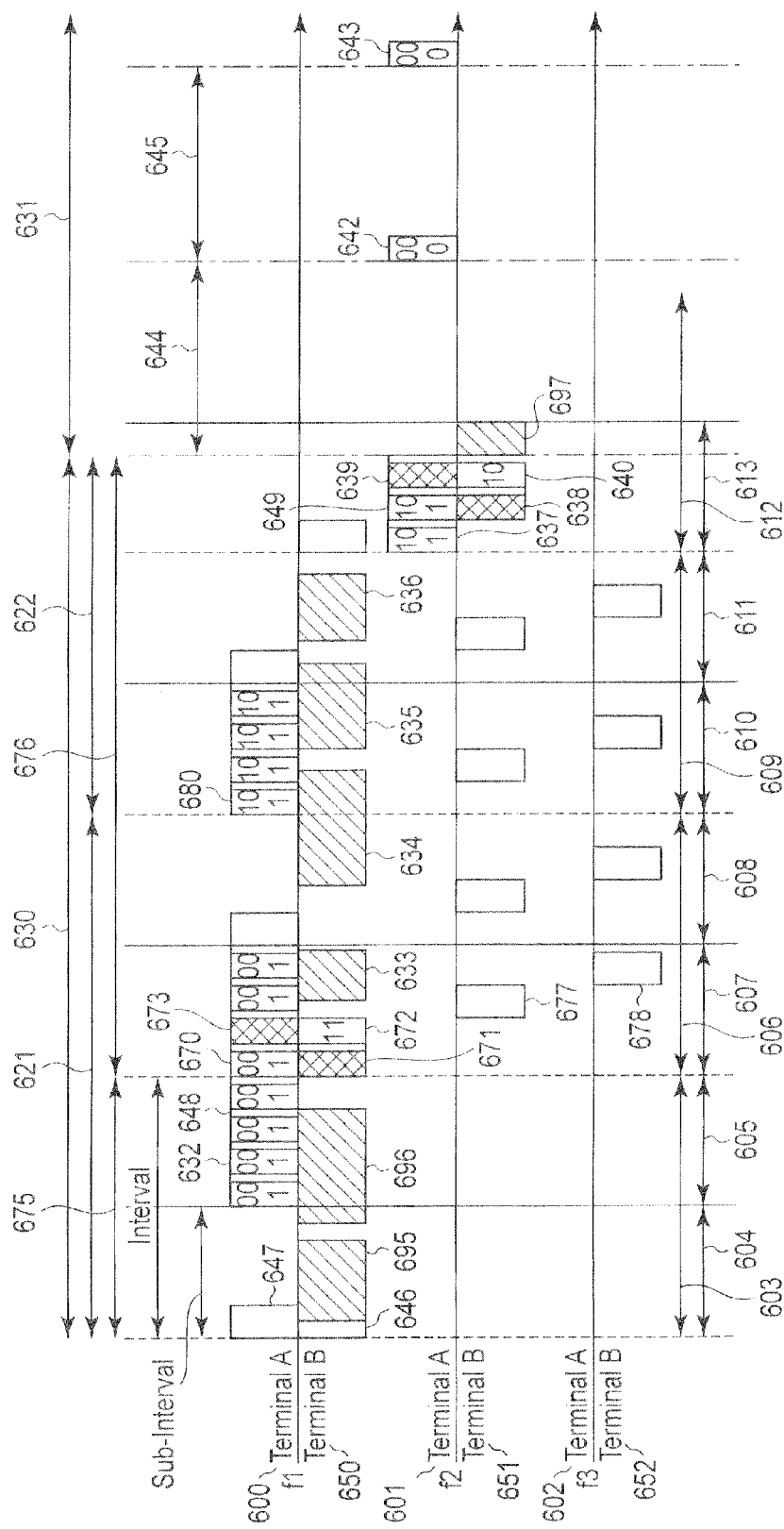
FIG. 10 is a timing chart showing a frame exchange sequence in three frequency channels.

FIG. 10 is a timing chart showing a frame exchange sequence in the three frequency channels f1, f2 and f3 between the terminal A which transmits a connection request frame and the terminal B which stands by for a connection request frame. FIG. 10 is a timing chart when interference has occurred in the terminal B.

Referring to FIG. 10, an operation will be described using the same notation as in FIG. 8. The operation of the terminal A will be mainly explained below, and the operation of the terminal B will be described in the subsequent embodiments.

Since the terminal A detects no interference during the interval 603 or 606, it operates in the default channel connection attempt mode 621. For the connection request frame 632 transmitted by the terminal A during the interval 603 and a connection request frame 670 transmitted by the terminal A during the interval 606, the values of the multi-channel search request field 37 and interference detection field 38 are set to "0". Upon receiving the connection request frame 670 transmitted from the terminal A during the interval 606, the terminal B sets, to "1", the values of a multi-channel connection attempt request field 55 and interference detection field 38 of an ACK frame 672 to the connection request frame, and then transmits the ACK frame 672 since it has detected interference in the default frequency channel f1. The terminal A receives the ACK frame whose multi-channel connection attempt request field 55 and interference detection field 38 have been set with "1" (673). Since the value of the interference detection field 38 is "1", however, the terminal A does not transit to the intermittent connection request transmission scheme but continues the burst connection request transmission scheme. Furthermore, since the value of the multi-channel connection attempt request field 55 is "1", the terminal A transits to the multi-channel connection attempt mode 622 in the interval 609. An example in which "1" is set as the value of a multi-channel search request field 37 of a connection request frame 680 which is transmitted during the intervals 609 and 612 in the multi-channel connection attempt mode 622 has been shown. However, this indicates that the terminal A is in the multi-channel connection attempt mode, and the terminal B has transited to a multi-channel search mode since it has detected interference in the frequency channel f1. Therefore, "1" need not always be set as the value of the field 37. The terminal B receives the connection request frame transmitted by the terminal A during the interval 612 (638), and transmits the ACK frame 640. The terminal A receives the ACK frame 640 (639). Since the value of the interference detection field 38 of the ACK frame 640 is "0" and the terminal A has received the ACK frame using the frequency channel f2 in which no interference has been detected, the terminal A sets the connection request transmission scheme to the intermittent connection request transmission scheme 631, and stands by for reception of a connection response frame.

As described above, by requesting a partner terminal to perform a search using another frequency channel, and sending, by the first terminal, information about a frequency channel which has suffered interference, it is possible to wirelessly connect and communicate with each other using a frequency channel in which there is no interference.

Second Embodiment

Figure 11:
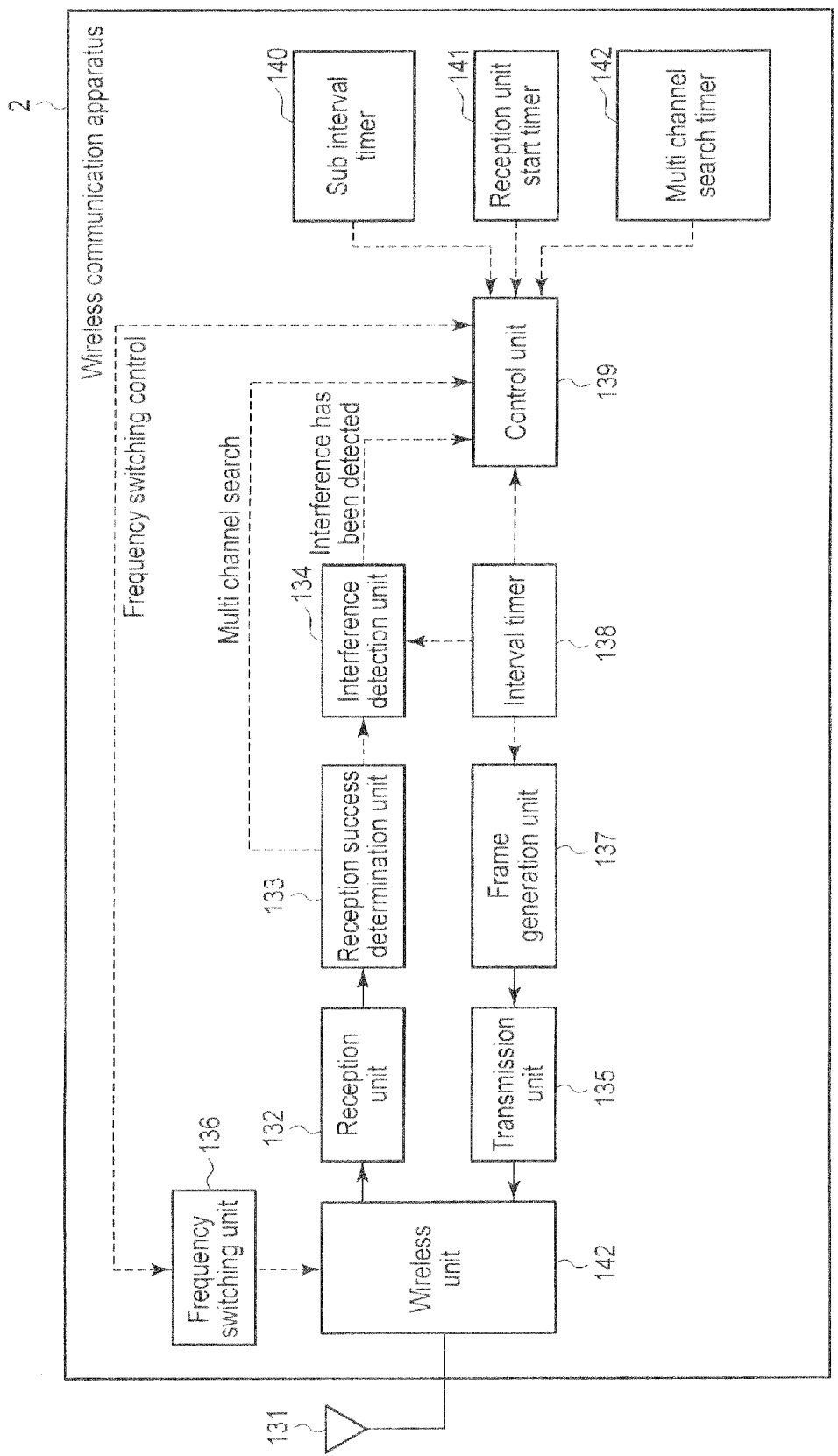
FIG. 11 is a block diagram showing a schematic configuration of a wireless communication apparatus according to another embodiment.

FIG. 11 is a block diagram showing a schematic configuration of a wireless communication apparatus 2 according to this embodiment. The wireless communication apparatus 2 of FIG. 11 includes an antenna 131, a wireless unit 142, a reception unit 132, a reception success determination unit 133, an interference detection unit 134, a transmission unit 135, a frequency switching unit 136, a frame generation unit 137, an interval timer 138, a control unit 139, sub-interval timer 140, a reception unit start timer 141, and a multi-channel search timer 142.

Figure 12A:
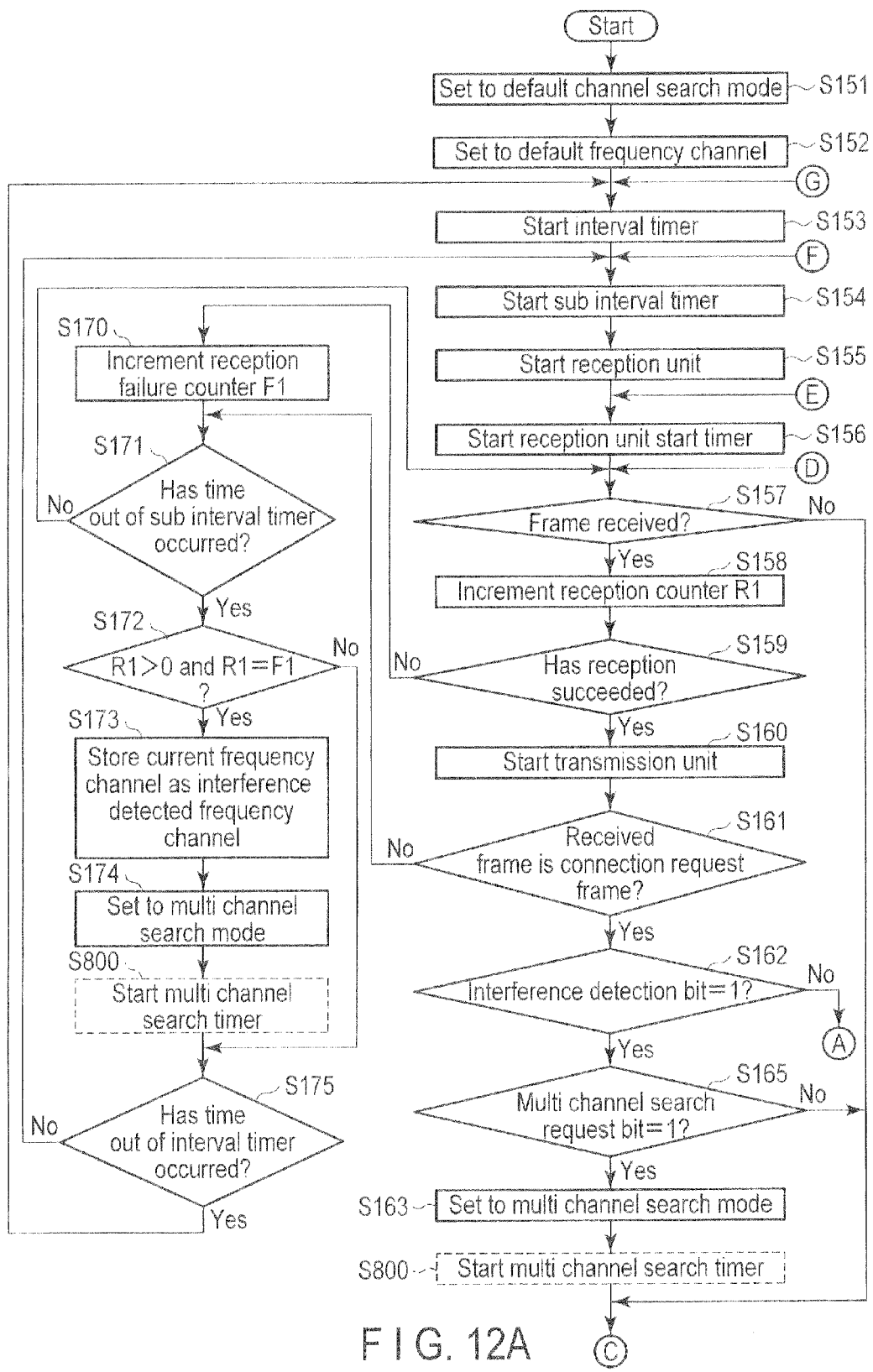
FIG. 12A is a flowchart illustrating search processing before wireless connection, executed by the wireless communication apparatus.
Figure 12B:
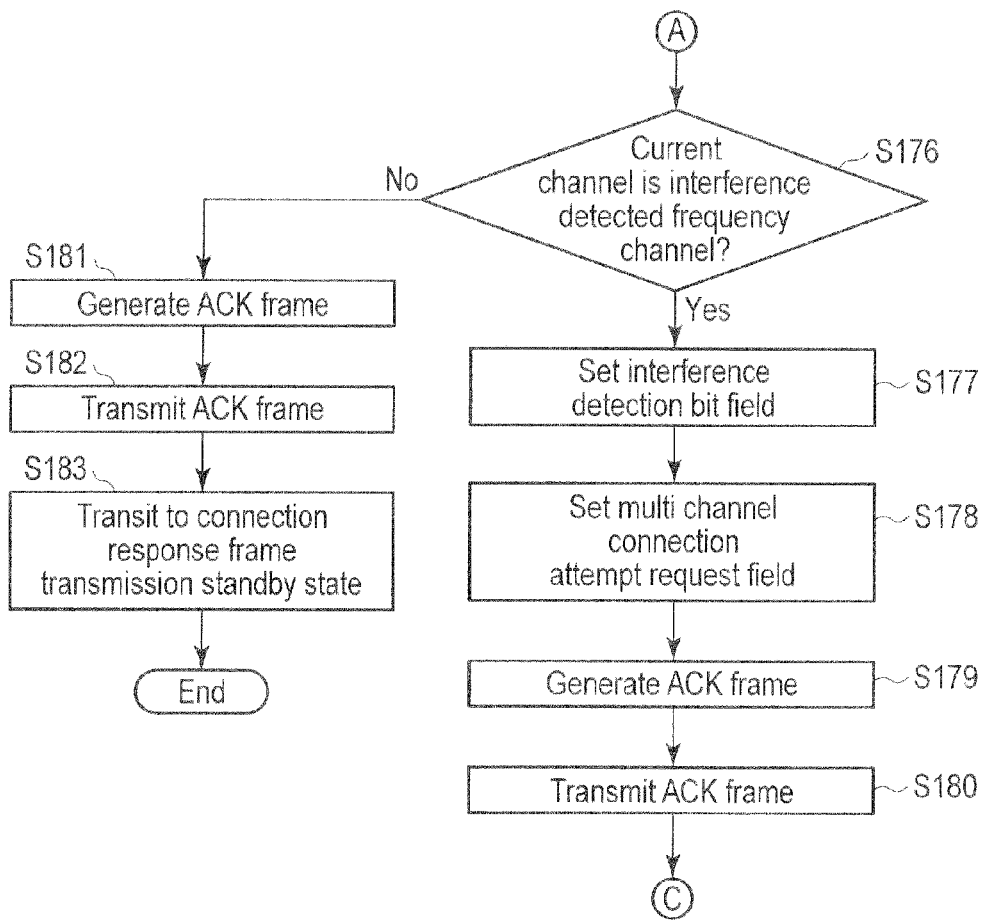
FIG. 12B a flowchart illustrating the search processing before wireless connection, executed by the wireless communication apparatus.
Figure 12C:
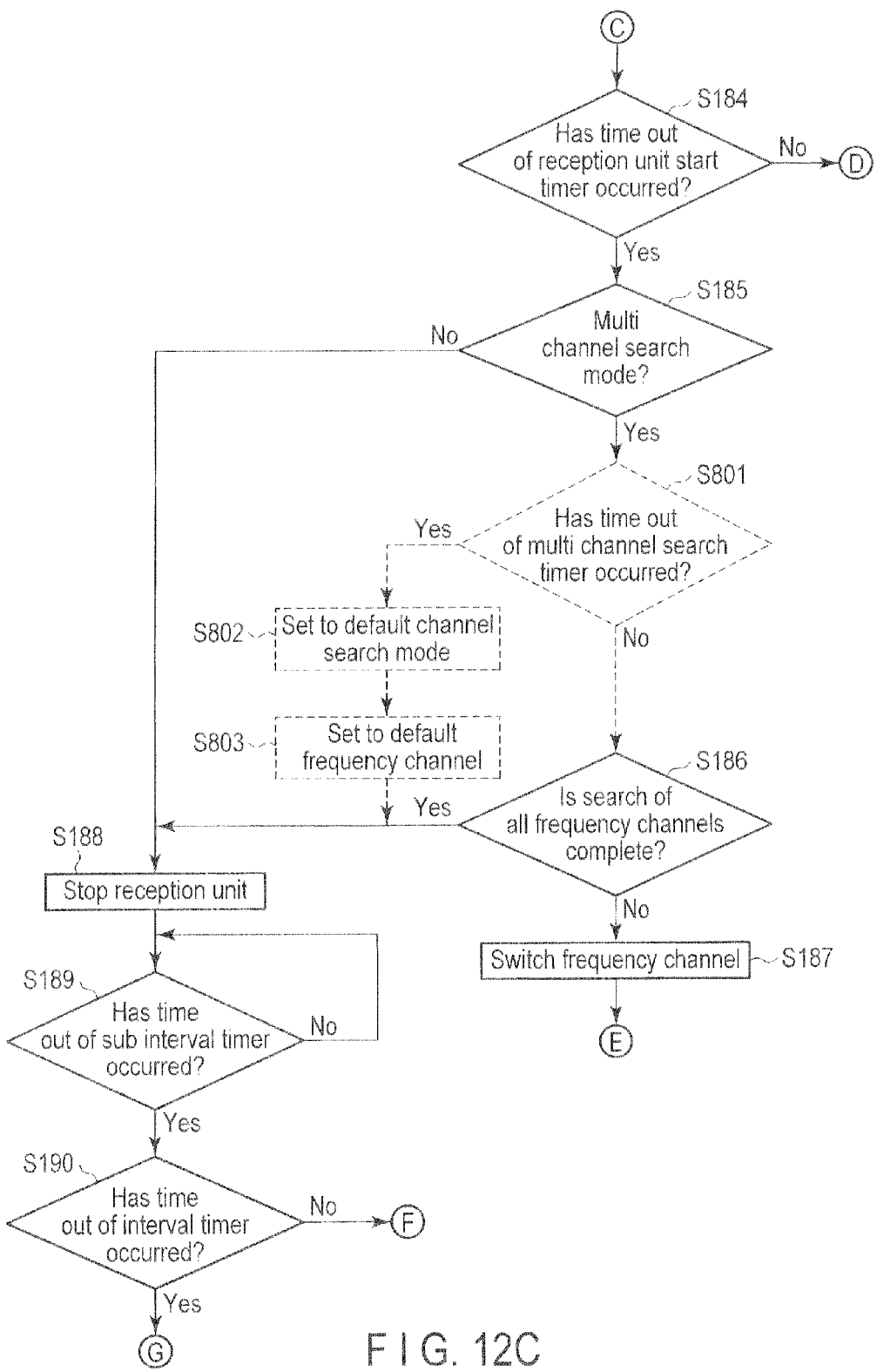
FIG. 12C is a flowchart illustrating the search processing before wireless connection, executed by the wireless communication apparatus.

FIGS. 12A to 12C are flowcharts illustrating search processing before wireless connection, executed by the wireless communication apparatus 2. The wireless communication apparatus 2 executes the processing in a default channel search mode in which a search is performed only in a predetermined frequency channel or a multi-channel search mode in which a search is performed in each of a plurality of predetermined frequency channels. The control unit 139 sets the search mode to the default channel search mode (step S151), and controls the frequency switching unit 136 to switch to a predetermined default frequency channel (step S152). The unit 139 starts the interval timer 138 (step S153), and starts the sub-interval timer 140 (step S154). At the same time, the unit 139 starts the reception unit 132 (step S155), and starts the reception unit start timer 141 (step S156). The reception unit 132 determines whether it receives a frame (step S157). If the unit 132 has received a frame, the process advances to step S158; otherwise, the process advances to step S184. If the unit 132 does not receive a frame in step S157, the control unit 139 determines whether a time-out of the reception unit start timer 141 has occurred (step S184). If a time-out of the reception unit start timer 141 has not occurred, the unit 139 repeats the processing from step S157. Alternatively, if the unit 139 determines in step S184 that a time-out of the reception unit start timer has occurred, it determines whether the search mode is the multi-channel search mode (step S185). If the search mode is not the multi-channel search mode, the unit 139 stops the reception unit 132 (step S188), and determines whether a time-out of the sub-interval timer 140 has occurred (step S189). If the unit 139 determines in step S189 that a time-out of the sub-interval timer 140 has not occurred, it stands by for a time-out of the sub-interval timer 140; otherwise, it determines whether a time-out of the interval timer 138 has occurred (step S190). If the unit 139 determines in step S190 that a time-out of the interval timer 138 has not occurred, it repeats the processing from step S154; otherwise, it repeats the processing from step S153. If the unit 139 determines in step S185 that the search mode is the multi-channel search mode, it determines whether a time-out of the multi-channel search timer has occurred (step S801). If a time-out of the multi-channel search timer has occurred, the unit 139 sets the search mode to the default channel search mode (step S802), and sets an operation frequency channel to the default frequency channel (step S803). If a time-out of the multi-channel search timer has not occurred, the unit 139 determines whether a search of all the predetermined frequency channels is complete (step S186). If a search of all the frequency channels is complete, the process advances to step S188; otherwise, the unit 139 controls the frequency switching unit 136 to switch the frequency channel (step S187), and repeats the processing from step S156.

If the reception unit 132 receives a frame in step S157, the unit 139 increments a reception counter R1 (step S158), and the reception success determination unit 133 determines whether the frame reception has succeeded (step S159). This reception success determination operation is performed using, for example, a CRC code. If it is determined in step S159 that the frame reception has failed, the unit 139 increments a reception failure counter F1 (step S170), and determines whether a time-out of the sub-interval timer 140 has occurred (step S171). If a time-out of the sub-interval timer 140 has not occurred, the unit 139 repeats the processing from step S157; otherwise, the unit 139 determines whether R1>0 and R1=F1 (step S172). If at least one of R1>0 and R1=F1 does not hold, the process advances to step S175; otherwise, the unit 139 stores the currently operating frequency channel as an interference-detected frequency channel (step S173), sets the search mode to the multi-channel search mode (step S174), and starts the multi-channel search timer (step S800). The unit 139 determines whether a time-out of the interval timer 138 has occurred (step S175). If a time-out has occurred, the unit 139 repeats the processing from step S153; otherwise, the unit 139 repeats the processing from step S154.

If it is determined in step S159 that the frame reception has succeeded, the unit 139 starts the transmission unit 135 (step S160), and determines whether the received frame is a connection request frame (step S161). If the received frame is not a connection request frame, the process advances to step S171; otherwise, the unit 139 determines whether the interference detection bit of the connection request frame is "1" (step S162). If the interference detection bit is "1", the process advances to step S165; otherwise, the process advances to step S176. In step S165, the unit 139 determines whether the multi-channel search request bit of the received connection request frame is "1". If the multi-channel search request bit is not "1", the process advances to step S184; otherwise, the unit 139 sets the search mode to the multi-channel search mode (step S163), starts the multi-channel search timer (step S800), and advances the process to step S184. If the unit 139 determines in step S162 that the interference detection bit is not "1", it determines whether interference has been detected in the current frequency channel (step S176). If interference has been detected, the process advances to step S177; otherwise, the unit 139 generates an ACK frame (step S181), transmits the generated ACK frame (step S182), and transits to a connection response frame transmission standby state (step S183). If the unit 139 determines in step S176 that interference has been detected, it sets "1" in an interference detection field 38 of an ACK frame (step S177), and sets "1" in a multi-channel connection attempt request field 55 of the ACK frame (step S178). Then, the unit 139 generates the ACK frame by setting values in the remaining fields of the ACK frame (step S179), transmits the generated ACK frame (step S180), and performs the processing from step S184.

FIG. 13 is a block diagram showing a schematic configuration of the wireless communication apparatus 2 according to this embodiment, which is obtained by adding a preamble detection unit 201 to the block diagram of FIG. 11.

Figure 14A:
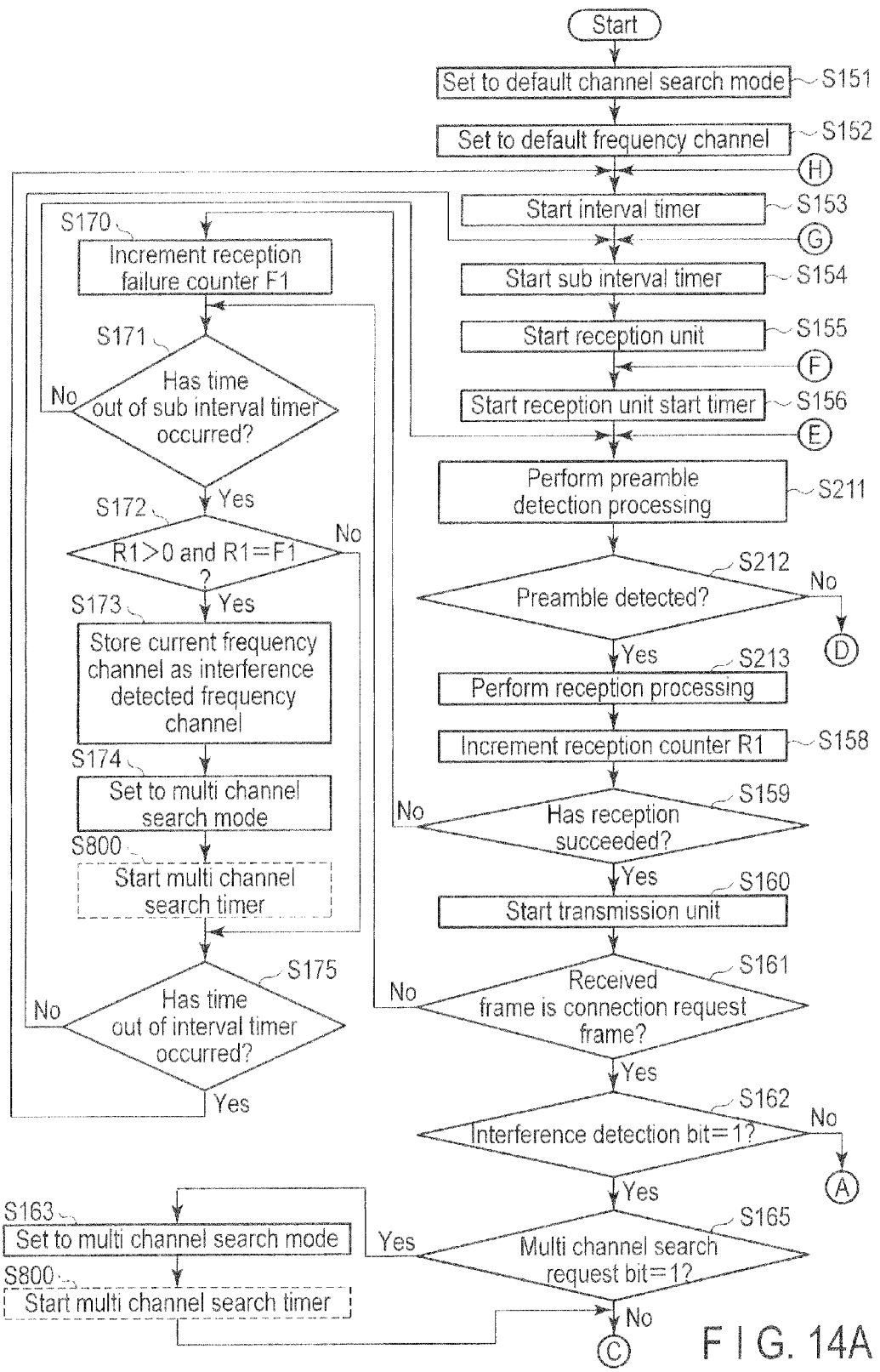
FIG. 14A is a flowchart illustrating a modification example of the search processing before wireless connection of FIGS. 12A to 12C.
Figure 14C:
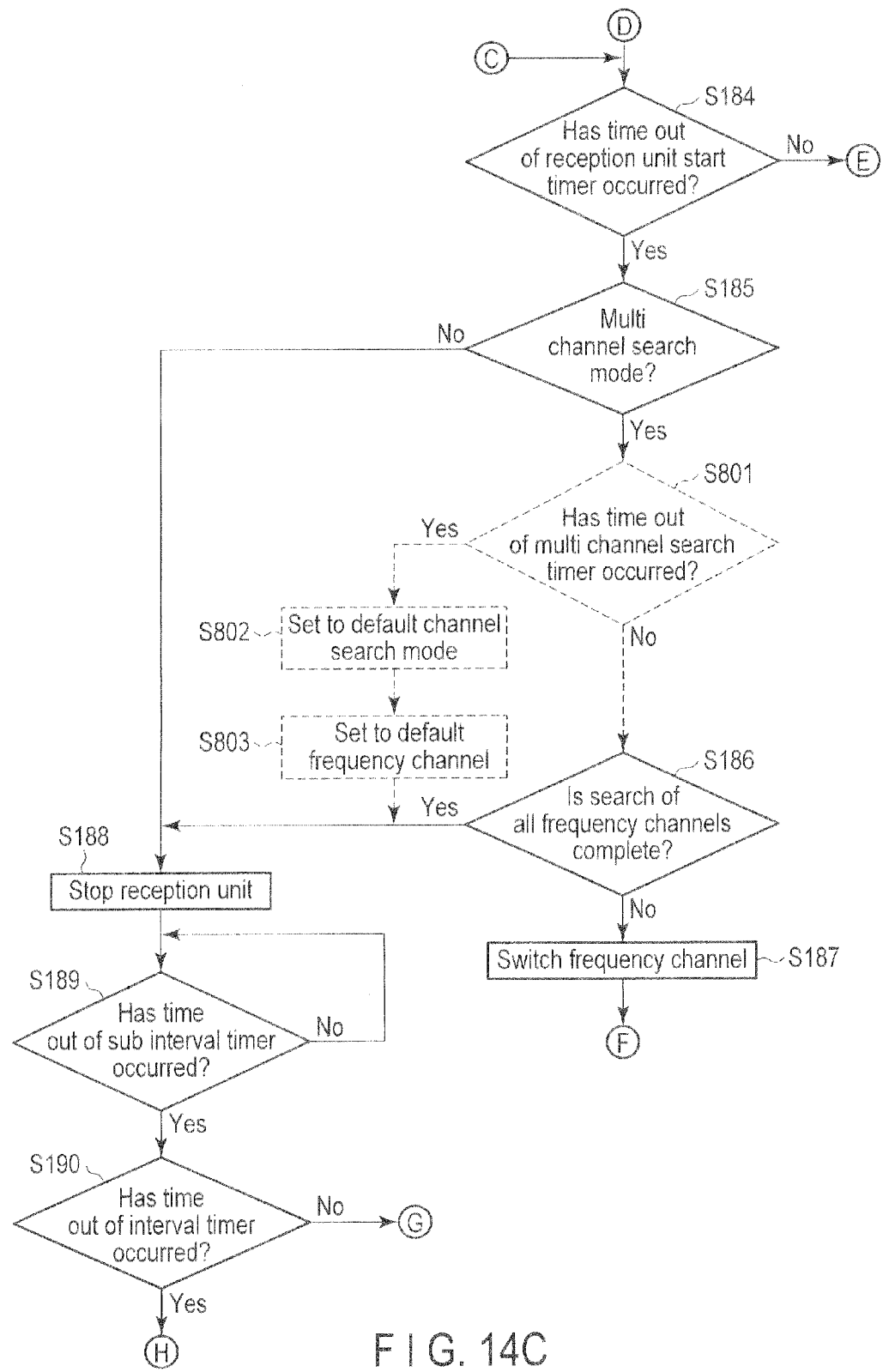
FIG. 14C is a flowchart illustrating the modification example of the search processing before wireless connection of FIGS. 12A to 12C.

FIGS. 14A to 14C are flowcharts illustrating search processing before wireless connection, executed by the wireless communication apparatus 2, which are obtained by modifying the flowcharts of FIGS. 12A to 12C. Referring to FIGS. 14A to 14C, processing in steps S151 to S156 is the same as that in the flowcharts of FIGS. 12A to 12C, and a description thereof will be omitted. After starting the reception unit start timer 141 in step S156, the preamble detection unit 201 executes preamble detection processing (step S211), and determines whether a preamble has been detected (step S212). If it is determined in step S212 that a preamble has been detected, reception processing is performed (step S213), and the process advances to step S158. Processing from step S158 is the same as that in FIGS. 12A to 12C, and a description thereof will be omitted. If it is determined in step S212 that no preamble has been detected, the process advances to step S184 to determine, whether a time-out of the reception unit start timer has occurred. Processing from step S184 is the same as that in FIGS. 12A to 12C, and a description thereof will be omitted.

Processing of transiting, when a terminal receives a connection request frame whose multi-channel search request field has been set with "1" from a terminal A, to the multi-channel search mode will be described with reference to FIG. 8. During intervals 603, 606, and 609, the terminal B operates in a default channel search mode 690. The terminal B stands by in a default frequency channel f1 for reception of a connection request frame while keeping its reception unit active from a sub-interval start time until a time-out of the reception unit start timer 141 (646). The reception unit start timer has been set for a predetermined connection request frame transmission time interval in a burst connection request transmission scheme by the terminal A or more. The terminal B receives a connection request frame 660 transmitted from the terminal A during the interval 609 (661). Since, however, the value of the interference detection field 38 is "1", the terminal B does not respond to the connection request frame with an ABS frame. Furthermore, since the value of a multi-channel search request field 37 is "1", the terminal B transits to a multi-channel search mode 691 in a next interval 612. The terminal B receives a connection request frame while standing by for a connection request frame in a frequency channel f2 during the interval 612 (638). Since the value of the interference detection field 38 is "0" (no interference has been detected in the frequency channel f2), the terminal B responds to the connection request frame with an ABS frame 640. Since the terminal B has detected no interference in any frequency channel, it sets "0" in the multi-channel connection request field and interference detection field 38 of the ABS frame 640.

In the above example, if a connection request frame whose interference detection field 38 has been set with "0" (no interference has been detected in the frequency channel f2) is received, an ABS frame is transmitted without exception. However, to avoid collision between ABS frames simultaneously transmitted when two or more terminals respectively receive connection request frames, when a connection request frame whose interference detection field 38 has been set with "0" is received, an ABS frame may be transmitted with a probability of less than 1 such as ½. This enables to decrease the probability that two or more terminals simultaneously transmit ACK frames when receiving connection request frames.

Processing of responding, with an ACK frame, to the connection request frame received by the terminal B using the frequency channel in which interference has been detected will be explained with reference to FIG. 10. The terminal B is in a standby state in the default channel search mode 675 during the interval 603. In a connection request frame standby state 646, a signal 695 is detected to execute demodulation processing but a CRC error occurs. A signal 696 is detected to perform demodulation processing but a CRC error occurs. That is, although signals were detected in one frame to perform reception processing, all the reception processes failed. It is thus determined that interference has occurred in the default frequency channel f1. Therefore, the terminal B switches the search mode to a multi-channel search mode 676 in the interval 606, and performs standby processing in each of the frequency channels f1 and f2 and a frequency channel f3 during one sub-interval (671, 677, and 678). The terminal B receives a connection request frame 670 during the interval 606 (671). Since the value of the interference detection field 38 of the connection request frame is "0", the terminal B responds to the connection request frame with an ACK frame. In this case, since interference has been detected in the frequency channel f1, the terminal B sets "1" in the multi-channel connection attempt field and the interference detection field 33 of the ACK frame, and then transmits the ACK frame (672). Upon receiving an ACK frame 673 whose multichannel connection attempt request field 55 has been set with "1", the terminal A transits to a multichannel connection attempt mode 622 in the next interval 609, and transmits a connection request frame 637 using the frequency channel f2 during the interval 612. Upon receiving the connection request frame 637, the terminal B responds to the connection request frame with the ACK frame 640 whose multi-channel connection attempt request field 55 has been set with "1" and whose interference detection field 38 has been set with "0" since the value of the interference detection field 38 of the received connection request frame is "0" and no interference has been detected in the frequency channel f2. Since the terminal A receives, using the frequency channel f2 in which no interference has been detected, the ACK frame whose interference detection bit is "0", it changes its connection request transmission scheme to an intermittent connection request transmission scheme 631. To confirm that the terminal A has transited to the intermittent connection request transmission scheme, that is, to confirm that reception of the ACK frame 640 transmitted by the terminal B has succeeded (639) and transmission of a connection request frame in the burst connection request transmission scheme has been stopped, the terminal B confirms that a connection request frame is not received (697). The terminal A regularly transmits connection request frames 642 and 643 at intervals 644 and 645 each of which is an integral multiple of a predetermined connection response frame transmission random backoff slot. Upon receiving a connection response frame transmission instruction from an upper layer, the terminal B performs transmission by random backoff during the intervals 644 and 645.

FIG. 15 is a table showing operations corresponding to the values of the multi-channel search request field (MultiChReq) and interference detection field (Interference) of the connection request frame which has been received by the terminal B from the terminal A.

Referring to the table in FIG. 15, if the terminal B has received a connection request frame with MultiChReq=0 and Interference=0 and has detected no interference in a frequency channel used to receive the connection request frame (760), neither of the terminals A and B have detected any interference in the frequency channel. Therefore, the terminal B transmits an ACK frame whose multi-channel connection attempt request field 55 and interference detection field have been set with "0" (MultiChReq=0 and Interference=0), thereby notifying an upper layer that it has received the connection request from another terminal.

If the terminal B has received a connection request frame with MultiChReq=0 and Interference=0, and has detected interference in a frequency channel used to receive the connection request frame (761), the terminal A has detected no interference in the frequency channel but the terminal B has detected interference in the frequency channel. Therefore, the terminal B transmits an ACK frame whose multi-channel connection attempt request field 55 has been set with "1" (MultiChReq=1) for making connection using frequency channel other than the frequency channel in which interference has been detected and whose interference detection field 38 has been set with "1" (Interference=1) for indicating that connection is not made using the frequency channel since interference has been detected in that frequency channel, thereby not notifying an upper layer that it has received the connection request from another terminal.

Assume that the terminal B has received a connection request frame with MultiChReq=1 and Interference=0, and has detected no interference in a frequency channel used to receive the connection request frame (762). Since the terminal A has detected interference in a certain frequency channel, MultiChReq=1 has been set. As indicated by Interference=0, no interference has been detected in the frequency channel used to transmit the connection request frame, and the terminal B has detected no interference in the frequency channel. Therefore, the terminal B transmits an ACK frame whose multi-channel connection attempt request field 55 and the interference detection field 38 have been set with "0" (MultiChReq=0 and Interference=0), thereby notifying an upper layer that it has received the connection request from another terminal.

Assume that the terminal B has received a connection request frame with MultiChReq=1 and Interference=0, and has detected interference in a frequency channel used to receive the connection request frame (763). Since the terminal A has detected interference in a certain frequency channel, MultiChReq=1 has been set. As indicated by Interference=0, no interference has been detected in the frequency channel used to transmit the connection request frame, but the terminal B has detected interference in the frequency channel. Therefore, the terminal B transmits an ACK frame whose multi-channel connection attempt request field 55 has been set with "1" (MultiChReq=1) for making connection using a frequency channel other than the frequency channel in which interference has been detected, and whose interference detection field 38 has been set with "1" (Interference=1) for indicating that connection is not made using the frequency channel since interference has been detected in that frequency channel, thereby not notifying an upper layer that it has received the connection request from another terminal.

Since a multi-channel connection attempt request is sent without exception when interference is detected, reception of a connection request frame with MultiChReq=0 and Interference=1 (764) does not generally happen. As indicated by Interference=1, interference has been detected in the frequency channel. Therefore, even if ImmACK (real time response request) is set in the ACK policy field of the connection request frame, an ACK frame is not transmitted, and the search mode is not changed according to MultiChReq=0.

If the terminal B receives a connection request frame with MultiChReq=1 and Interference=1 (765), interference has been detected in the frequency channel as indicated by Interference=1. Even if ImmACK (real time response request) is set in the ACK policy field of the connection request frame, the terminal B does not transmit an ACK frame, and transits to the multi-channel search mode according to MultiChReq=1. Note that as shown in FIG. 9, if NoACK (ACK response unnecessary) is set in the ACK policy field of the connection request frame with MultiChReq=1 and Interference=1, the terminal B does not respond to the connection request frame with an ACK frame according to the instruction.

FIG. 16 is a table showing operations corresponding to the values of the multi-channel connection attempt request field (MultiChReq) and interference detection field (Interference) of an ACK frame received by the terminal A in response to the transmitted connection request frame.

In the table shown in FIG. 16, (a) represents a connection attempt mode (default channel connection attempt, multichannel connection attempt, or connection attempt completion) with respect to a frequency channel, and (b) represents a transmission scheme (burst connection request transmission scheme or intermittent connection request transmission scheme) with respect to a connection request frame transmission time interval.

In any of the cases (750, 751, 752, or 753) shown in FIG. 16, receiving an ACK frame to a connection request frame means that the connection request frame transmitted by the terminal A has been transmitted using a frequency channel in which no interference has been detected (Interference=0), as shown in FIG. 15.

In the table of FIG. 16, if the terminal A receives an ACK frame with MultiChReq=0 and Interference=0 (750), neither of the terminals A and B have detected any interference in the frequency channel used. Therefore, (a) the frequency channel used to receive the ACK frame is fixed as an operation frequency channel, and (b) the terminal A transits from the burst connection request transmission scheme to the intermittent connection request transmission scheme.

In the table of FIG. 16, if the terminal A receives an ACK frame with MultiChReq=1 and Interference=0 (752), the terminal A has detected no interference in the frequency channel used, and the terminal B has detected interference in a certain frequency channel but has detected no interference in the frequency channel used. Therefore, (a) the frequency channel used to receive the ACK frame is fixed as an operation frequency channel, and (b) the terminal A transits from the burst connection request transmission scheme to the intermittent connection request transmission scheme.

In the table of FIG. 16, reception of an ACK frame with MultiChReq=0 and Interference=1 (751) does not generally happen. However, according to MultiChReq=0, the terminal A (a) does not switch between the default channel connection attempt mode and multichannel connection attempt mode. Also, according to Interference=1, the terminal A does not make connection using the frequency channel but (b) continues the burst connection request transmission scheme.

In the table of FIG. 16, if the terminal A receives an ACK frame with MultiChReg=1 and Interference=1 (753), (a) the terminal A transits to the multi-channel connection attempt mode according to MultiChReq=1, and does not make connection using the frequency channel but (b) continues the burst connection request transmission scheme according to Interference=1.

As described above, by requesting a partner terminal to transmit a connection request frame using another frequency channel, and sending, by the second terminal, information about a frequency channel in which interference has occurred, it is possible to wirelessly connect and communicate with each other using a frequency channel in which there is no interference.

Third Embodiment

Figure 17:
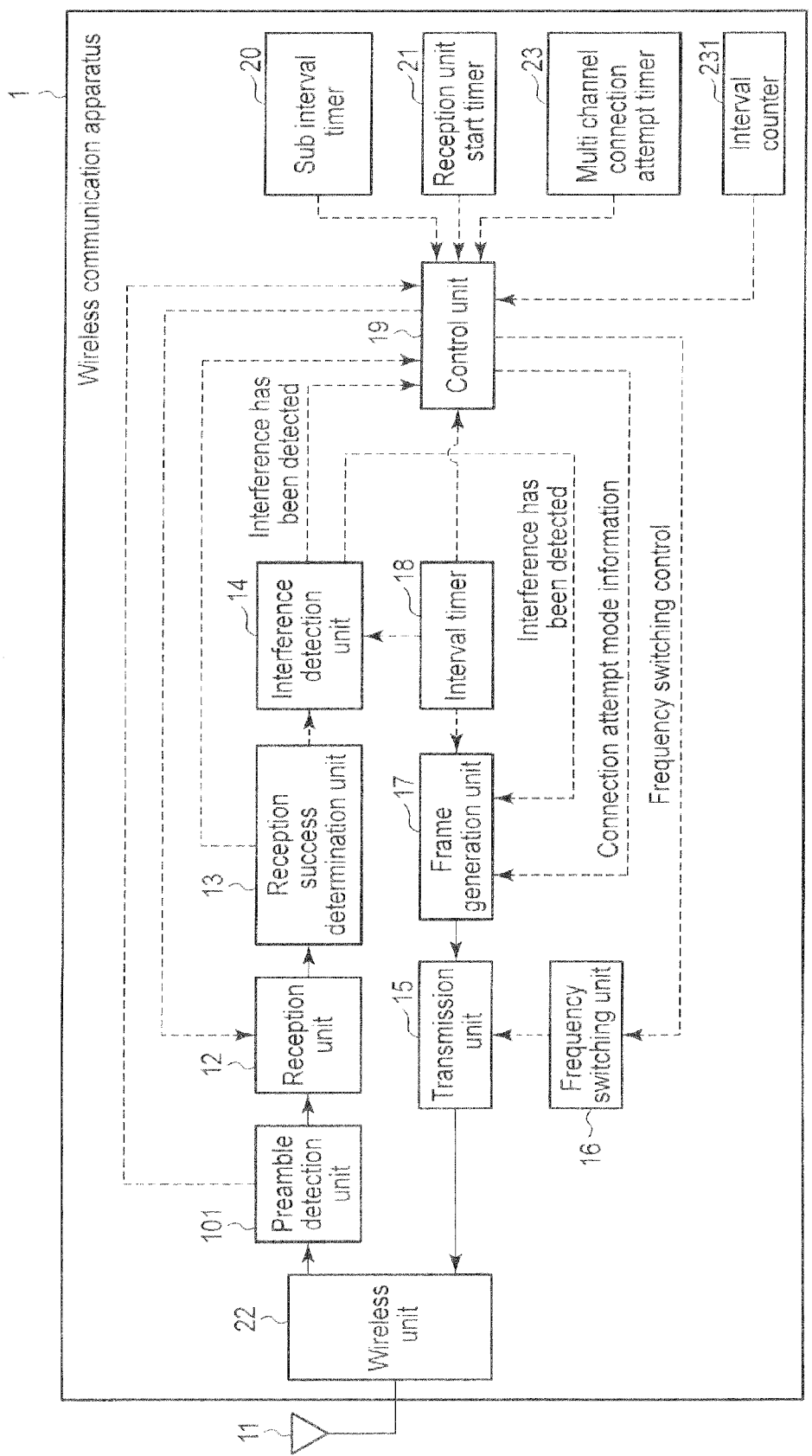
FIG. 17 is a block diagram showing a configuration example obtained by adding an interval counter to the wireless communication apparatus of FIG. 6.
Figure 18A:
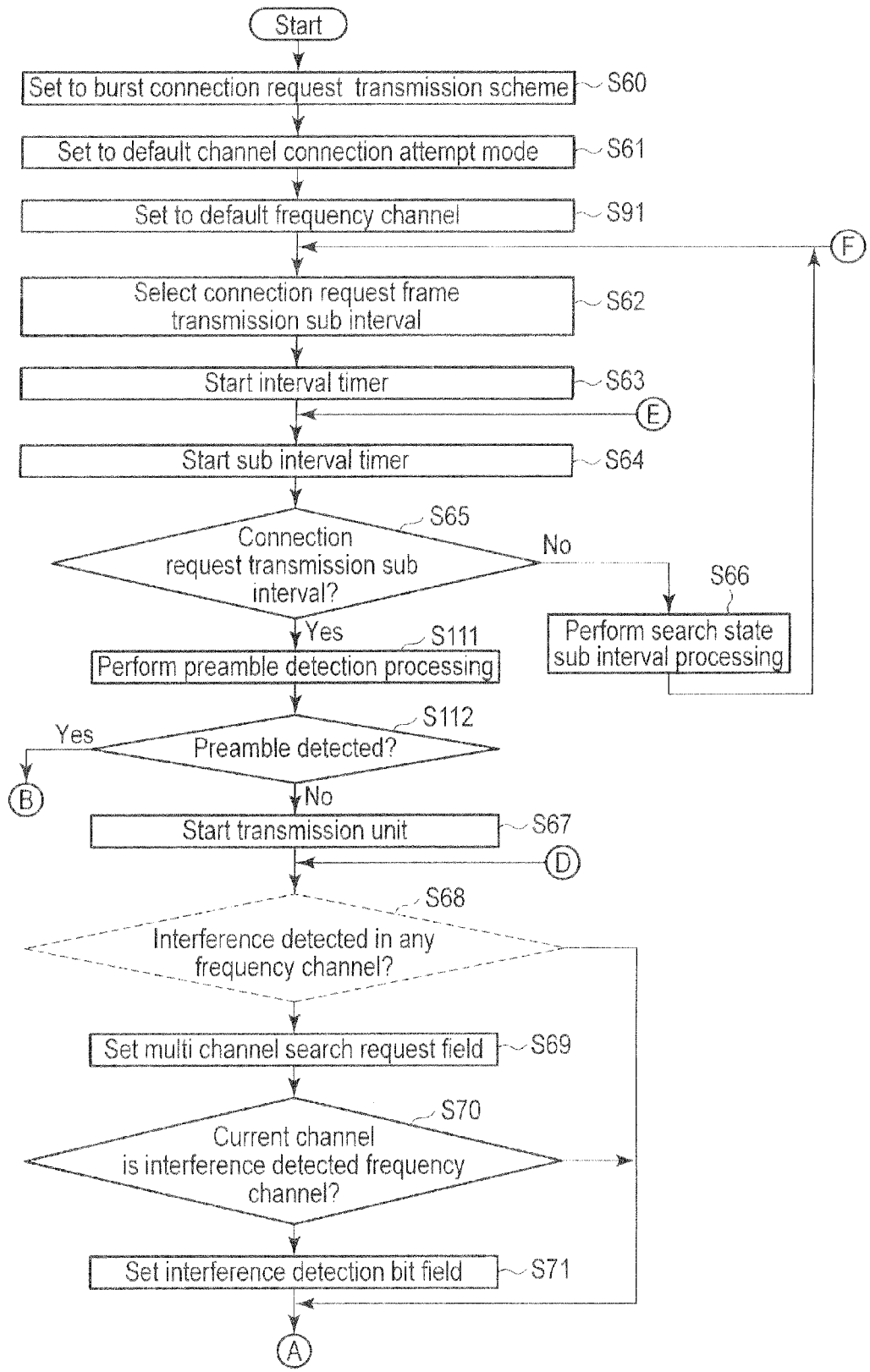
FIG. 18A is a flowchart illustrating a modification example of the connection attempt processing before wireless connection of FIGS. 7A to 7D.
Figure 18B:
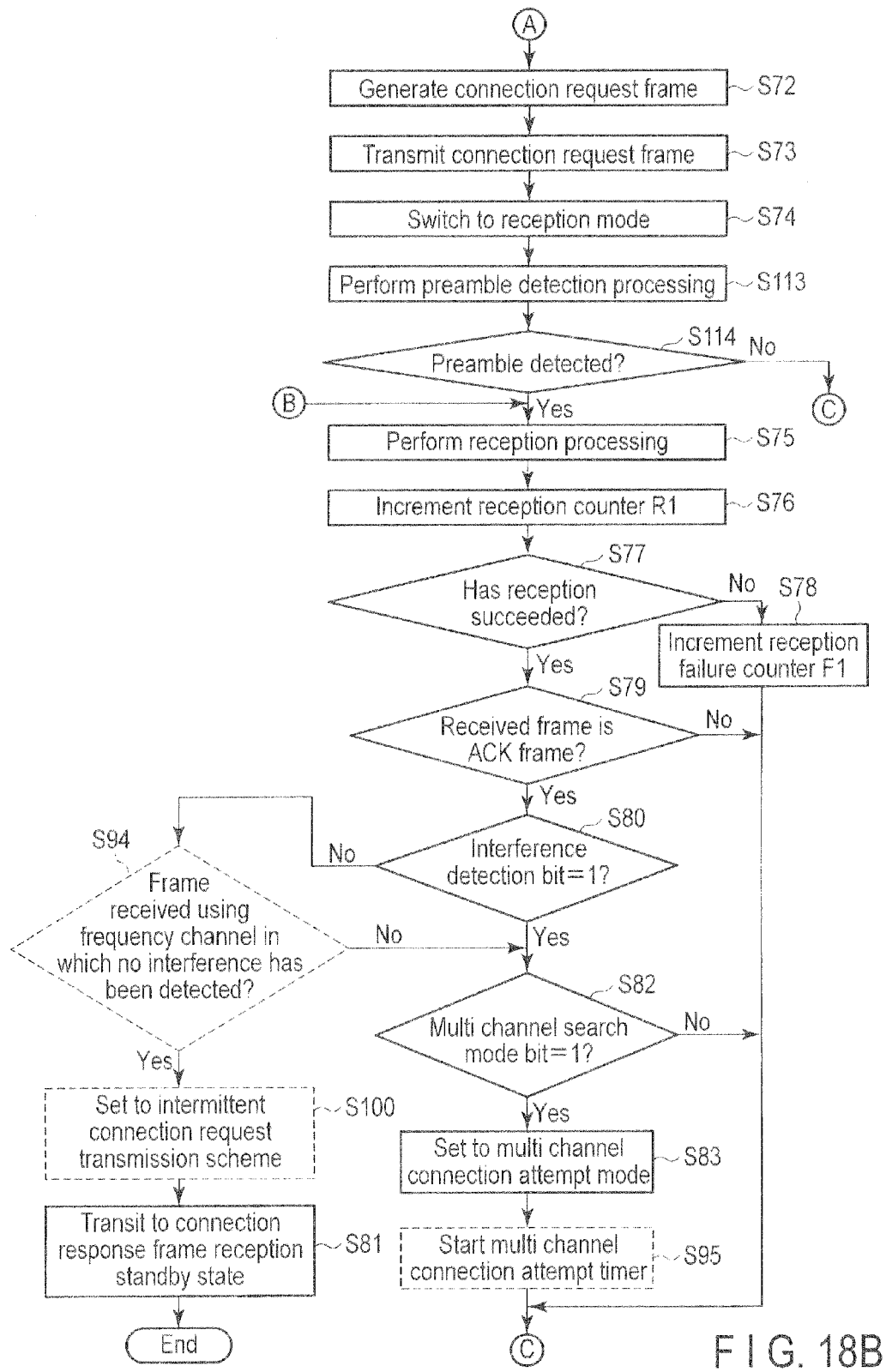
FIG. 18B is a flowchart illustrating the modification example of the connection attempt processing before wireless connection of FIGS. 7A to 7D.
Figure 18C:
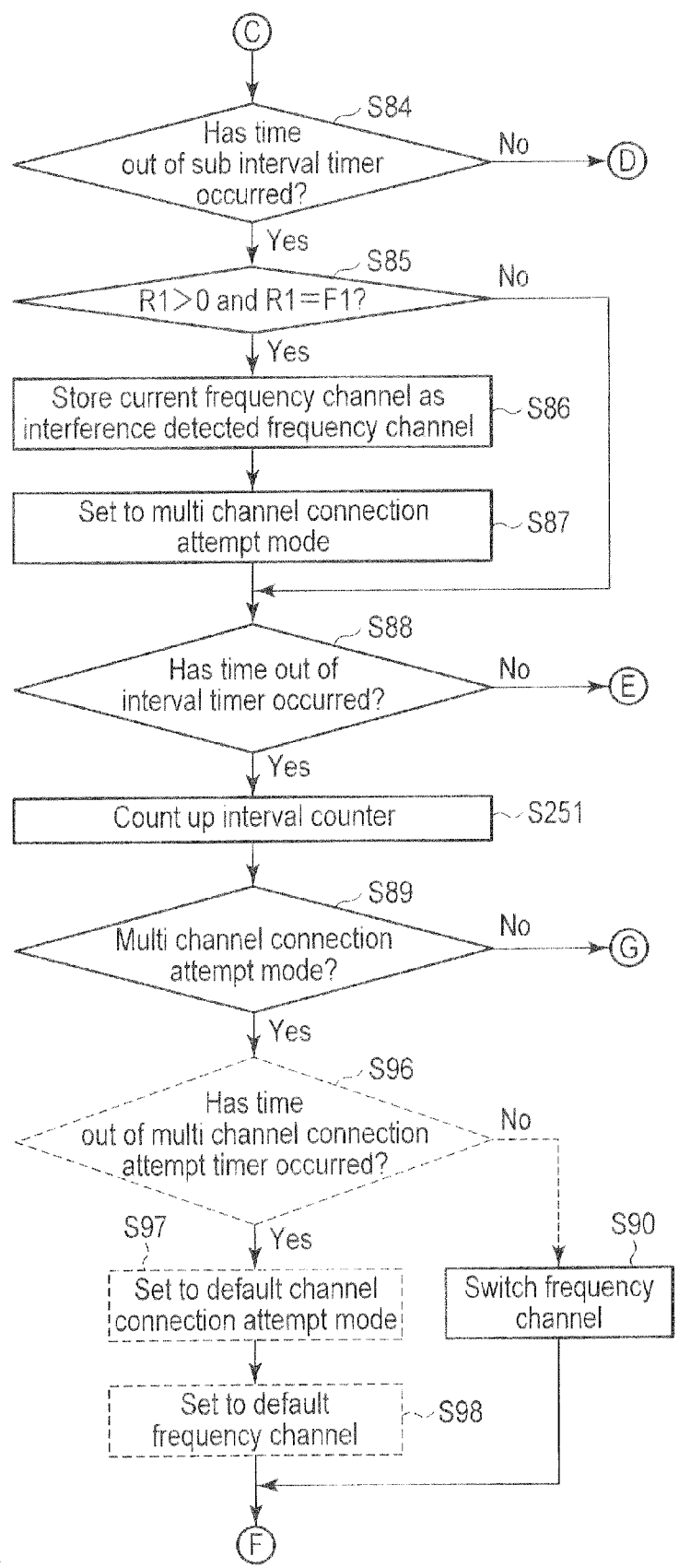
FIG. 18C is a flowchart illustrating the modification example of the connection attempt processing before wireless connection of FIGS. 7A to 7D.

FIG. 17 is a block diagram showing a schematic configuration of a wireless communication apparatus 1 according to this embodiment, which is obtained by adding an interval counter 231 to the block diagram shown in FIG. 6.

FIGS. 18A to 18D are flowcharts illustrating connection attempt processing before wireless connection executed by the wireless communication apparatus 1, which are obtained by modifying the flowcharts shown in FIGS. 7A to 7D. An operation of regularly transmitting a connection request frame using each of a plurality of frequency channels in a default channel connection attempt mode will be explained with reference to the flowcharts of FIGS. 18A to 18D. Referring to FIGS. 18A to 18D, processing in steps S61 to S88 is the same as that in the flowcharts shown in FIGS. 7A to 7D, and a description thereof will be omitted. If it is determined in step S88 that a time-out of an interval timer 18 has occurred, the interval counter 231 is counted up (step S251). It is then determined whether a connection attempt mode is a multi-channel connection attempt mode (step S89). If the connection attempt mode is the multi-channel connection attempt mode, the process advances to step S96. Processing from step S96 is the same as that in FIGS. 7A to 7D, and a description thereof will be omitted. If it is determined in step S89 that the connection attempt mode is not the multi-channel connection attempt mode, it is determined whether the apparatus 1 is in a multi-channel connection attempt phase in a default channel connection attempt mode (step S252). If the apparatus 1 is in the multi-channel connection attempt phase, the process advances to step S523; otherwise, the process advances to step S254. The multi-channel connection attempt phase indicates a state in which connection is attempted in the default channel connection attempt mode while regularly switching frequencies. Assume, for example, that available frequency channels are four frequency channels f1 to f4 and a default frequency channel is the channel f1. In this case, after the interval counter becomes 10, connection is attempted using each frequency channel while switching the frequency channels f1, f2, 13, and f4 at intervals. If it is determined in step S252 that the apparatus 1 is not in the multi-channel connection attempt phase, it is determined whether the interval counter is equal to or larger than a predetermined threshold value (step S254). If the interval counter is less than the predetermined threshold value, the processing from step S62 is repeated; otherwise, the apparatus 1 transits to the multi-channel connection attempt phase (step S255), and switches the frequency channel (step S258). If it is determined in step S252 that the apparatus 1 is in a regular multi-channel connection attempt state, it is determined whether a connection attempt for all the frequency channels is complete (step S253). If a connection attempt for all the frequency channels is incomplete, the process advances to step S258 to switch the frequency channel; otherwise, the apparatus 1 cancels the multi-channel connection attempt phase (step S256), clears the interval counter (step S257), and switches the frequency channel (step S258). Processing from step S258 is the same as that in FIGS. 7A to 7D, and a description thereof will be omitted.

Figure 19:
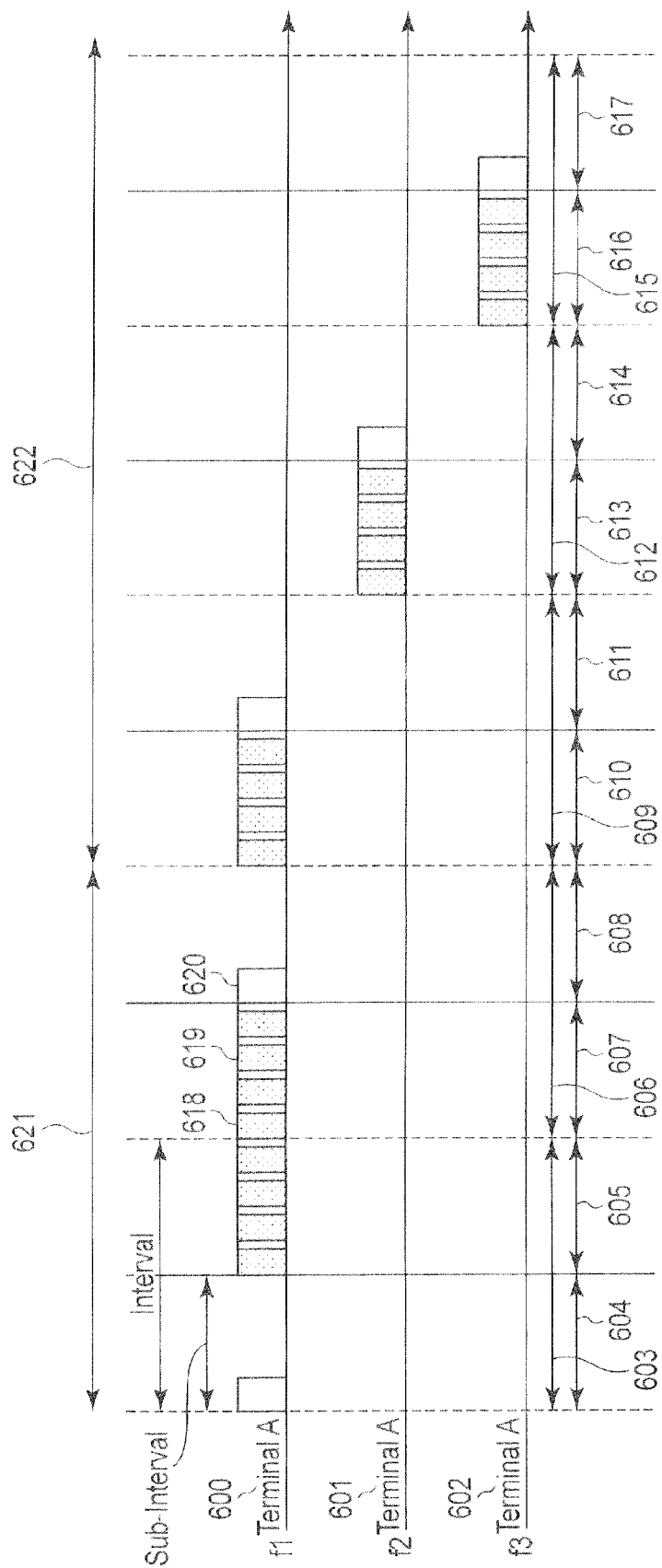
FIG. 19 is a timing chart showing phase switching in a default channel connection attempt mode.

FIG. 19 is a timing chart showing phase switching in the default channel connection attempt mode. A terminal A transmits a connection request frame using the default channel f1 in a default channel connection attempt phase 621. When a predetermined number of intervals elapse, the terminal A switches to a multi-channel connection attempt phase 622. Then the terminal A transmits a connection request frame using the frequency channel f1 during an interval 609, transmits a connection request frame using the frequency channel f2 during an interval 612, and transmits a connection request frame using the frequency channel f3 during an interval 615. After the multi-channel connection attempt phase 622 ends, the terminal A transits to a default channel connection attempt phase again, and transmits a connection request frame using the default channel. This operation will be repeated thereafter.

Figure 20:
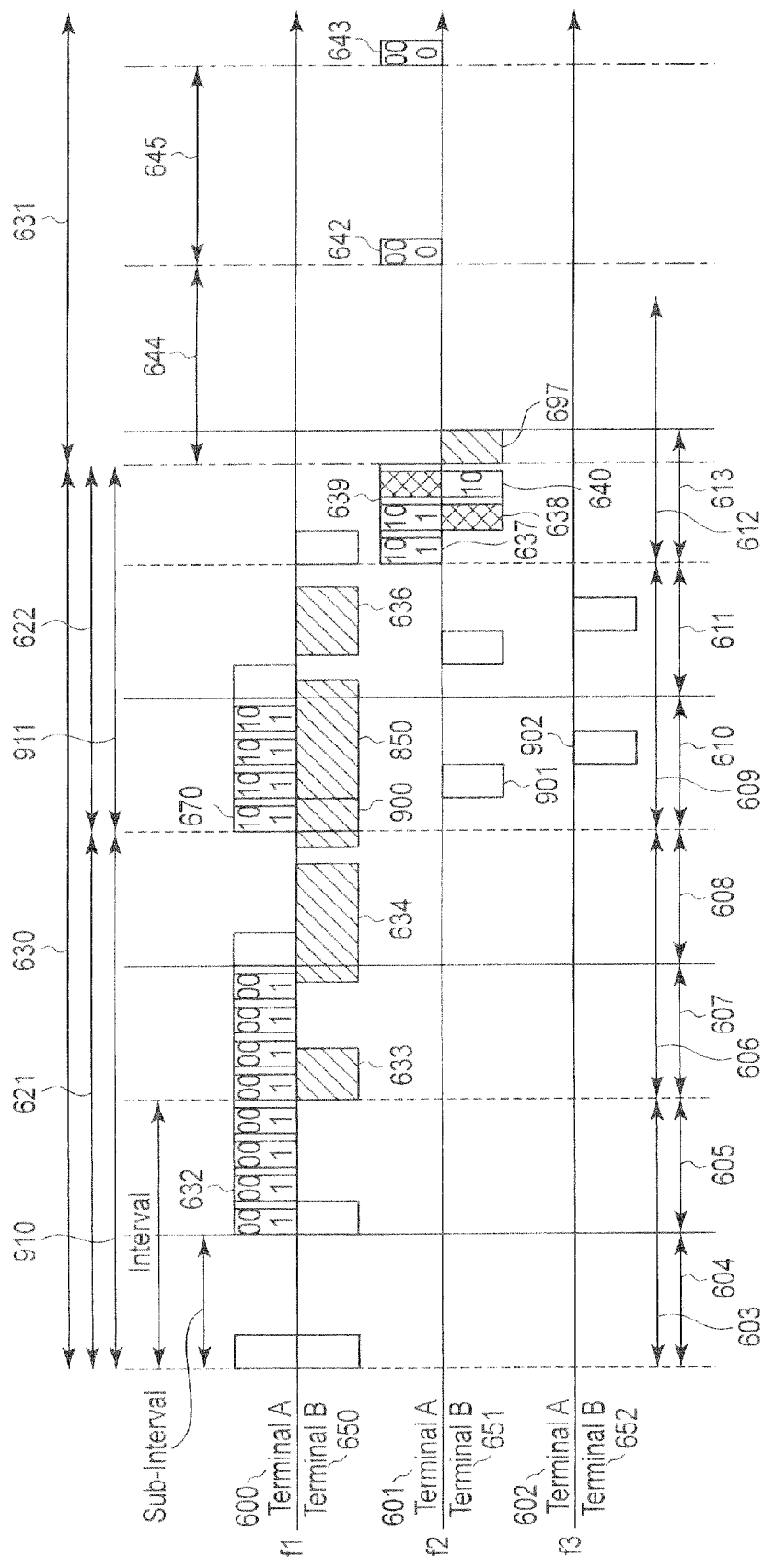
FIG. 20 is a timing chart showing a frame exchange sequence in a default channel connection attempt phase and a multi-channel connection attempt phase in the default channel connection attempt mode.

FIG. 20 is a timing chart showing a frame exchange sequence in the default channel connection attempt phase and multi-channel connection attempt phase in the default channel connection attempt mode. The terminal B which stands by for reception of a connection request frame in a default channel search mode 910 detects interference during an interval 606. The terminal B, therefore, switches to a multi-channel search mode 911 in the interval 609, and starts a reception unit in each of the frequency channels f1, f2, and f3 during a sub-interval to stand by for reception of a connection request frame (900, 901, and 902). Since a predetermined number of intervals have elapsed, the terminal A which transmits a connection request frame in the default channel connection attempt phase 621 in the default channel connection attempt mode transits to the multi-channel connection attempt phase 622 in the default channel connection attempt mode, and transmits a connection request frame while switching the frequency channels at intervals. Since the terminal B receives, using the frequency channel f2 in which no interference has been detected, a connection request frame whose interference detection field 38 has a value "0" during the interval 612, it transmits an ACK frame, and transits to a connection response frame transmission standby state.

As described above, in the default channel connection attempt mode, connection attempt processing is regularly performed in each of the plurality of frequency channels. This makes it possible to wirelessly connect and communicate, using a frequency channel in which there is no interference, with the second wireless terminal which is executing a multi-channel search, when the second terminal has suffered any interference, and therefore cannot receive any connection request frame.

Fourth Embodiment

FIG. 21 is a block diagram showing a schematic configuration of a wireless communication apparatus 2 according to this embodiment, which is obtained by adding an interval counter 231 to the block diagram shown in FIG. 13.

Figure 22C:
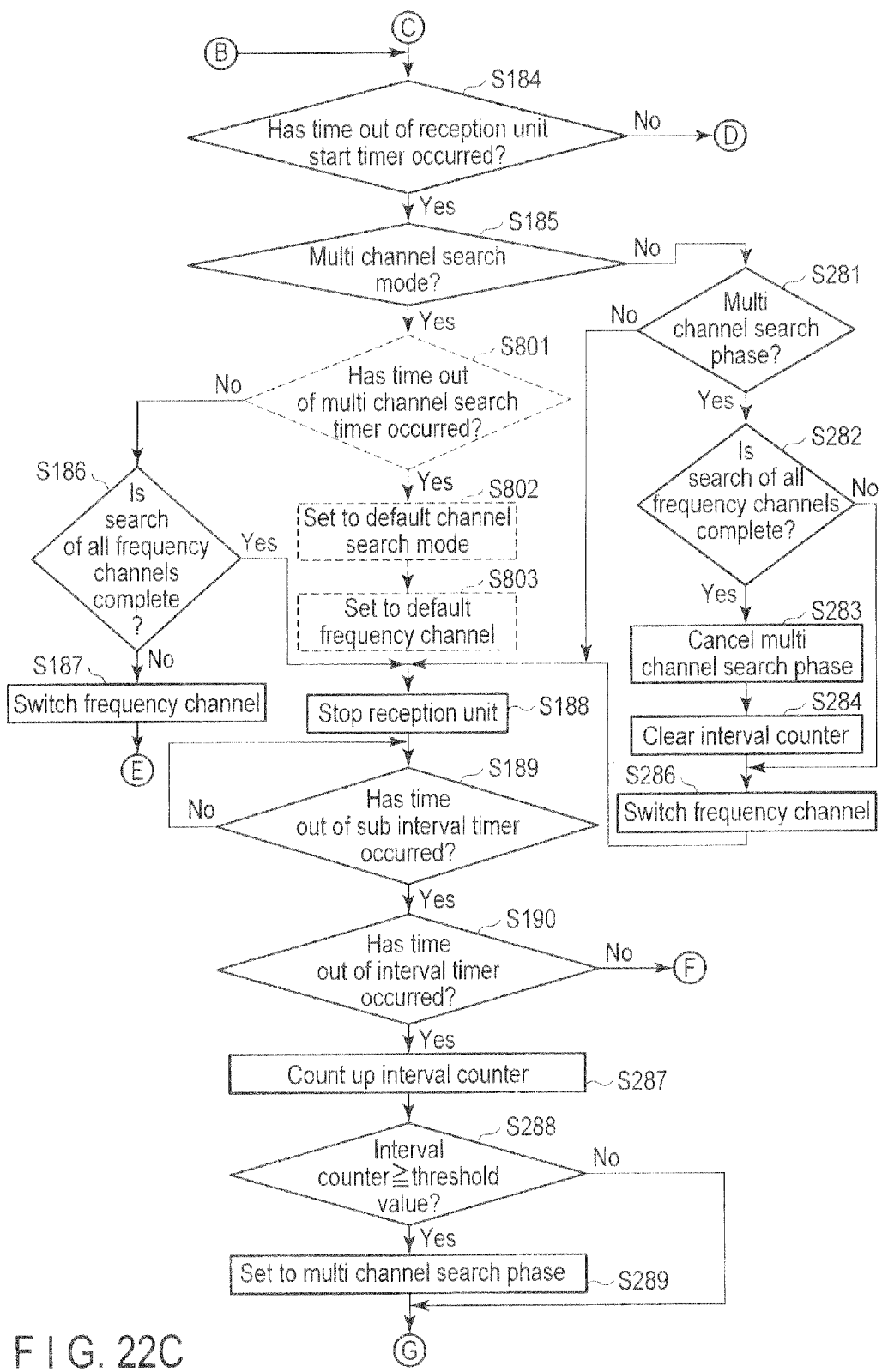
FIG. 22C is a flowchart illustrating the modification example of the search processing before wireless connection shown in FIGS. 14A to 14C.

FIGS. 22A to 22C are flowcharts illustrating search processing before wireless connection executed by the wireless communication apparatus 2, which are obtained by modifying the flowcharts shown in FIGS. 14A to 14C. An operation of regularly standing by for reception of a connection request frame in each of a plurality of frequency channels in a default channel search mode will be described with reference to the flowcharts shown in FIGS. 22A to 22C. Referring to FIGS. 22A to 22C, processing in steps S151 to S185 is the same as that in the flowcharts of FIGS. 14A to 14C, and a description thereof will be omitted. It is determined in step S185 whether a search mode is a multi-channel search mode. If the search mode is not the multi-channel search mode, it is determined whether the apparatus 2 is in a multi-channel search phase in the default channel search mode (step S281). If the apparatus 2 is not in the multi-channel search phase, the process advances to step S188; otherwise, it is determined whether a search of all the frequency channels is complete (step S282). If a search of all the frequency channels is incomplete, the process advances to step S286; otherwise, the apparatus 2 cancels the multi-channel search phase (step S283). Then, the apparatus 2 clears the interval counter 231 (step S284), switches the frequency channel to a default frequency channel (step S286), and stops a reception unit (step S188). It is determined whether a time-out of a sub-interval timer 140 has occurred (step S189). If a time-out has not occurred, the apparatus 2 stands by for a time-out to occur; otherwise, it is determined whether a time-out of an interval timer 138 has occurred (step S190). If a time-out of the interval timer 138 has not occurred, the processing from step S154 is repeated; otherwise, the interval counter 231 is counted up (step S287). After step S287, it is determined whether the interval counter 231 is equal to or larger than a predetermined threshold value (step S288). If the counter 231 is less than the threshold value, the processing from step S153 is repeated; otherwise, the apparatus 2 sets the multi-channel search phase (step S289). After step S289, the processing from step S153 is repeated.

Figure 23:
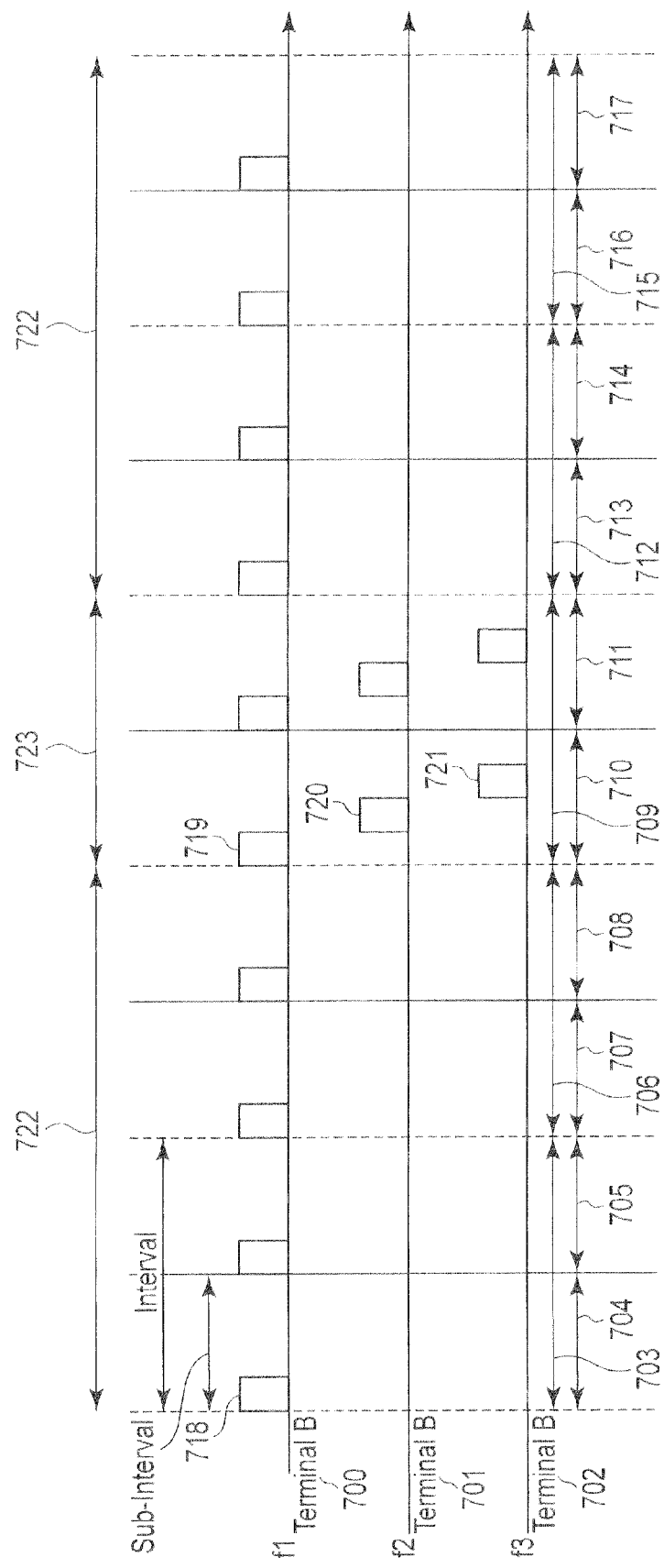
FIG. 23 is a timing chart showing phase switching in a default channel search mode.

FIG. 23 is a timing chart showing phase switching in the default channel search mode. A terminal B stands by for a connection request frame in a default channel f1 in a default channel search chase 722. When a predetermined number of intervals elapse, the terminal B switches to a multi-channel search phase 723, and starts its reception unit to stand by for reception of a connection request frame in each of the frequency channel f1 and frequency channels f2 and f3 during a sub-interval (719, 720, and 721). After performing the processing in the multi-channel search phase during an interval 709, the terminal B transits to a default channel search phase 722 again to stand by for reception of a connection request frame in the default channel. This operation will be repeated thereafter.

In the above example, the multi-channel search phase only lasts for one interval. The period of the multi-channel search phase is not necessarily limited to one interval, and may be a plurality of intervals.

Figure 24:
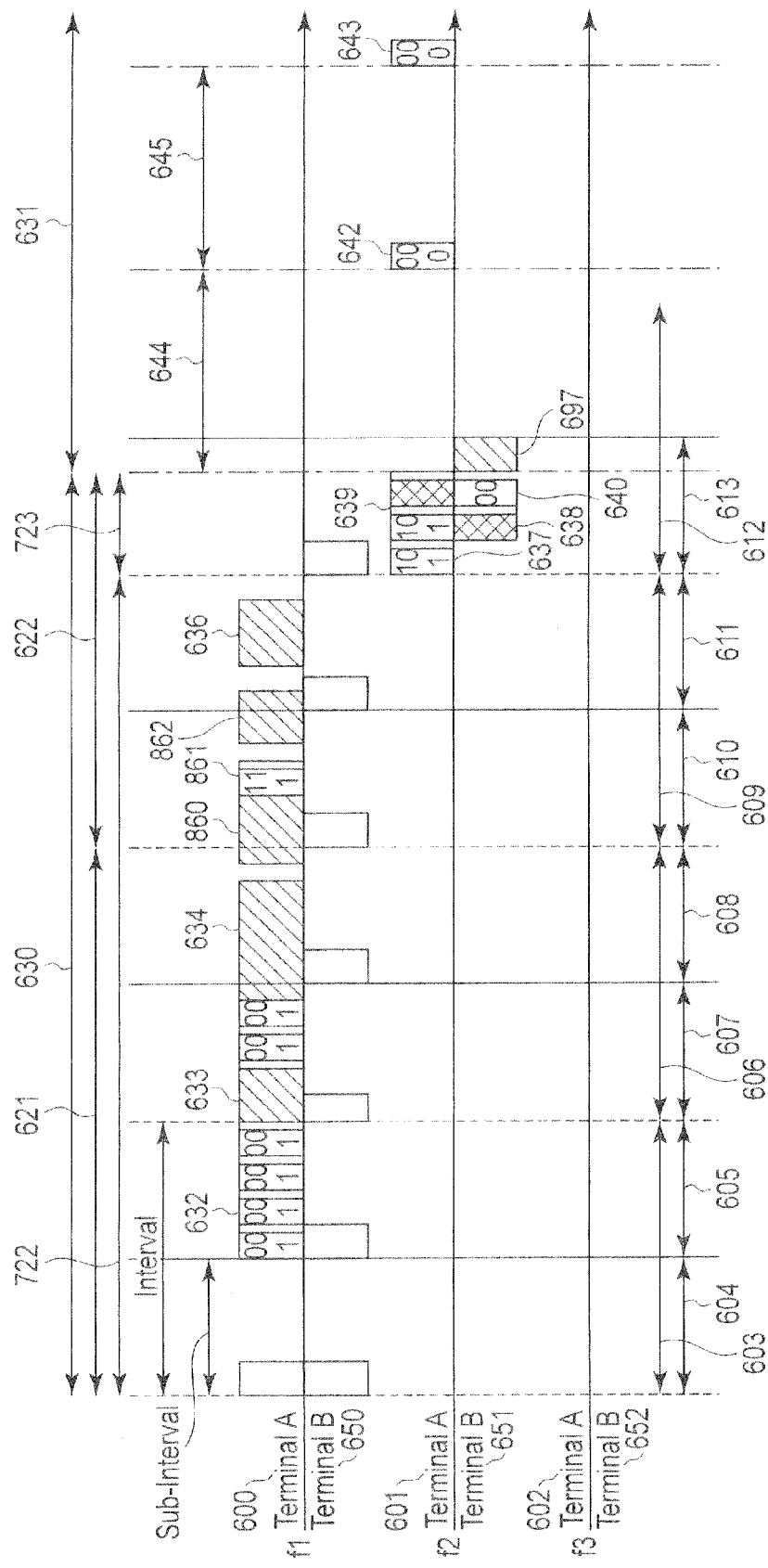
FIG. 24 is a timing chart showing a frame exchange sequence in a default channel search phase and a multi-channel search phase in the default channel search mode.

FIG. 24 is a timing chart showing a frame exchange sequence in the default channel search phase and multi-channel search phase in the default channel search mode. A terminal A which transmits a connection request frame in a default channel connection attempt mode 621 detects interference during an interval 606. The terminal A, therefore, switches to a multi-channel connection attempt mode 622 in an interval 609. The terminal A than transmits a connection request frame using the frequency channel f1 during the interval 609, and transmits a connection request frame using the frequency channel f2 during an interval 612. Since a predetermined number of intervals have elapsed, the terminal B which stands by for reception of a connection request frame in the default channel search phase 722 in the default channel search mode transits to a multi-channel search phase 723 in the default channel search mode, and starts its reception unit to stand by for a connection request frame in each of the frequency channels f1, f2, and f3 during a sub-interval of the interval 612. Since, during the interval 612, the terminal B receives a connection request frame whose interference detection field 38 has a value "0" using the frequency channel f2 in which no interference has been detected (638), it transmits an ACK frame, and transits to a connection response frame transmission standby state.

As described above, in the default channel search mode, a search is regularly performed in each of the plurality of frequency channels. This makes it possible to wirelessly connect and communicate, using a frequency channel in which there is no interference, with the first wireless terminal which is executing multi-channel connection request frame transmission, when the first terminal has suffered any interference, and therefore cannot receive any response frame (ACK) to a connection request frame.

Fifth Embodiment

FIG. 25 is a block diagram showing a schematic configuration of a wireless communication apparatus 2 according to this embodiment, which is obtained by adding a connection determination unit 301 to the block diagram shown in FIG. 21, and connecting a reception unit 132 and transmission unit 135 with a control unit 139.

Figure 26A:
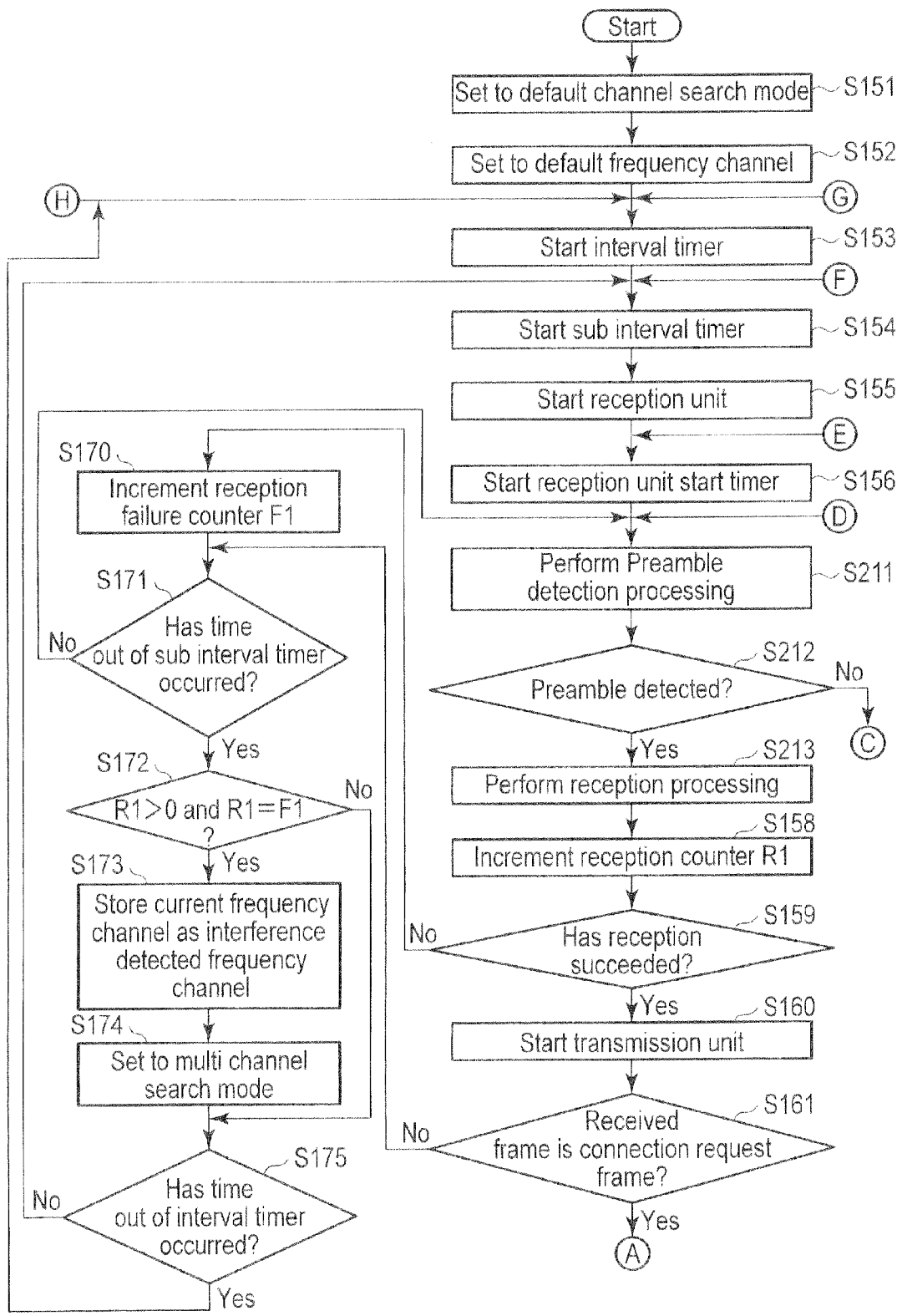
FIG. 26A is a flowchart illustrating a modification example of the search processing before wireless connection of FIGS. 22A to 22C.
Figure 26B:
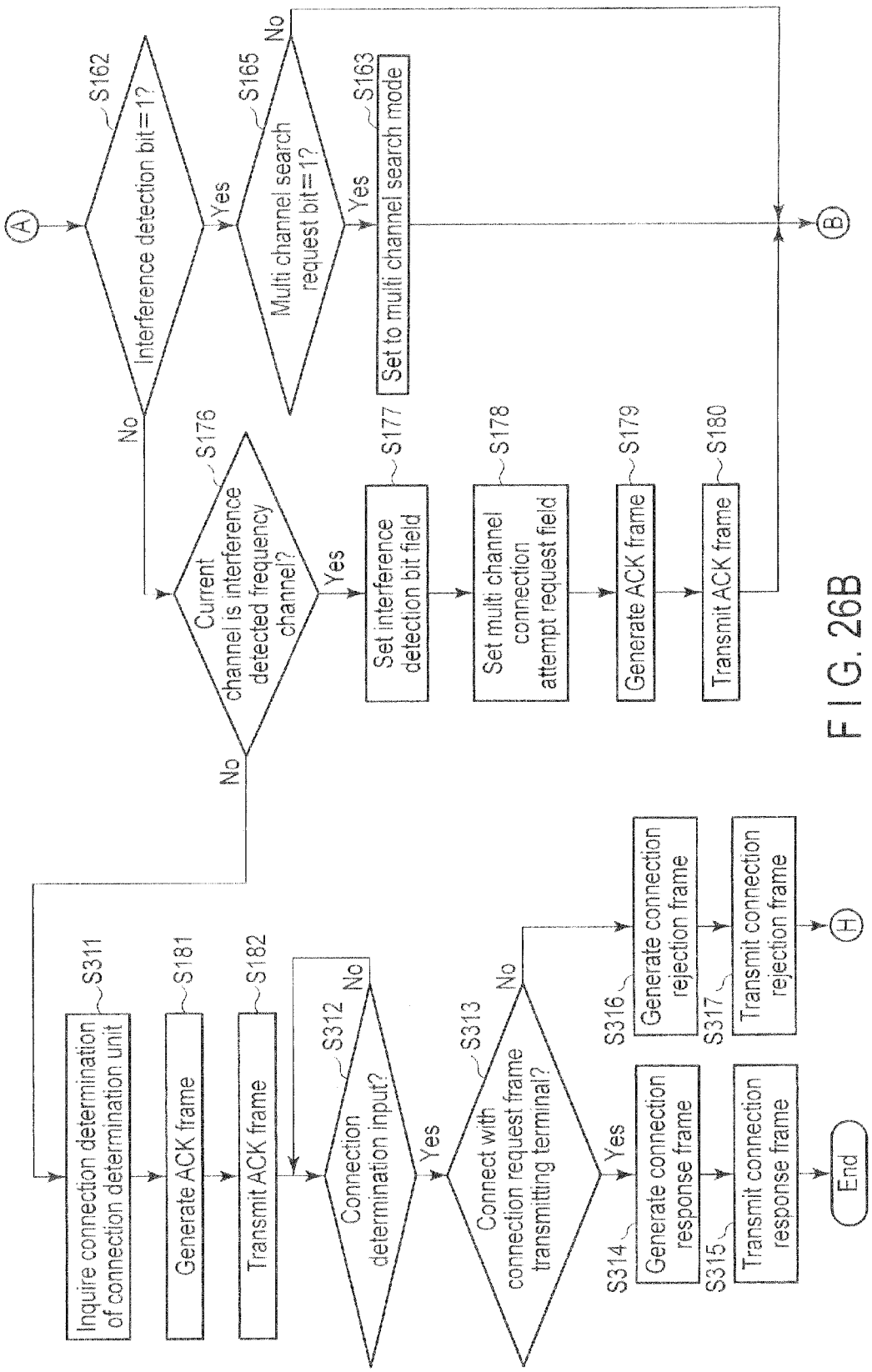
FIG. 26B is a flowchart illustrating the modification example of the search processing before wireless connection of FIGS. 22A to 22C.
Figure 26C:
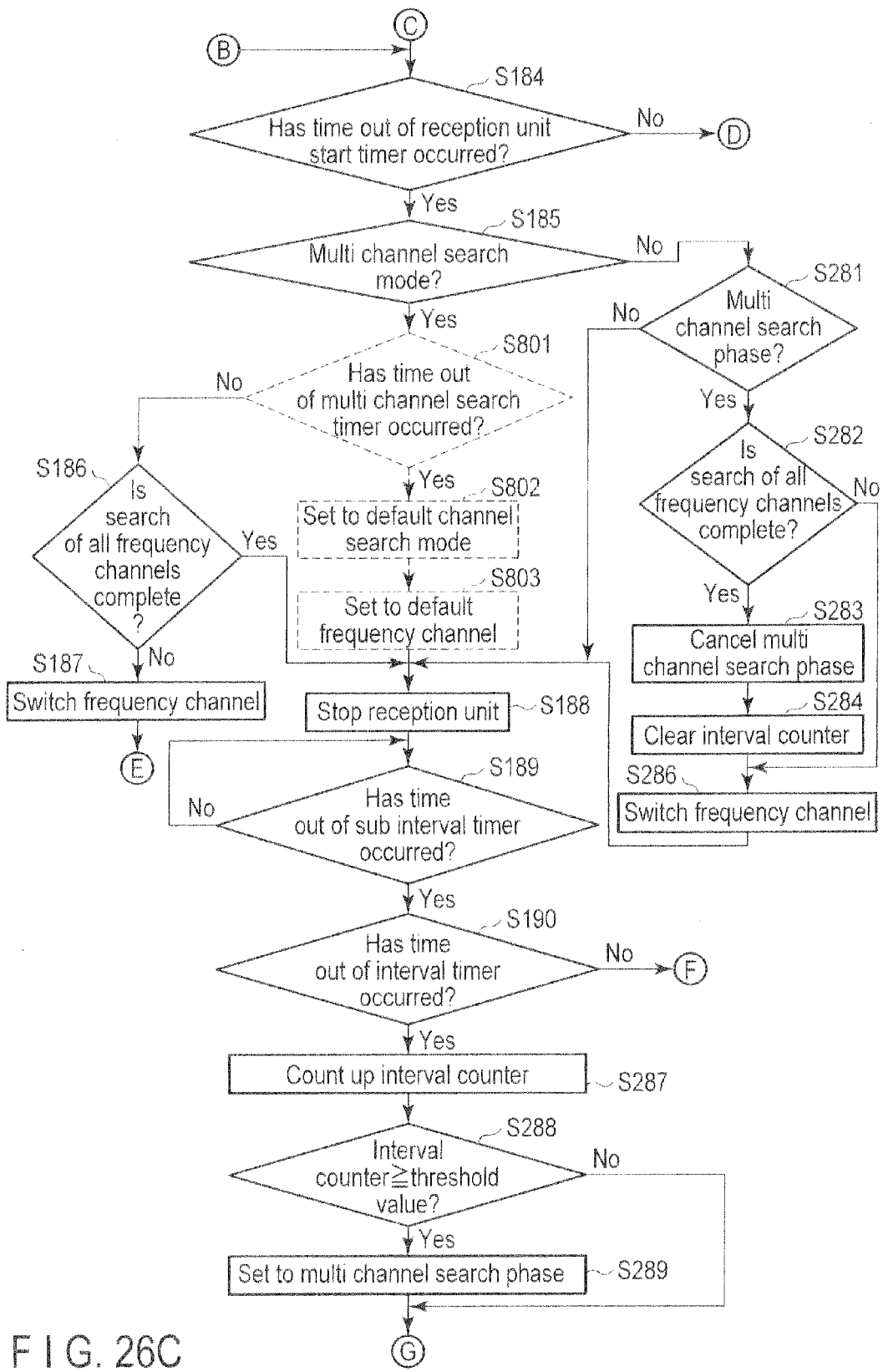
FIG. 26C is a flowchart illustrating the modification example of the search processing before wireless connection of FIGS. 22A to 22C.

FIGS. 26A to 26C are flowcharts illustrating search processing before wireless connection executed by the wireless communication apparatus 2, which are obtained by modifying the flowcharts shown in FIGS. 22A to 22C. Referring to FIGS. 26A to 26C, processing in steps S151 to S176 is the same as that in the flowcharts shown in FIGS. 22A to 22C, and a description thereof will be omitted. If it is determined in step S176 that no interference has been detected in a current frequency channel, the control unit 139 notifies the connection determination unit 301 of the ID of a terminal which has transmitted a connection request frame, and inquires whether to connect with the terminal which has transmitted the connection request frame (step S311). The unit 139 generates an ACK frame (step S181), transmits the generated ACK frame (step S182), and determines whether the connection determination unit 301 has input a connection determination (step S312). If the connection determination unit 301 has not input a connection determination, the unit 139 stands by for a connection determination to be input. When a connection determination is input, the unit 139 checks the result of whether to connect with the terminal which has transmitted the connection request frame (step S313). If the result indicates connection with the terminal which has transmitted the connection request frame, the unit 139 generates a connection response frame (step S314), and transmits the generated connection response frame (step S315). If, in step S313, the result indicates non-connection with the terminal which has transmitted the connection request frame, the unit 139 generates a connection rejection frame (step S316), transmits the generated connection rejection frame (step S315), and repeats the processing from step S153.

Processing of determining a frequency channel to be used by a terminal B to transmit a connection response frame will be explained with reference to FIG. 8. Since, during an interval 612, using a frequency channel f2 in which no interference has been detected, the terminal B receives a connection request frame whose interference detection field 38 has been set with "0" (638), it responds with an ACK frame whose multi-channel connection attempt request field 55 and interference detection field 38 have been set with "0". After the terminal B checks that the ACK frame has been successfully received, and transmission of a connection request frame has been stopped (697), it determines that transmission of a connection response frame is to be made using the frequency channel f2. Then, after an upper layer inputs a transmission instruction, the terminal B transmits the connection response frame by random backoff.

As described above, when both terminals send a connection response using a frequency channel which has not suffered any interference, it is possible to make wireless communication using a frequency channel which has not suffered any interference.

Sixth Embodiment

FIG. 27 is a block diagram showing a schematic configuration of a wireless communication apparatus 1 according to this embodiment, which is obtained by adding a response standby timer 331 to the block diagram shown in FIG. 17.

Figure 28A:
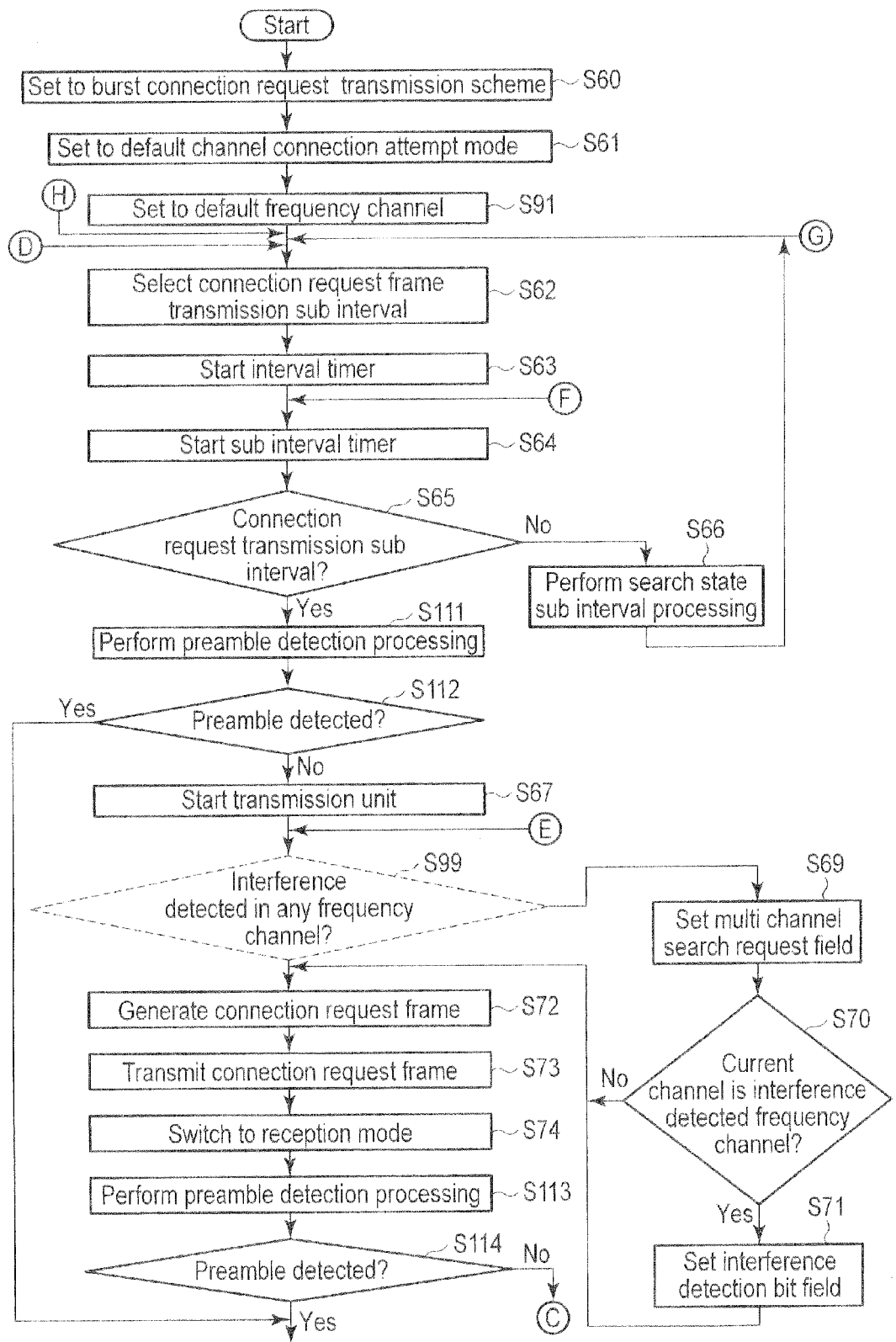
FIG. 28A is a flowchart illustrating a modification example of the connection attempt processing before wireless connection of FIGS. 18A to 18D.
Figure 28B:
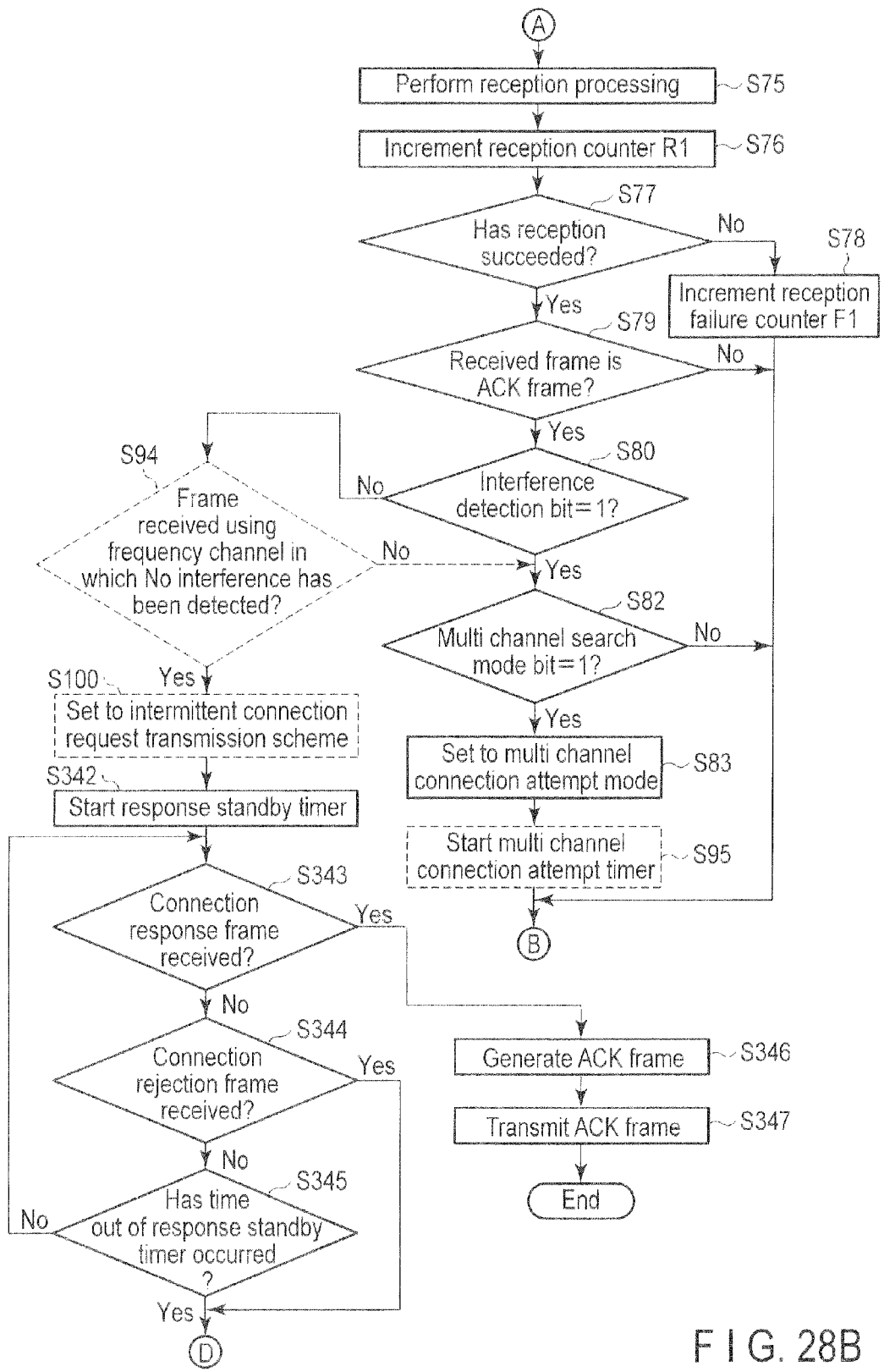
FIG. 28B is a flowchart illustrating the modification example of the connection attempt processing before wireless connection of FIGS. 18A to 18D.
Figure 28C:
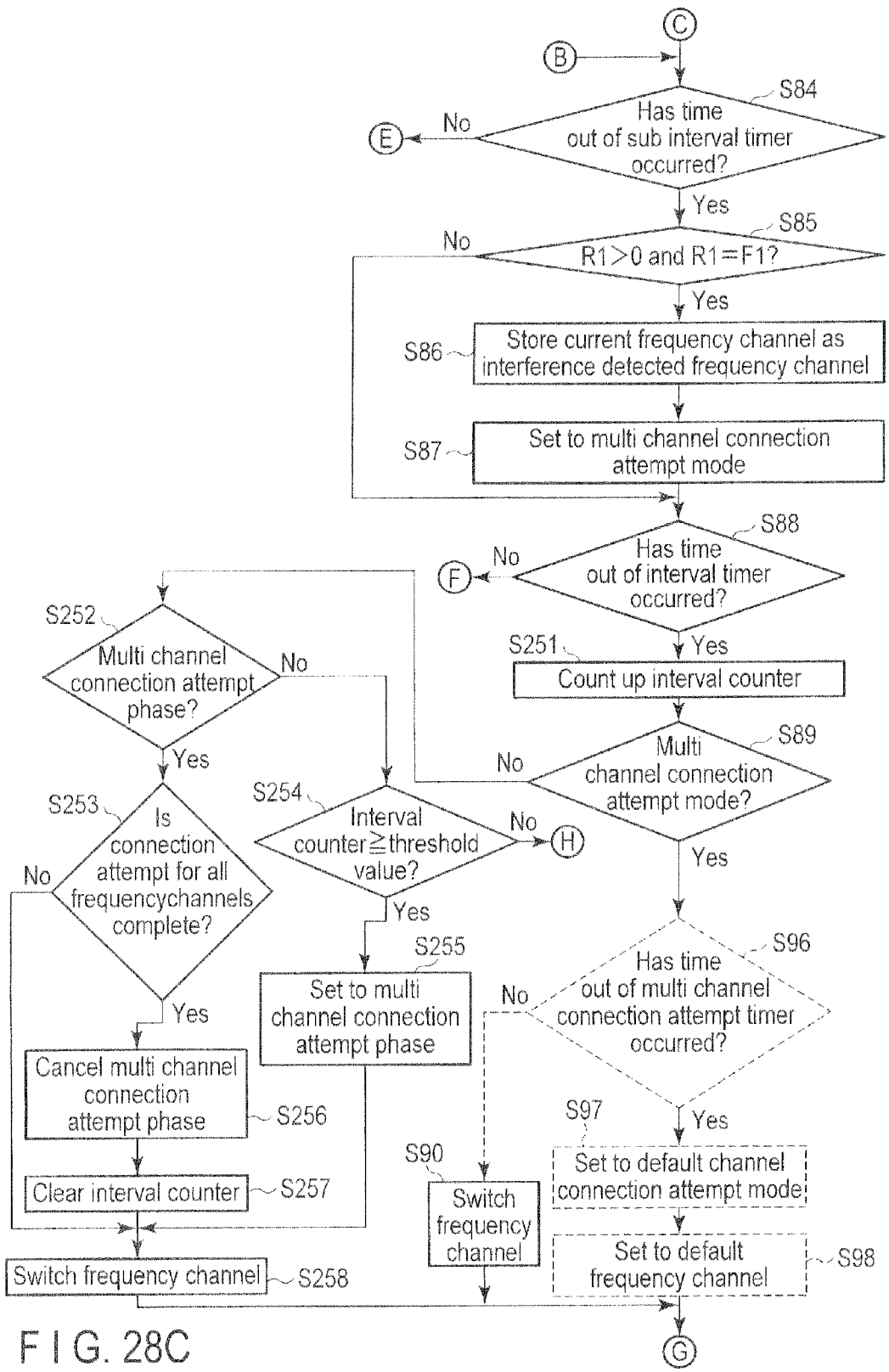
FIG. 28C is a flowchart illustrating the modification example of the connection attempt processing before wireless connection of FIGS. 18A to 18D.

FIGS. 28A to 28C are flowcharts illustrating connection attempt processing before wireless connection executed by the wireless communication apparatus 1, which are obtained by modifying the flowcharts shown in FIGS. 18A to 18D. Referring to FIGS. 28A to 28C, processing in steps S60 to S80 is the same as that in the flowcharts of FIGS. 18A to 18D, and a description thereof will be omitted. If it determined in step S80 that the interference detection bit of a received ACK frame is not "1", it is determined whether the ACK frame has been received using a frequency channel in which no interference has been detected (step S94). If the ACK frame has been received using a frequency channel in which interference has been detected, the process advances to step S82. Alternatively, if the ACK frame has been received using a frequency channel in which no interference has been detected, an intermittent connection request transmission scheme is set (step S100), and the response standby timer 331 is started (step S342). It is then determined whether a connection response frame has been received from a wireless communication apparatus to which a connection request frame was transmitted (step S343). If a connection response frame has been received, an ACK frame is generated and transmitted (step S346), and the wireless communication apparatus 1 is connected to this wireless communication apparatus (step S347). If it is determined in step S343 that a connection response frame has not been received from the wireless communication apparatus to which the connection request frame was transmitted, it is determined whether connection rejection frame has been received from the wireless communication apparatus to which the connection request frame was transmitted (step S344). If a connection rejection frame has been received, processing from step S62 is repeated; otherwise, it is determined whether a time-out of the response standby timer 331 has occurred (step S345). If a time-out of the response standby timer 331 has not occurred, the processing from step S343 is repeated; otherwise, the processing from step S62 is repeated.

Processing of determining a frequency channel in which a terminal A stands by for reception of a connection response frame will be explained with reference to FIG. 10.

Referring to FIG. 10, during an interval 606, the terminal A receives an ACK frame to a transmitted connection request frame using a frequency channel f1 in which no interference has been detected (673). Since the value of an interference detection field 38 of the ACK frame is "1", the terminal A does not stand by for reception of a connection response frame in the frequency channel f1, and continues a burst connection request transmission scheme 630. On the other hand, during an interval 612, the terminal A receives an ACK frame to a transmitted connection request frame using a frequency channel f2 in which no interference has been detected (639). Since the value of an interference detection field 38 of the ACK frame is "0", the terminal A determines to stand by for reception of a connection response frame in the frequency channel f2, and transits from the burst connection request transmission scheme 630 to an intermittent connection request transmission scheme 631 to stand by for reception of a connection response frame transmitted by random backoff.

As described above, when both terminals send connection response using a frequency channel which has not suffered any interference, it is possible to make wireless communication using a frequency channel which has not suffered any interference.

Seventh Embodiment

FIG. 29 schematically shows a wireless communication apparatus 1000 according to the seventh embodiment. The configuration of the wireless communication apparatus 1000 is obtained by modifying the configuration of a wireless communication apparatus 1 in FIG. 27 to include an antenna 11 in the wireless communication apparatus. By including the antenna 11 in the wireless communication apparatus 1000, it is possible to configure the wireless communication apparatus as one apparatus including an antenna, thereby enabling to decrease the implementation area. In the configuration shown in FIG. 29, transmission and reception processes share the antenna 11. By sharing one antenna between transmission and reception processes in this way, it is possible to downsize the wireless communication apparatus.

Eighth Embodiment

FIG. 30 schematically shows a wireless communication apparatus 2000 according to the eighth embodiment. The wireless communication apparatus 2000 includes a buffer 2001 in addition to the configuration of a wireless communication apparatus 1 of FIG. 27. The buffer 2001 is connected with a transmission unit 15 and a reception unit 12. By configuring the wireless communication apparatus to include a buffer in this way, it is possible to hold transmission/reception data in the buffer, thereby enabling to readily perform retransmission processing and external output processing.

Ninth Embodiment

FIG. 31 schematically shows a wireless communication apparatus 3000 according to the ninth embodiment. The wireless communication apparatus 3000 includes a processor unit 3001, a bus 3002, and an external interface unit 3003 in addition to the configuration of a wireless communication apparatus 2000 of FIG. 30. The processor unit 3001 and external interface unit 3003 are connected with a buffer 2001 via the bus 3002. Firmware operates in the processor unit 3001. By configuring the wireless, communication apparatus to include firmware in this way, it is possible to readily change functions of the wireless communication apparatus by rewriting the firmware.

10th Embodiment

FIG. 32 schematically shows a wireless communication apparatus 4000 according to the 10th embodiment. In addition to the configuration of a wireless communication apparatus 1 of FIG. 27, the wireless communication apparatus 4000 includes a clock generation unit 4001 which is connected to a wireless transmission/reception unit 500, and externally outputs a clock via an output terminal. By, in this way, externally outputting a clock generated within the wireless communication apparatus, and causing the host side to operate by the externally output clock, it is possible to cause the host side and the wireless communication apparatus to synchronously operate.

11th Embodiment

FIG. 33 schematically shows a wireless communication apparatus 5000 according to the 11th embodiment. In addition to the configuration of a wireless communication apparatus 1 of FIG. 27, the wireless communication apparatus 5000 includes a power supply unit 5001, power supply control unit 5002, and wireless power reception unit 5003 each of which is connected to a wireless transmission/reception unit 500. By configuring the wireless communication apparatus to include a power supply in this way, it is possible to implement a low power consumption operation while controlling the power supply.

12th Embodiment

FIG. 34 schematically shows a wireless communication apparatus 6000 according to the 12th embodiment. In addition to the configuration of a wireless communication apparatus of FIG. 33, the wireless communication apparatus 6000 includes an NEC (Near Field Communications) transmission/reception unit 6001, which is connected with a power supply control unit 5002 and a control unit 19. By configuring the wireless communication apparatus to include an NFC transmission/reception unit in this way, it is possible to readily perform authentication processing, and to lower power consumption in a standby state by controlling a power supply using the NFC transmission/reception unit as a trigger.

13th Embodiment

FIG. 35 schematically shows a wireless communication apparatus 7000 according to the 13th embodiment. In addition to the configuration of a wireless communication apparatus 5000 of FIG. 33, the wireless communication apparatus 7000 includes a SIM (subscriber identity module) card 7001 which is connected with a control unit 19. By configuring the wireless communication apparatus to include a SIM card in this way, it is possible to readily perform authentication processing.

14th Embodiment

FIG. 36 schematically shows a wireless communication apparatus 8000 according to the 14th embodiment. In addition to the configuration of a wireless communication apparatus 3000 of FIG. 31, the wireless communication apparatus 8000 includes a moving image compression/decompression unit 8001 which is connected with a bus 3002. By configuring the wireless communication apparatus to include a moving image compression/decompression unit in this way, it is possible to readily transmit a compressed moving image and decompress a received compressed moving image.

15th Embodiment

Figure 37:
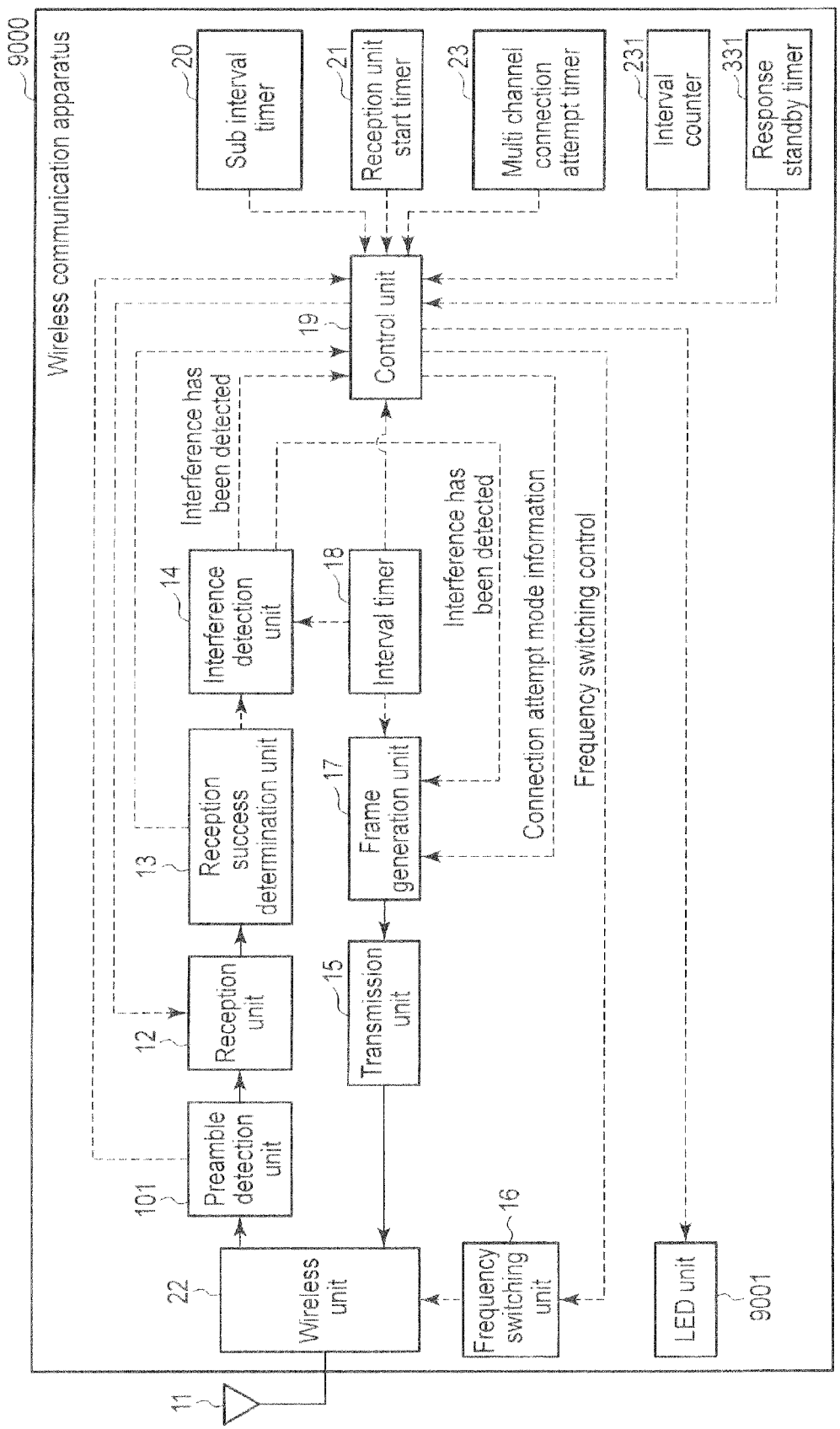
FIG. 37 is a block diagram schematically showing a wireless communication apparatus according to the 15th embodiment.

FIG. 37 schematically shows a wireless communication apparatus 9000 according to the 15th embodiment. In addition to the configuration of a wireless communication apparatus 1 of FIG. 27, the wireless communication apparatus 9000 includes an LED unit 9001 which is connected with a control unit 19. By configuring the wireless communication apparatus to include an LED in this way, it is possible to readily notify the user of an operation state of the wireless communication apparatus.

16th Embodiment

FIG. 38 schematically shows a wireless communication apparatus 10000 according to the 16th embodiment. In addition to the configuration of a wireless communication apparatus 1 of FIG. 27, the wireless communication apparatus 10000 includes a vibrator unit 10001 which is connected with a control unit 19. By configuring the wireless communication apparatus to include a vibrator in this way, it is possible to readily notify the user of an operation state of the wireless communication apparatus.

17th Embodiment

FIG. 39 schematically shows a wireless communication apparatus 11000 according to the 17th embodiment. In addition to the configuration of a wireless communication apparatus 1 of FIG. 27, the wireless communication apparatus 11000 includes a wireless LAN unit 11001 and a wireless switching unit 11002. The wireless switching unit 11002 is connected with a control unit 19 and the wireless LAN unit 11001. By configuring the wireless communication apparatus to include a wireless LAN in this way, it is possible to switch between communication by the wireless LAN and that by a wireless transmission/reception unit 500 depending on the situation.

18th Embodiment

FIG. 40 schematically shows a wireless communication apparatus 12000 according to the 18th embodiment. In addition to the configuration of a wireless communication apparatus 11000 of FIG. 39, the wireless communication apparatus 12000 includes a switch (SW) 12001. By configuring the wireless communication apparatus to include a switch in this way, it is possible to switch between communication by the wireless LAN and that by a wireless transmission/reception unit 500 depending on the situation while sharing an antenna.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus for making wireless connection in a first connection attempt state in which a connection request is attempted using a predetermined frequency channel or a second connection attempt state in which a connection request is attempted using a plurality of frequency channels, the apparatus comprising:
    an interference detection unit configured to detect occurrence of interference in one of the plurality of frequency channels;
    a frame generation unit configured to generate a connection request frame which includes a first field for requesting a search of the plurality of frequency channels in response to the occurrence of interference, and a second field for indicating whether a corresponding frequency channel is a channel in which the occurrence of interference has been detected;
    a transmission unit configured to transmit the connection request frame using the predetermined frequency channel in the first connection attempt state, and to transmit the connection request frame using the plurality of frequency channels in the second connection attempt state;
    a control unit configured to transit to the second connection attempt state in response to the occurrence of interference; and
    a reception unit configured to receive a response frame for requesting a connection attempt to the plurality of frequency channels;
    wherein for a connection request frame transmitted using a frequency channel in which no interference has been detected, upon receiving a response frame containing information which indicates that no interference has been detected in the frequency channel, the reception unit stands by for reception of a connection response frame in the frequency channel.

2. The apparatus according to claim 1, wherein the control unit transits to the second connection attempt state in response to reception of the response frame.

3. The apparatus according to claim 1, further comprising a counter configured to count a number of times a first time interval has elapsed after a start of a connection request, wherein the control unit transits to the second connection attempt state when the number of times becomes a predetermined value.

4. A wireless communication apparatus comprising:
    an interference detection unit configured to detect occurrence of interference in one of a plurality of frequency channels;
    a control unit configured to stand by in a first search state in which a predetermined frequency channel is searched, or a second search state in which a plurality of frequency channels are searched;
    a reception unit configured to receive a connection request frame which includes a first field for requesting a search of the plurality of frequency channels, and a second field for indicating whether a corresponding frequency channel is a channel in which the occurrence of interference has been detected;
    a frame generation unit configured to generate a response frame which includes a third field for requesting a connection attempt to the plurality of frequency channels in response to the occurrence of interference, and a fourth field for indicating whether the corresponding frequency channel is a channel in which interference has been detected; and
    a transmission unit configured to transmit the response frame in response to reception of the connection request frame,
    wherein the control unit transits to the second search state when the occurrence of interference is detected or the first field indicates that a search of the plurality of frequency channels is requested.

5. The apparatus according to claim 4, further comprising a counter configured to count a number of times a first time interval has elapsed after a start of a search, wherein the control unit transits to the second search state when the number of times becomes a predetermined value.

6. The apparatus according to claim 4, wherein the transmission unit transmits the response frame using the corresponding frequency channel when (i) the second field of the connection request frame indicates that the corresponding frequency channel is not a channel in which the occurrence of interference has been detected, and (ii) the interference detection unit has detected no interference in the corresponding frequency channel.

7. The apparatus according to claim 1, further comprising at least one antenna for performing wireless communication.

8. A wireless communication method for making wireless connection in a first connection attempt state in which a connection request is attempted using a predetermined frequency channel or a second connection attempt state in which a connection request is attempted using a plurality of frequency channels, the method comprising:
    detecting occurrence of interference in one of the plurality of frequency channels;
    generating a connection request frame which includes a first field for requesting a search of the plurality of frequency channels in response to the occurrence of interference, and a second field for indicating whether a corresponding frequency channel is a channel in which the occurrence of interference has been detected;
    transmitting the connection request frame using the predetermined frequency channel in the first connection attempt state, and transmitting the connection request frame using the plurality of frequency channels in the second connection attempt state;
    transiting to the second connection attempt state in response to the occurrence of interference; and
    receiving a response frame for requesting a connection attempt to the plurality of frequency channels;
    wherein for a connection request frame transmitted using a frequency channel in which no interference has been detected, upon receiving a response frame containing information which indicates that no interference has been detected in the frequency channel, the method further comprises standing by for reception of a connection response frame in the frequency channel.

* * * * *